US012101501B2

(12) United States Patent
Ko et al.

(10) Patent No.: US 12,101,501 B2
(45) Date of Patent: *Sep. 24, 2024

(54) VIDEO SIGNAL PROCESSING METHOD AND APPARATUS USING ADAPTIVE MOTION VECTOR RESOLUTION

(71) Applicant: WILUS INSTITUTE OF STANDARDS AND TECHNOLOGY INC., Seongnam-si (KR)

(72) Inventors: Geonjung Ko, Seoul (KR); Dongcheol Kim, Suwon-Si (KR); Juhyung Son, Uiwang-Si (KR); Jaehong Jung, Seoul (KR); Jinsam Kwak, Anyang-Si (KR)

(73) Assignee: WILUS INSTITUTE OF STANDARDS AND TECHNOLOGY INC., Seongnam-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/328,246

(22) Filed: Jun. 2, 2023

(65) Prior Publication Data
US 2023/0308676 A1    Sep. 28, 2023

Related U.S. Application Data

(63) Continuation of application No. 17/460,117, filed on Aug. 27, 2021, now Pat. No. 11,706,440, which is a
(Continued)

(30) Foreign Application Priority Data

Jun. 7, 2018 (KR) .................. 10-2018-0065688
Jun. 14, 2018 (KR) .................. 10-2018-0067864
(Continued)

(51) Int. Cl.
H04N 19/53    (2014.01)
H04N 19/513   (2014.01)
H04N 19/57    (2014.01)

(52) U.S. Cl.
CPC .......... *H04N 19/513* (2014.11); *H04N 19/53* (2014.11); *H04N 19/57* (2014.11)

(58) Field of Classification Search
None
See application file for complete search history.

(56) References Cited

U.S. PATENT DOCUMENTS

2015/0195562 A1    7/2015  Li et al.
2017/0339426 A1*   11/2017 Lee ........................ H04N 19/70
(Continued)

FOREIGN PATENT DOCUMENTS

CN    107113442 A    8/2017
CN    109792532 A    5/2019
(Continued)

OTHER PUBLICATIONS

International Search Report for International application No. PCT/KR2019/006913. Sep. 10, 2019.
(Continued)

*Primary Examiner* — Samuel D Fereja

(57) ABSTRACT

A video signal decoding device comprising a processor, wherein the processor is configured to: obtain reference samples corresponding to a first side of a current block and reference samples corresponding to a second side of the current block, obtain a direct current (DC) value for prediction of the current block based on a reference sample set comprising at least some of the reference samples corresponding to the first side and the reference samples corresponding to the second side, and reconstruct the current block based on the DC value.

19 Claims, 31 Drawing Sheets

Related U.S. Application Data continuation of application No. 17/113,215, filed on Dec. 7, 2020, now Pat. No. 11,166,040, which is a continuation of application No. PCT/KR2019/006913, filed on Jun. 7, 2019.

(30) Foreign Application Priority Data

| Jul. 6, 2018 | (KR) | ........................ 10-2018-0078513 |
| Aug. 6, 2018 | (KR) | ........................ 10-2018-0091270 |

(56) References Cited

U.S. PATENT DOCUMENTS

| 2018/0098063 A1 | 4/2018 | Chen et al. |
| 2018/0098089 A1* | 4/2018 | Chen ...................... H04N 19/70 |
| 2019/0089974 A1 | 3/2019 | Lee |

FOREIGN PATENT DOCUMENTS

| EP | 3264768 A1 | 1/2018 |
| JP | 2019534626 A | 3/2019 |
| JP | 7159354 B2 | 9/2021 |
| KR | 20190055109 A | 5/2019 |
| TW | 201739252 A | 11/2017 |
| TW | 201804804 A | 2/2018 |
| WO | 2017-052000 A1 | 3/2017 |
| WO | 2017-157259 A1 | 9/2017 |
| WO | 2017-194773 A1 | 11/2017 |
| WO | 2018-033661 A1 | 2/2018 |
| WO | 2018066867 A1 | 4/2018 |
| WO | 2018-095313 A1 | 5/2018 |

OTHER PUBLICATIONS

Written Opinion of the International Searching AUTHORIITY_PCT/KR2019/006913_Sep. 10, 2019.
Non-Final Rejection of U.S. Appl. No. 17/113,215 from the USPTO dated Feb. 19, 2021.
Notice of Allowance of U.S. Appl. No. 17/113,215 from the USPTO dated Jun. 11, 2021.
Non-Final Rejection of U.S. Appl. No. 17/460,117 from the USPTO dated Nov. 28, 2022.
Notice of Allowance of U.S. Appl. No. 17/460,117 from the USPTO dated Apr. 5, 2023.
Office Action from Intellectual Property INDIA dated Dec. 30, 2021 for the application No. 202027055877.
Office Action from Japanese Patent Application No. 2020-568219.; Date of Drafting: Reiwa 4(2022) Jan. 14.
"Algorithm description of Joint Exploration Test Model 7 (JEM7)", 119. MPEG Meeting; Jul. 17, 2017-Jul. 21, 2017; Torino; (Motion Picture Expert Group or ISO/IEC JTC1/SC29/WG11), No. n17055 Oct. 6, 2017 (Oct. 6, 2017), XP030023716, Retrieved from the Internet: URL:http://phenix.int-evry.fr/mpeg/doc_end_user/documents/119_Torino/wg11/w17055.zip w17055.docx [retrieved on Oct. 6, 2017].
Benjamin Bross, et al. Versatile Video Coding(Draft 4), Joint Video exploration Team(JVET), JVET-M1001-v7, Mar. 17, 2019, pp. 1-299.
Hongbin Liu, et al. CE4-related: Adpative Motion Vector Resolution for Affine Inter Mode, Joint Video exploration Team (JVET), JVET-L0332-v1, Sep. 25, 2018, pp. 1-3.
Extended European Search Report for Application No. 19814257.2-1208 ; 3806461 PCT/KR2019006913 Dated Feb. 16, 2022.
Office Action from KR IP Office(KIPO). Notification of Reason for Refusal ; Application No. 10-2020-7033872, Dated Mar. 7, 2022.
Decision to Grant a Patent of Japanese Patent Application No. 2020-568219 dated Sep. 5, 2022.
Request for the Submission of an Opinion for KR Patent Application No. 10-2020-7033872 dated Jul. 18, 2022 (2nd OA).
Communication pursuant to Article 94(3) EPC for EP Application No. 19814257.2 From European Patent Office. Dated Dec. 12, 2022.
Office Action from European Patent Office; Date:Jun. 26, 2023; Application No. 19814257.2-1208; Applicant: Wilus Institute of Standards and Technology Inc.
Official Action from China National Intellectual Property Administration; Date of Issuing: Jun. 29, 2023; Application No. 201980038112.7; Applicant: Wilus Institute of Standards and Technology Inc.
Joint Video Experts Team (JVET) of ITU-T SG 16 WP 3 and ISO/IEC JTC 1/SC 29/WG 11 10th Meeting: San Diego, USA, Apr. 10-20, 2018 JVET-J1023 Apr. 20, 2018 Geert Van der Auwera,Description of Core Experiment 3: Intra Prediction and Mode Coding Full text 1-20.
Office action from Japanese Patent Office for Application No. 2022-164143 issued on Dec. 4, 2023.
Office action from European Patent Office for Application No. 19814257.2-1208 issued on Jan. 12, 2024.
Notice of Allowance from Chinese National International Intellectual Property Administration for Application No. 201980038112.7 issued on Jan. 23, 2024.

* cited by examiner

| mvd_coding( x0, y0, refList ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
|    abs_mvd_greater1_flag[ 0 ] | ae(v) |
| if( abs_mvd_greater0_flag[ 1 ] ) | |
|    abs_mvd_greater1_flag[ 1 ] | ae(v) |
| if( abs_mvd_greater0_flag[ 0 ] ) { | |
|    if( abs_mvd_greater1_flag[ 0 ] ) | |
|      abs_mvd_minus2[ 0 ] | ae(v) |
|    mvd_sign_flag[ 0 ] | ae(v) |
| } | |
| if( abs_mvd_greater0_flag[ 1 ] ) { | |
|    if( abs_mvd_greater1_flag[ 1 ] ) | |
|      abs_mvd_minus2[ 1 ] | ae(v) |
|    mvd_sign_flag[ 1 ] | ae(v) |
| } | |
| } | |

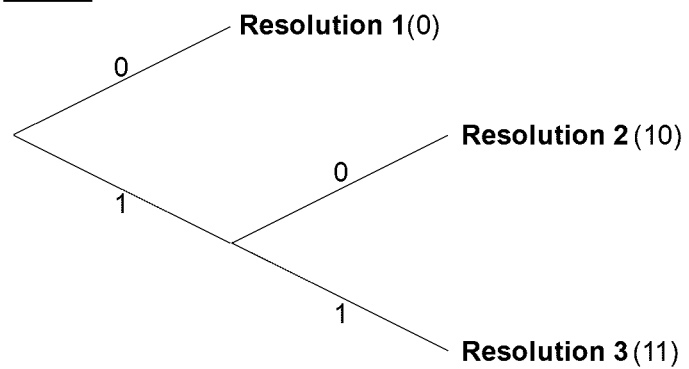
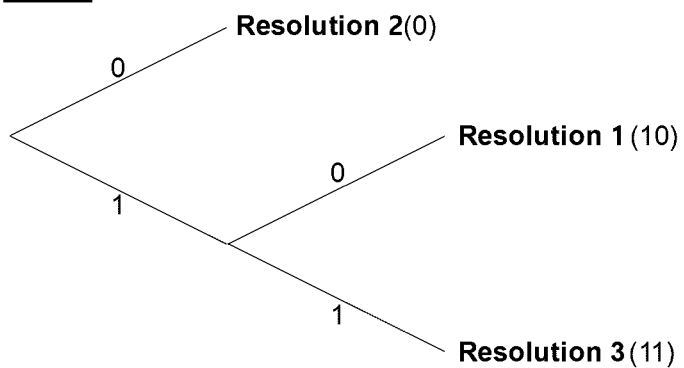
FIG. 11
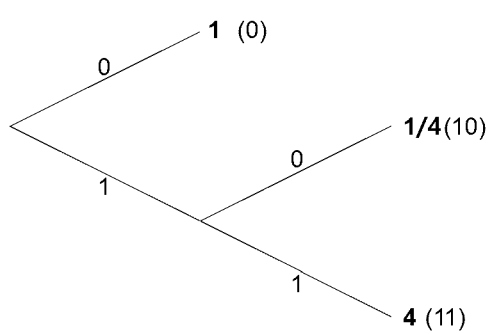
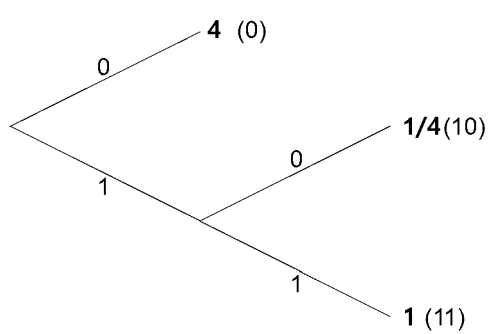
FIG. 12

*Case 1*
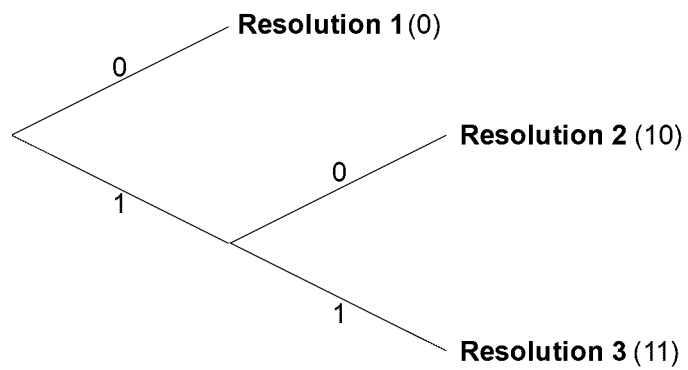
*Case 2*
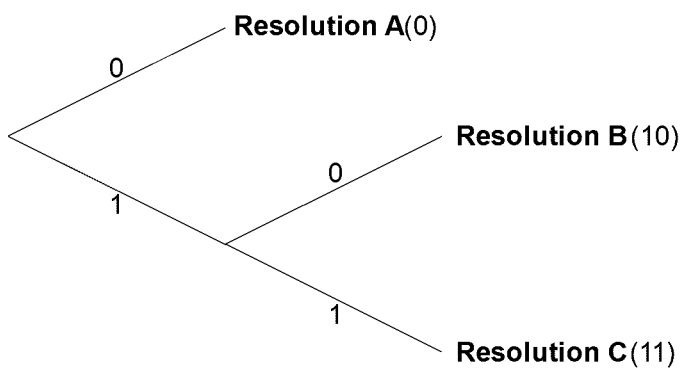
*FIG. 13*

2801

Syntax order
|MVD|
(MVD sign)
MVP flag
MVD resolution

1. Parse |MVD|
2. For all (MVP flag and MVD resolution)
   1. For (-) and (+)
      1. Check whether reference block is in the boundary
3. If reference block is outside of the boundary for all (MVP flag and MVD resolution), no MVD sign; otherwise, MVD sign

2802

Syntax order
|MVD|
MVD resolution
(MVD sign)
MVP flag

1. Parse |MVD| and MVD resolution
2. For all MVP flag
   1. For (-) and (+)
      1. Check whether reference block is in the boundary
3. If reference block is outside of the boundary for all MVP flag, no MVD sign; otherwise, MVD sign

2803

Syntax order
MVD resolution
|MVD|
MVP flag
(MVD sign)

1. Parse MVD resolution, |MVD| and MVP flag
2. For (-) and (+)
   1. Check whether reference block is in the boundary
3. If reference block is outside of the boundary, no MVD sign; otherwise, MVD sign

*FIG. 28*

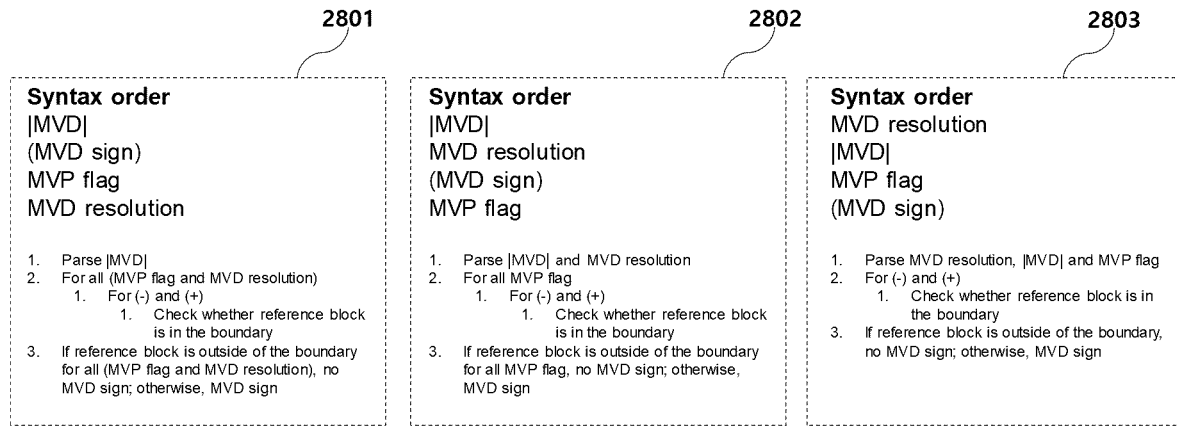

| MVR Index | 0 | 1 | 2 | 3 | 4 |
|---|---|---|---|---|---|
| Resolution (R) in pel | 1/4 | 1/2 | 1 | 2 | 4 |
| $N^{th}$ MVP | $1^{st}$ MVP | $2^{nd}$ MVP | $3^{rd}$ MVP | $4^{th}$ MVP | $5^{th}$ MVP |

*FIG. 29*

$$MV = MVP + R1*MVDval1 + R2*MVDval2$$

*FIG. 30*

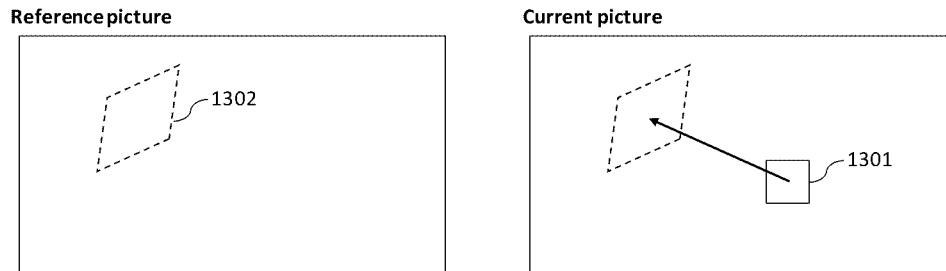

*FIG. 31*

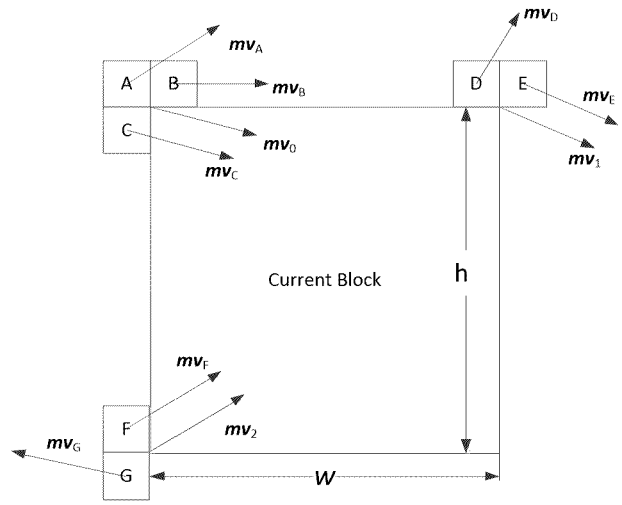

FIG. 38

- If only $\overline{mv}_0$ and $\overline{mv}_1$ can be found, $\overline{mv}_2$ is derived as:

$$\overline{mv}_2^x = \overline{mv}_0^x - h\frac{\left(\overline{mv}_1^y - \overline{mv}_0^y\right)}{w},$$

$$\overline{mv}_2^y = \overline{mv}_0^y + h\frac{(\overline{mv}_1^x - \overline{mv}_0^x)}{w},$$

where the current block size is $W \times H$.

- If only $\overline{mv}_0$ and $\overline{mv}_2$ can be found, $\overline{mv}_1$ is derived as:

$$\overline{mv}_1^x = \overline{mv}_0^x + h\frac{(\overline{mv}_2^y - \overline{mv}_0^y)}{w},$$

$$\overline{mv}_1^y = \overline{mv}_0^y - h\frac{(\overline{mv}_2^x - \overline{mv}_0^x)}{w}.$$

FIG. 39

(a)  $mv_0 = \overline{mv}_0 + mvd_0$
     $mv_1 = \overline{mv}_1 + mvd_1$ (b)  $mv_0 = \overline{mv}_0 + mvd_0$
     $mv_1 = \overline{mv}_1 + mvd_1$
     $mv_2 = \overline{mv}_2 + mvd_2$

FIG. 40 lMvd[ compIdx ] = abs_mvd_greater0_flag[ compIdx ] *
                ( abs_mvd_minus2[ compIdx ] + 2 ) * ( 1 − 2 * mvd_sign_flag[ compIdx ] )

- If refList is equal to 0, MvdL0[ x0 ][ y0 ][ compIdx ] is set equal to lMvd[ compIdx ] for compIdx = 0..1.
- Otherwise (refList is equal to 1), MvdL1[ x0 ][ y0 ][ compIdx ] is set equal to lMvd[ compIdx ] for compIdx = 0..1.

*FIG. 41*

(a) $$mv_0 = \overline{mv}_0 + mvd_0$$
$$mv_1 = \overline{mv}_1 + mvd_1' + mvd_0$$

(b) $$mv_0 = \overline{mv}_0 + mvd_0$$
$$mv_1 = \overline{mv}_1 + mvd_1' + mvd_0$$
$$mv_2 = \overline{mv}_2 + mvd_2' + mvd_0$$

*FIG. 42* lMvd[ cpIdx ][ compIdx ] = abs_mvd_greater0_flag[ cpIdx ][ compIdx ] *
                ( abs_mvd_minus2[ cpIdx ][ compIdx ] + 2 ) * ( 1 − 2 * mvd_sign_flag[ cpIdx ][ compIdx ] )

If cpIdx is equal to 0, MvdLX[x0][y0][cpIdx][compIdx] is set equal to lMvd[cpIdx][compIdx]

Otherwise, MvdLX[x0][y0][cpIdx][compIdx] is set equal to lMvd[cpIdx][compIdx] + lMvd[0][compIdx]

*FIG. 43*

| mvd_coding( x0, y0, refList , cpIdx ) { | Descriptor |
|---|---|
| abs_mvd_greater0_flag[cpIdx][ 0 ] | ae(v) |
| abs_mvd_greater0_flag[cpIdx][ 1 ] | ae(v) |
| if( abs_mvd_greater0_flag[cpIdx][ 0 ] ) | |
|   abs_mvd_greater1_flag[cpIdx][ 0 ] | ae(v) |
| if( abs_mvd_greater0_flag[cpIdx][ 1 ] ) | |
|   abs_mvd_greater1_flag[cpIdx][ 1 ] | ae(v) |
| if( abs_mvd_greater0_flag[cpIdx][ 0 ] ) { | |
|   if( abs_mvd_greater1_flag[cpIdx][ 0 ] ) | |
|     abs_mvd_minus2[cpIdx][ 0 ] | ae(v) |
|   mvd_sign_flag[cpIdx][ 0 ] | ae(v) |
| } | |
| if( abs_mvd_greater0_flag[cpIdx][ 1 ] ) { | |
|   if( abs_mvd_greater1_flag[cpIdx][ 1 ] ) | |
|     abs_mvd_minus2[cpIdx][ 1 ] | ae(v) |
|   mvd_sign_flag[cpIdx][ 1 ] | ae(v) |
| } | |
| } | |

FIG. 44

$$mv_0 = \overline{mv}_0 + mvdp + mvd_0''$$
$$mv_1 = \overline{mv}_1 + mvdp + mvd_1''$$
$$mv_2 = \overline{mv}_2 + mvdp + mvd_2''$$

FIG. 45

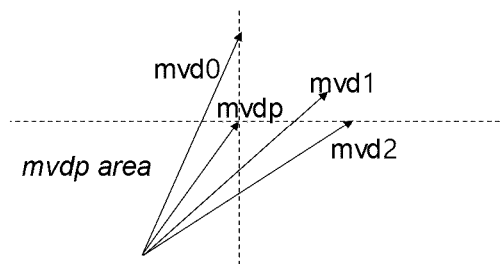

FIG. 46

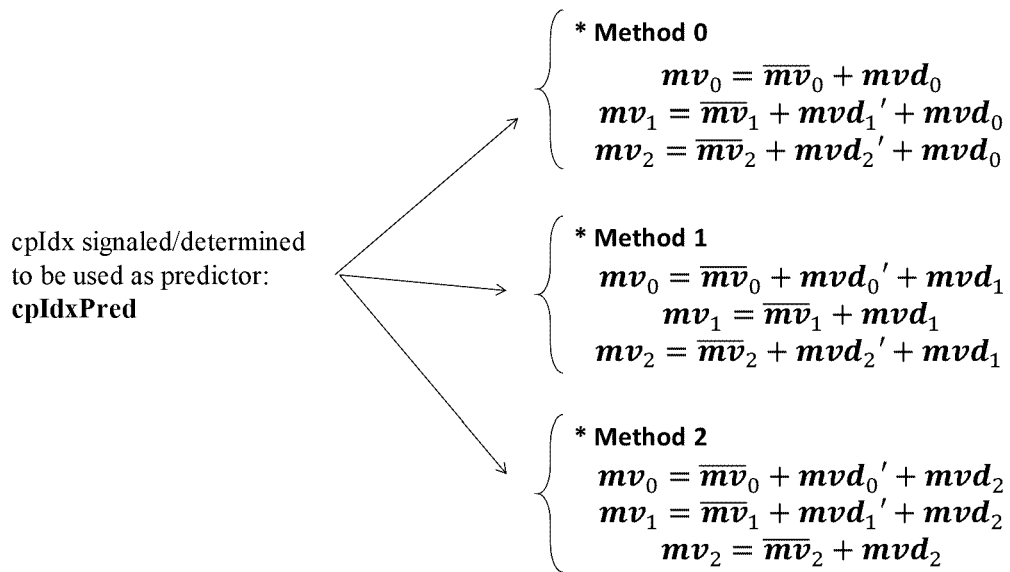
FIG. 47
cpIdx signaled/determined to be used as predictor: cpIdxPred
If cpIdx is equal to cpIdxPred, MvdLX[x0][y0][cpIdx][compIdx] is set equal to lMvd[cpIdx][compIdx]
Otherwise, MvdLX[x0][y0][cpIdx][compIdx] is set equal to lMvd[cpIdx][compIdx] + lMvd[cpIdxPred][compIdx]
FIG. 48
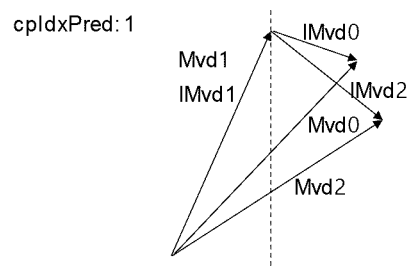
FIG. 49

| mvd_coding( x0, y0, refList , cpIdx ) { | Descriptor |
|---|---|
|   abs_mvd_greater0_flag[cpIdx][ 0 ] | ae(v) |
|   abs_mvd_greater0_flag[cpIdx][ 1 ] | ae(v) |
|   if( abs_mvd_greater0_flag[cpIdx][ 0 ] ) | |
|     abs_mvd_greater1_flag[cpIdx][ 0 ] | ae(v) |
|   if( abs_mvd_greater0_flag[cpIdx][ 1 ] ) | |
|     abs_mvd_greater1_flag[cpIdx][ 1 ] | ae(v) |
|   if( abs_mvd_greater0_flag[cpIdx][ 0 ] ) { | |
|     if( abs_mvd_greater1_flag[cpIdx][ 0 ] ) | |
|       abs_mvd_minus2[cpIdx][ 0 ] | ae(v) |
|     if( cpIdx == cpIdxPred[0] ) | |
|       mvd_sign_flag[cpIdx][ 0 ] | ae(v) |
|   } | |
|   if( abs_mvd_greater0_flag[cpIdx][ 1 ] ) { | |
|     if( abs_mvd_greater1_flag[cpIdx][ 1 ] ) | |
|       abs_mvd_minus2[cpIdx][ 1 ] | ae(v) |
|     if( cpIdx == cpIdxPred[1] ) | |
|       mvd_sign_flag[cpIdx][ 1 ] | ae(v) |
|   } | |
| } | |

FIG. 50

If cpIdx is equal to cpIdxPred,
lMvd[ cpIdx ][ compIdx ] = abs_mvd_greater0_flag[ cpIdx ][ compIdx ] *
                      ( abs_mvd_minus2[ cpIdx ][ compIdx ] + 2 ) * ( 1 − 2 * mvd_sign_flag[ cpIdx ][ compIdx ] )

Otherwise,
lMvd[ cpIdx ][ compIdx ] = abs_mvd_greater0_flag[ cpIdx ][ compIdx ] *( abs_mvd_minus2[ cpIdx ][ compIdx ] + 2 )

FIG. 51

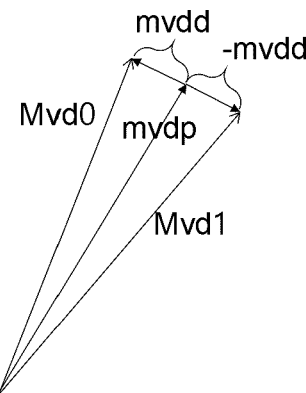

FIG. 52

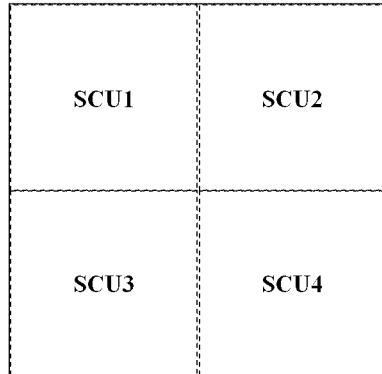
(a) Square Sub-CUs in Square Block
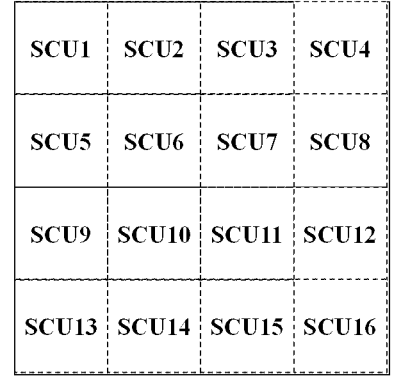
(b) Square Sub-CUs in Square Block
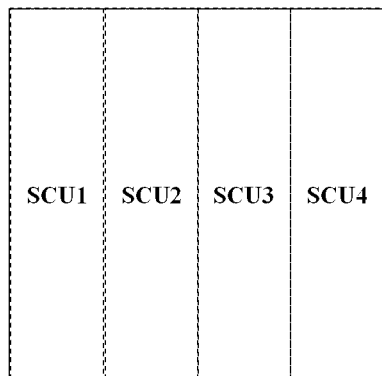
(c) Vertical Sub-CUs in Squre Block
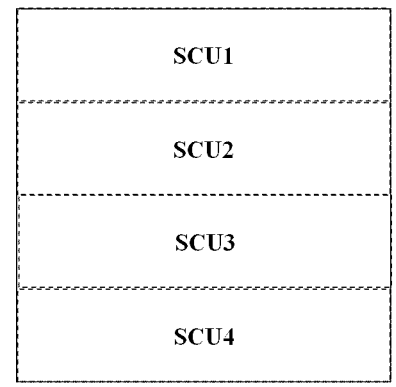
(d) Horizontal Sub-CUs in Square Block
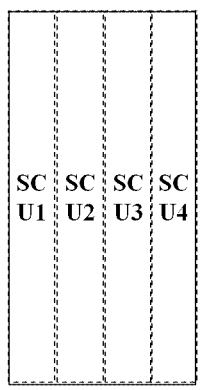
(e) Vertical Sub-CUs in Vertical Block
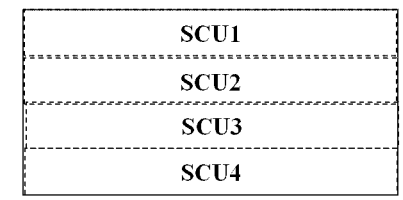
(f) Horizontal Sub-CUs in Horizontal Block
FIG. 53

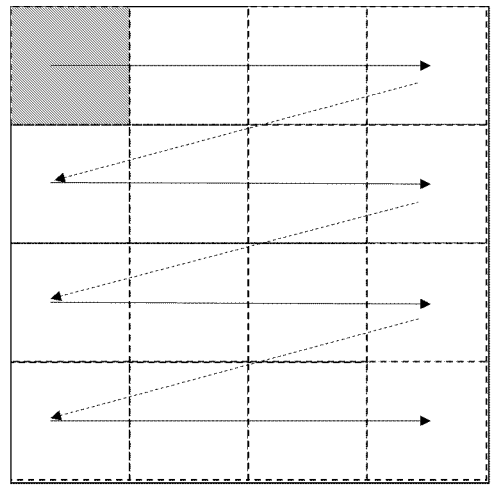
(a)
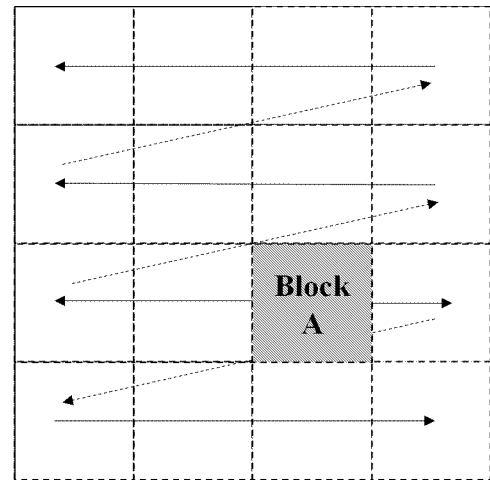
(b)
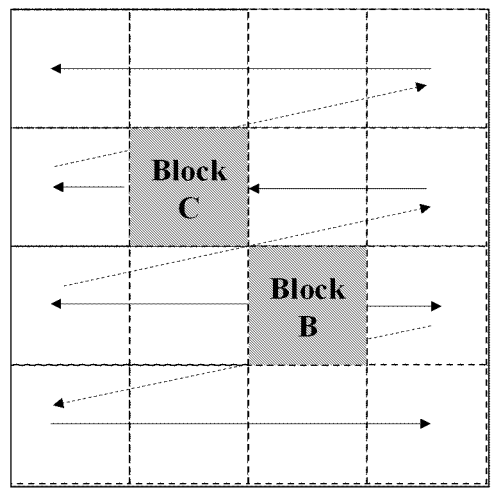
(c)
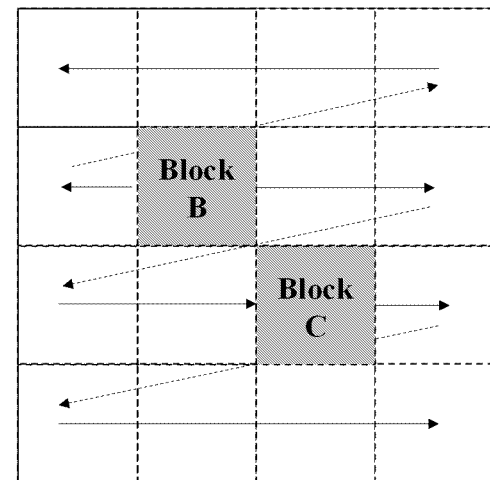
(d)
*FIG. 58*

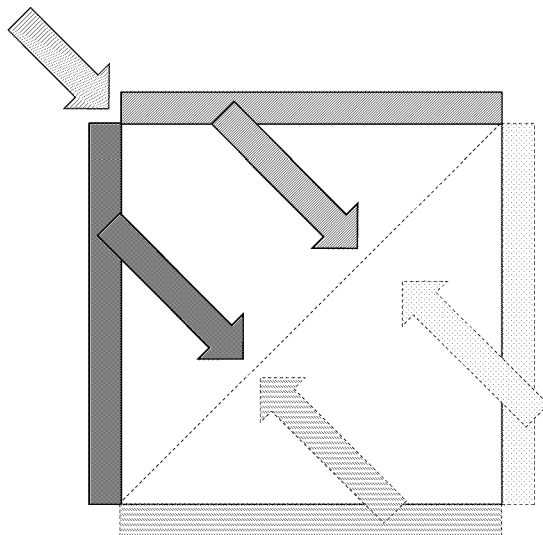
(a)
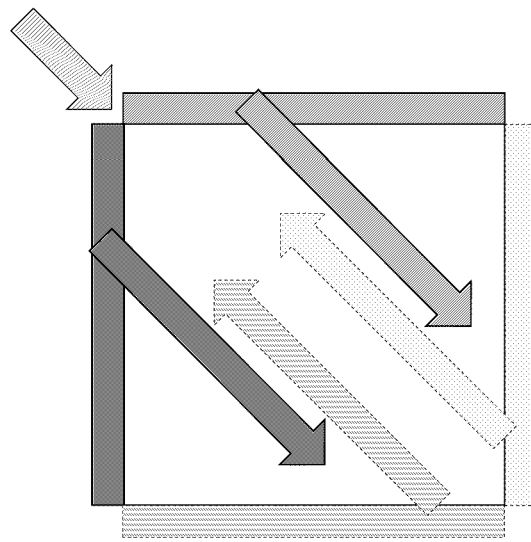
(b)
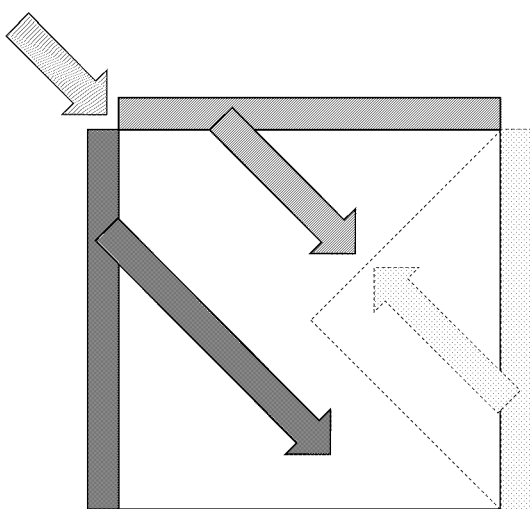
(c)
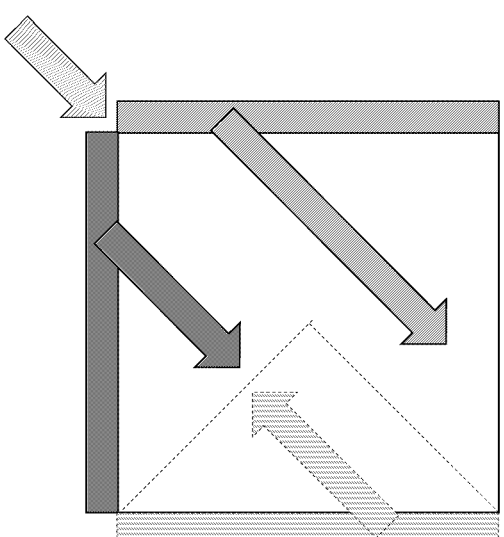
(d)
*FIG. 59*

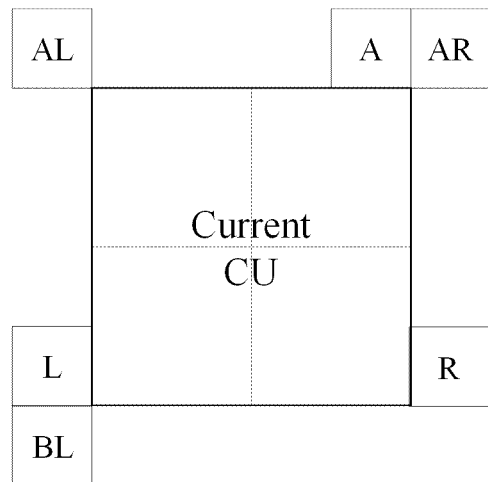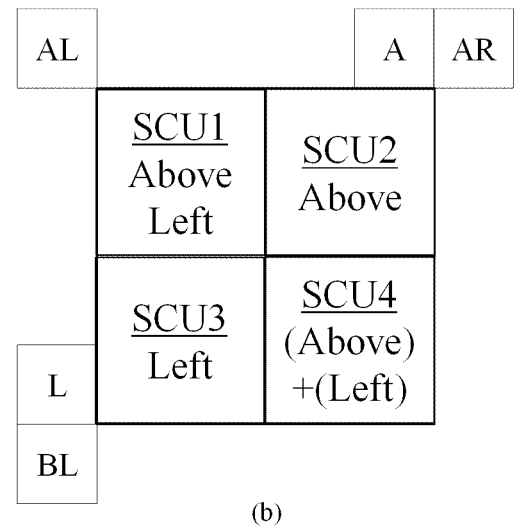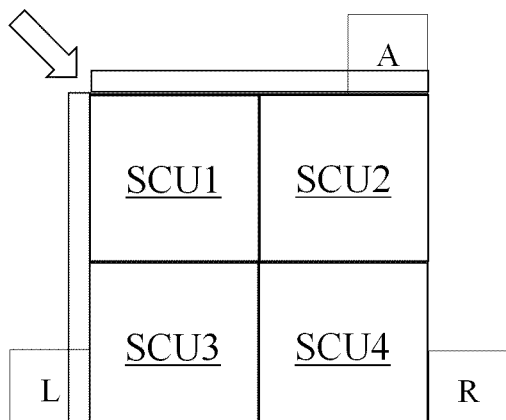
FIG. 60

VIDEO SIGNAL PROCESSING METHOD AND APPARATUS USING ADAPTIVE MOTION VECTOR RESOLUTION

CROSS-REFERENCE TO RELATED APPLICATIONS

This application is a continuation of pending U.S. application Ser. No. 17/460,117, which was filed on Aug. 27, 2021, which is a continuation of U.S. application Ser. No. 17/113,215, which was filed on Dec. 7, 2020, now issued as U.S. Pat. No. 11,166,040 on Nov. 2, 2021, which is a continuation of PCT International Application No. PCT/KR2019/006913, which was filed on Jun. 7, 2019, which claims priority under 35 U.S.C 119(a) to Korean Patent Application No. 10-2018-0065688 filed with the Korean Intellectual Property Office on Jun. 7, 2018, Korean Patent Application No. 10-2018-0067864 filed with the Korean Intellectual Property Office on Jun. 14, 2018, Korean Patent Application No. 10-2018-0078513 filed with the Korean Intellectual Property Office on Jul. 6, 2018, and Korean Patent Application No. 10-2018-0091270 filed with the Korean Intellectual Property Office on Aug. 6, 2018. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DETAILED DESCRIPTION OF THE INVENTION

Technical Problem

An aspect of the present disclosure is to increase coding efficiency of a video signal. Further, another aspect of the present disclosure is to increase signaling efficiency related to a motion information set of a current block.

Technical Solution

In order to solve the problems, the present disclosure provides a video signal processing apparatus and a video signal processing method.

In accordance with an aspect of the present disclosure, a method of processing a video signal comprising: configuring a Motion Vector Prediction (MVP) candidate list for motion compensation of a current block through one of a first method and a second method; acquiring a motion vector predictor of the current block, based on the configured MVP candidate list; acquiring a motion vector differential value indicating a difference between a motion vector of the current block and the motion vector predictor; modifying the motion vector differential value, based on a resolution of the motion vector differential value of the current block, wherein the resolution of the motion vector differential value is one of a plurality of available resolutions included in a resolution set and configurations of the plurality of available resolutions included in the resolution set vary depending on a method used for configuring the MVP candidate list of the current block between the first method and the second method; acquiring the motion vector of the current block, based on the motion vector predictor and the modified motion vector differential value; and reconstructing the current block, based on the acquired motion vector.

In accordance with another aspect of the present disclosure, an apparatus for decoding a video signal includes a processor, wherein the processor is configured to: configure a Motion Vector Prediction (MVP) candidate list for motion compensation of a current block through one of a first method and a second method; acquire a motion vector predictor of the current block, based on the configured MVP candidate list; acquire a motion vector differential value indicating a difference between a motion vector of the current block and the motion vector predictor; modify the motion vector differential value, based on a resolution of the motion vector differential value of the current block, wherein the resolution of the motion vector differential value is one of a plurality of available resolutions included in a resolution set and configurations of the plurality of available resolutions included in the resolution set vary depending on a method used for configuring the MVP candidate list of the current block between the first method and the second method; acquire the motion vector of the current block, based on the motion vector predictor and the modified motion vector differential value; and reconstruct the current block, based on the acquired motion vector.

The resolution of the motion vector differential value may be acquired from one of a first resolution set and a second resolution set according to the method used for configuring the MVP candidate list of the current block between the first method and the second method, and the second resolution set may include at least one of available resolutions other than the plurality of available resolutions included in the first resolution set.

When the MVP candidate list is configured using the first method based on an affine model, the resolution of the motion vector differential value may be acquired from the first resolution set, and when the MVP candidate list is configured using the second method, which is not based on the affine model, the resolution of the motion vector differential value may be acquired from the second resolution set.

A largest first available resolution among the plurality of available resolutions included in the first resolution set may be smaller than a largest second available resolution among the plurality of available resolutions included in the second resolution set.

The processor may acquire an indicator indicating the resolution of the motion vector differential value of the current block among the plurality of available resolutions included in one of the first resolution set and the second resolution set, and modify the motion vector differential value, based on the resolution indicated by the indicator. In this case, when a value of the indicator is a first value, the resolution indicated by the first value may vary depending on a method of configuring the MVP candidate list between the first method and the second method.

The first value may indicate a first available resolution, which is one of the available resolutions included in the first resolution set, when the MVP candidate list is configured using the first method, the first value may indicate a second available resolution, which is one of the available resolutions included in the second resolution set, when the MVP candidate list is configured using the second method, and the first available resolution and the second available resolution may be different from each other.

Both the first resolution set and the second resolution set may include the first available resolution, and when the MVP candidate list is configured using the second method, the first available resolution may be indicated by a second value, which is a value different from the first value of the indicator.

The indicator may be expressed by variable-length bits, and the first value may be one of a plurality of values expressed by the variable-length bits.

A third value different from the first value of the indicator may be a value expressed by shortest length bits among the plurality of values, the third value may indicate a smallest available resolution among a plurality of available resolution sets included in the second resolution set when the MVP candidate list is configured using the second method, and the third value may indicate an available resolution other than a smallest available resolution among a plurality of available resolution sets included in the first resolution set when the MVP candidate list is configured using the first method.

In accordance with another aspect of the present disclosure, an apparatus for encoding a video signal includes a processor, wherein the processor is configured to: acquire a motion vector of the current block, based on a location of a reference block referred to for motion compensation of the current block, configure a Motion Vector Prediction (MVP) candidate list for motion compensation of the current block through one of a first method and a second method, acquire a motion vector differential value, based on a difference between one of a plurality of candidates included in the MVP candidate list and the motion vector of the current block, determine a signaled motion vector differential value, based on a resolution of the motion vector differential value of the current block, the resolution of the motion vector differential value is one of a plurality of available resolutions included in a resolution set and configurations of the plurality of available resolutions included in the resolution set vary depending on a method used for configuring the MVP candidate list of the current block between the first method and the second method, and generate a bitstream including the signaled motion vector differential value.

The processor may determine an indicator indicating one of a plurality of available resolutions included in one of the first resolution set and the second resolution set, and generate a bitstream including the indicator and the signaled motion vector differential value. In this case, when a value of the indicator is a first value, the resolution indicated by the first value may vary depending on a method of configuring the MVP candidate list between the first method and the second method.

In accordance with another aspect of the present disclosure, a computer-readable recording medium storing a bitstream is provided. The bitstream includes: a modified motion vector differential value of a current block modified, based on a resolution of a motion vector differential value of the current block, wherein the resolution of the motion vector differential value is one of a plurality of available resolutions included in a resolution set and configurations of the plurality of available resolutions included in the resolution set vary depending on a method used for configuring a Motion Vector Prediction (MVP) candidate list for motion compensation of the current block between a first method and a second method.

The bitstream may further include an indicator indicating a resolution of the motion vector differential value of the current block among a plurality of available resolutions included in one of the first resolution set and the second resolution set. In this case, when a value of the indicator is a first value, the resolution indicated by the first value may vary depending on a method of configuring the MVP candidate list between the first method and the second method.

Advantageous Effects

According to an embodiment of the present disclosure, it is possible to increase coding efficiency of a video signal. Further, according to an embodiment of the present disclosure, it is possible to increase signaling efficiency of inter prediction of a current block.

BRIEF DESCRIPTION OF THE DRAWINGS

FIGS. 11 and 12 illustrate the method of signaling the resolution of the motion vector differential value of the current block according to another embodiment of the present disclosure.

FIG. 13 illustrates an embodiment in which the configuration of available resolutions included in a resolution set is different.

FIG. 28 illustrates an example of syntax for embodiments of FIGS. 25 to 27.

FIG. 29 illustrates a method of signaling a resolution of a motion vector differential value of a current block and a motion vector predictor according to an embodiment of the present disclosure.

FIG. 30 illustrates a method of inducing a motion vector of a current block on the basis of a plurality of motion vector differential values according to an embodiment of the present disclosure.

FIG. 31 illustrates motion compensation based on an affine model according to an embodiment of the present disclosure.

FIGS. 35, 36, 37, and 38 illustrate embodiments of a method of acquiring a control point motion vector set for predicting a current block.

FIG. 39 illustrates a method of acquiring the control point motion vector of the current block according to another embodiment of the present disclosure.

FIG. 40 illustrates a method of acquiring a control point motion vector of a current block according to an embodiment of the present disclosure.

FIG. 41 illustrates a method of signaling a control point motion vector differential value of a current block according to an embodiment of the present disclosure.

FIG. 42 illustrates a method of acquiring the control point motion vector of the current block according to another embodiment of the present disclosure.

FIG. 43 illustrates a method of signaling the control point motion vector differential value when the control point motion vector of the current block is acquired according to the embodiment described with reference to FIG. 42.

FIG. 44 illustrates a method of signaling a control point motion vector differential value of a current block according to an embodiment of the present disclosure.

FIG. 45 illustrates a method of acquiring a motion vector through a differential predictor for a control point motion vector differential value of a current block according to an embodiment of the present disclosure.

FIG. 46 illustrates a method of acquiring a control point motion vector of a current block through a differential predictor according to an embodiment of the present disclosure.

FIG. 47 illustrates a method of acquiring the control point motion vector of the current block through the differential predictor according to another embodiment of the present disclosure.

FIG. 48 illustrates a method of acquiring a differential predictor according to an embodiment of the present disclosure.

FIG. 49 illustrates a method of determining a differential vector predictor of a current block according to an embodiment of the present disclosure.

FIG. 50 illustrates a method of signaling a control point motion vector differential value of a current block.

FIG. 51 illustrates a method of inducing the control point motion vector of the current block according another embodiment of the present disclosure;

FIG. 52 illustrates a method of inducing a plurality of control point motion vectors for affine motion compensation of a current block according to an embodiment of the present disclosure.

FIG. 53 illustrates various embodiments of the form in which the current block is split into a plurality of subblocks.

FIG. 58 illustrates the sequence of processing coding tree units according to an embodiment of the present disclosure.

FIG. 59 illustrates a bi-directional intra prediction method according to an embodiment of the present disclosure.

FIG. 60 illustrates a method of predicting each of a plurality of subblocks split from a current block according to an embodiment of the present disclosure.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
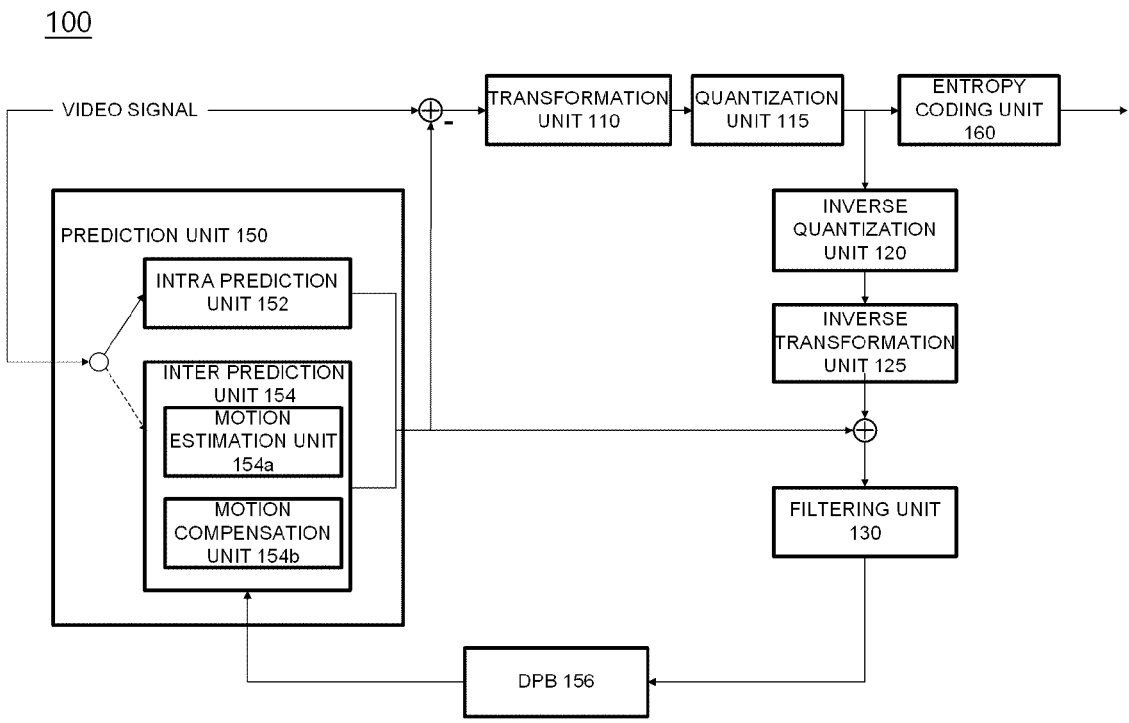
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information set (reference picture index, motion vector information, etc.) on the reference region to the entropy coding unit 160. The motion compensation unit 154b performs motion compensation using the motion vector value transmitted from the motion estimation unit 154a. The inter prediction unit 154 transmits inter encoding information including motion information set on a reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value indicating a reference area used for predicting a current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
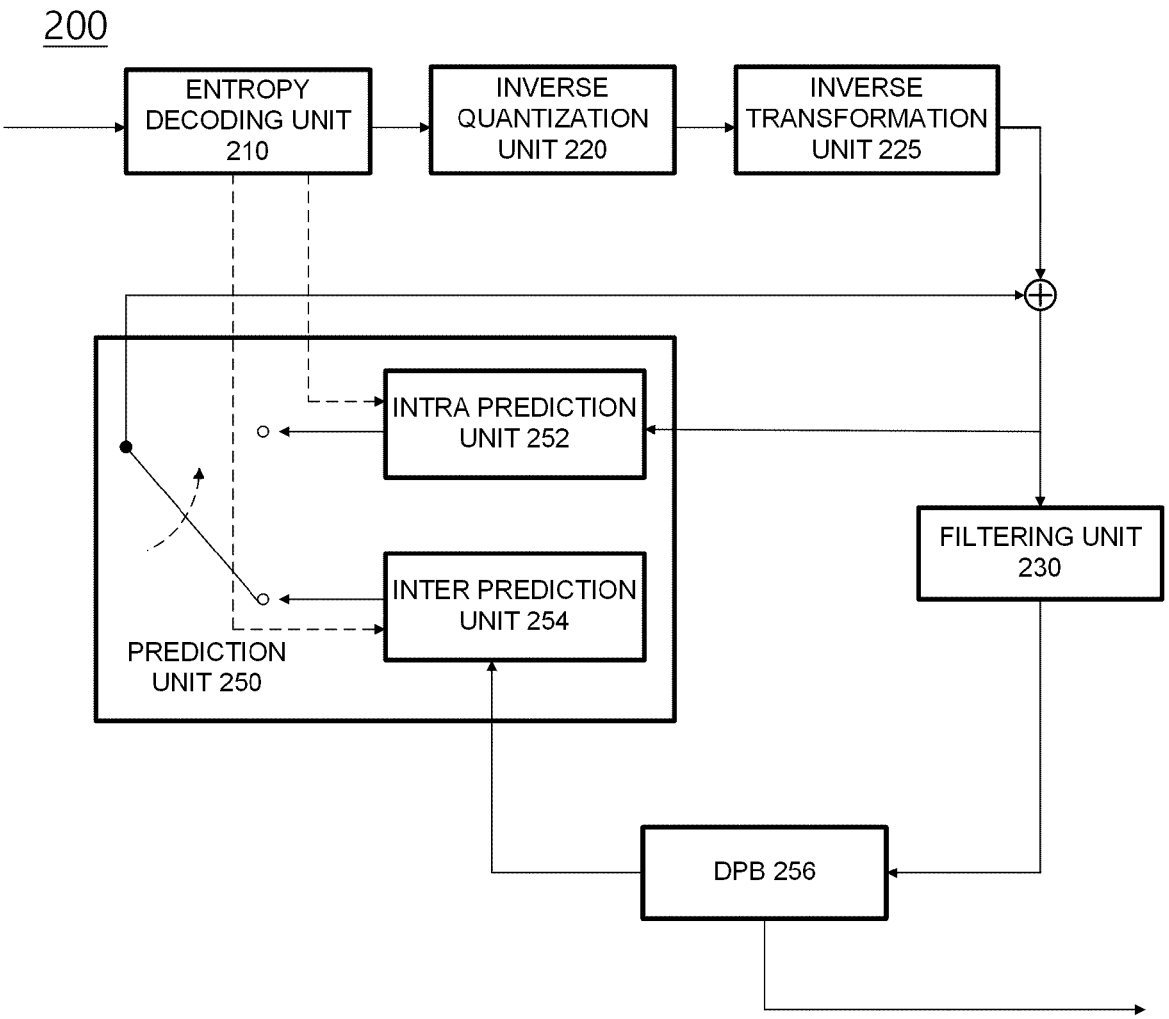
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream, and extracts transform coefficients, intra encoding information, and inter encoding information for each region. The inverse quantization unit 220 inverse-quantizes the entropy decoded transform coefficient, and the inverse transformation unit 225 reconstructs the residual value using the inverse quantized transform coefficient. The video signal processing apparatus 200 reconstructs the original pixel value by adding the residual value obtained in the inverse transformation unit 225 and the predictor obtained in the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs only intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples adjacent to a left boundary of the current block and/or samples may be samples adjacent to an upper boundary. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra-BC prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value of the current area indicating a specific area within the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

The reconstructed video picture is generated by adding the predictor outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
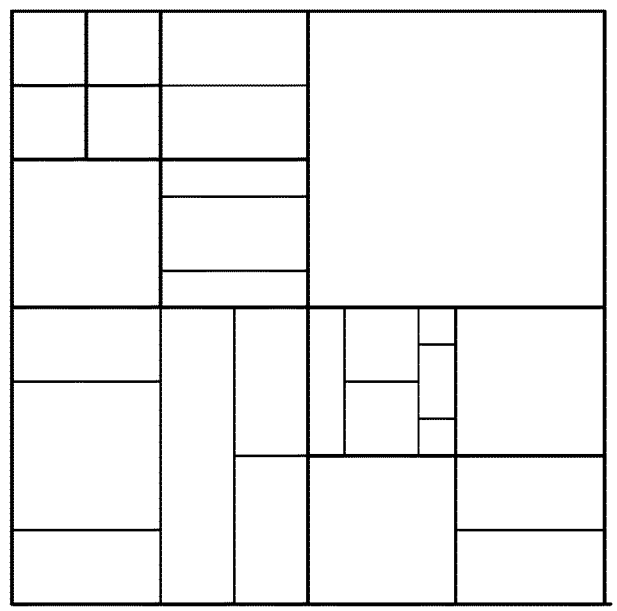
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTtSize: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
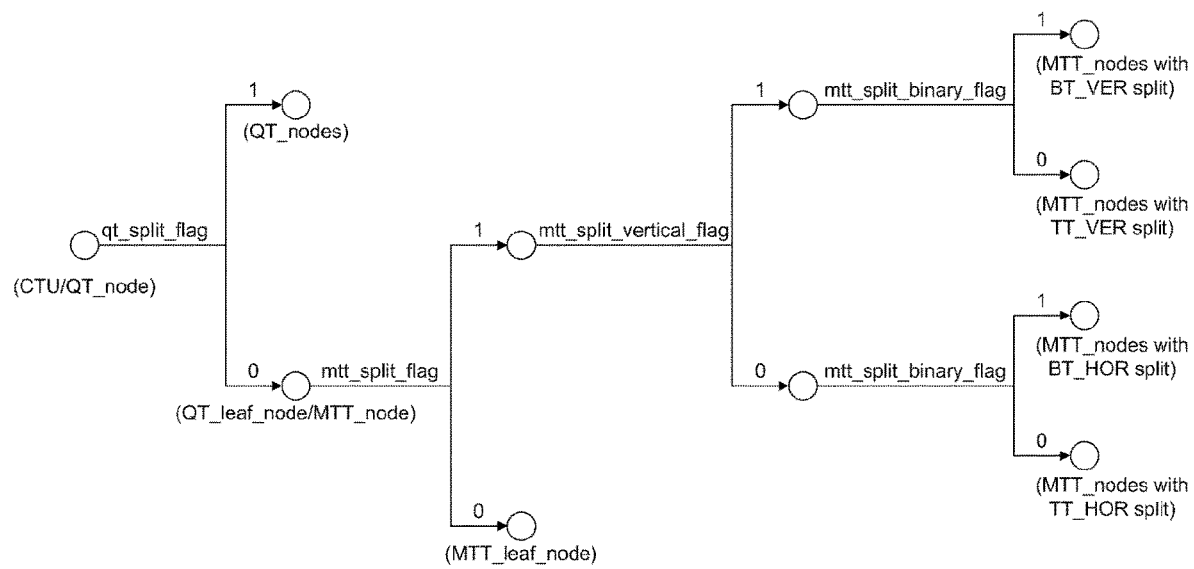
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
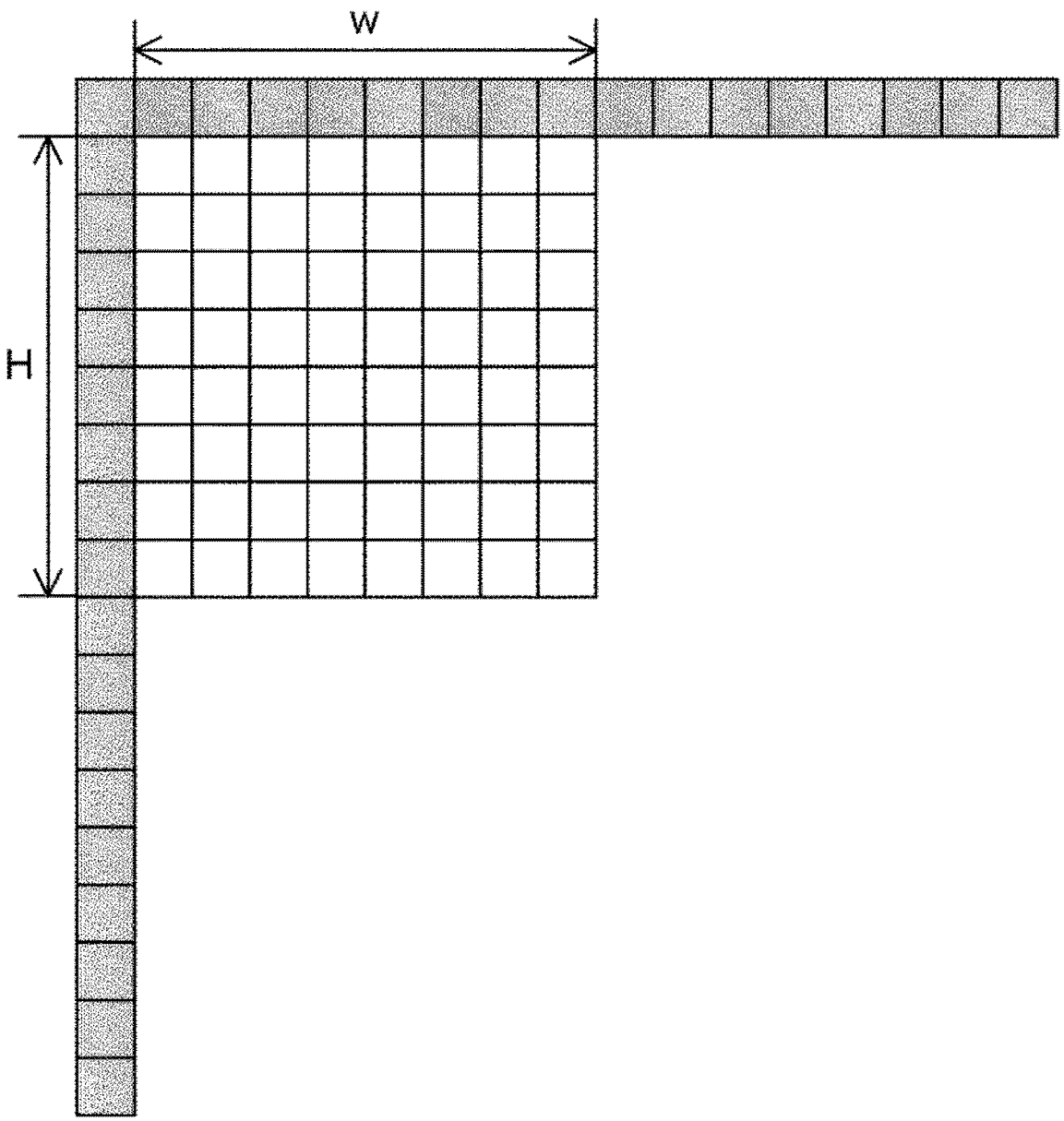
FIGS. 5 and 6 illustrate an intra-prediction method in more detail according to an embodiment of the present disclosure.
Figure 6:
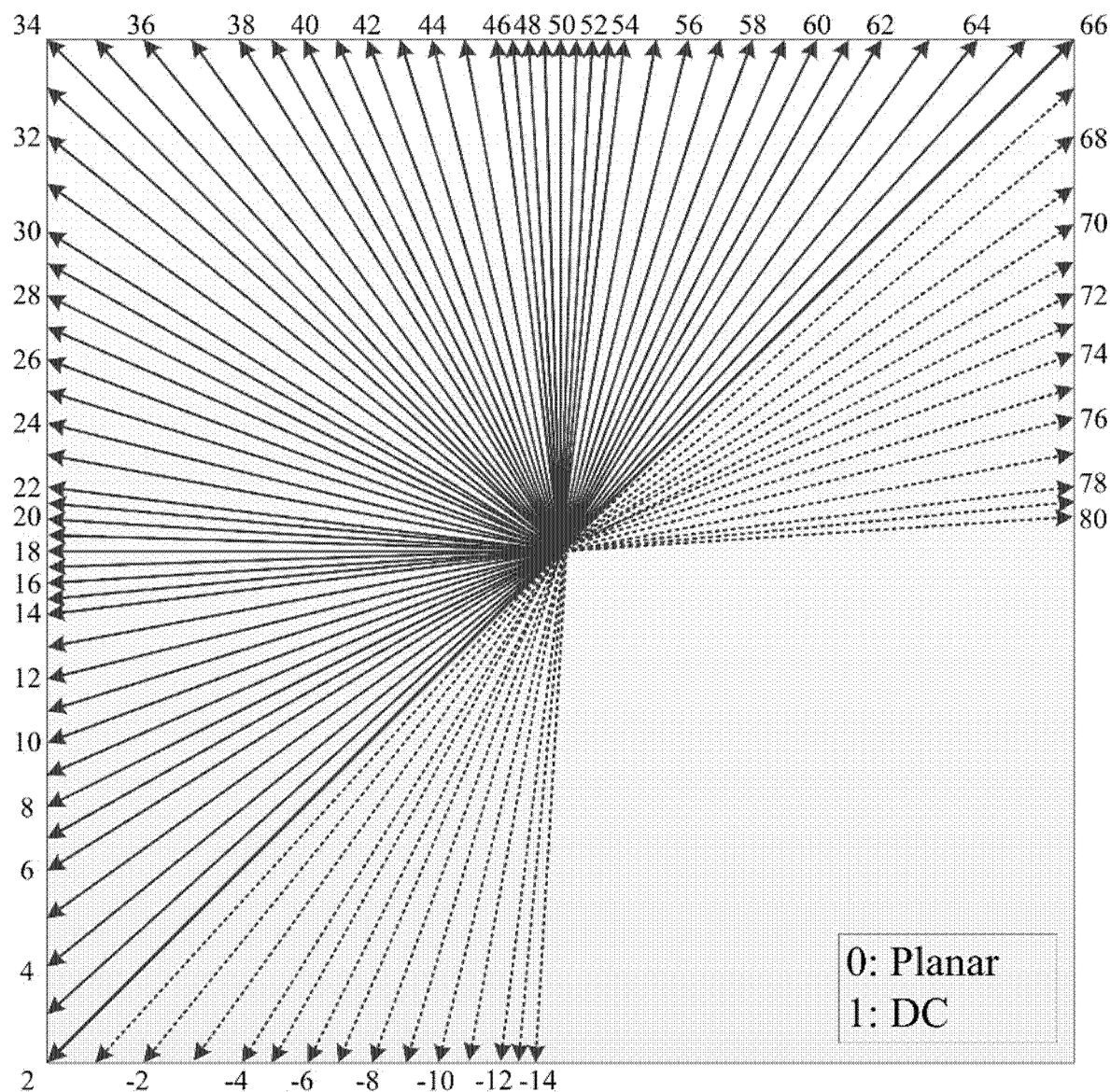

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

According to a further embodiment of the present invention, samples on a plurality of reference lines may be used for intra prediction of the current block. The plurality of reference lines may consist of n lines located within a predetermined distance from the boundary of the current block. In this case, separate reference line information indicating at least one reference line used for intra prediction of the current block may be signaled. Specifically, the reference line information may include an index indicating any one of a plurality of reference lines.

In addition, if at least some of the samples to be used as reference samples have not yet been reconstructed, the intra-prediction unit may perform a reference sample padding process to obtain reference samples. In addition, the intra-prediction unit may perform a reference sample filtering process in order to reduce errors in intra-prediction. That is, the intra-prediction unit may perform filtering on neighboring samples and/or the reference samples obtained by the reference sample padding process, thereby obtaining filtered reference samples. The intra-prediction unit predicts samples of the current block using unfiltered reference samples or filtered reference samples. In the present disclosure, neighboring samples may include samples on at least one reference line. For example, neighboring samples may include adjacent samples on a line adjacent to a boundary of the current block.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). In some embodiments, the intra prediction mode set may consist of some of all intra prediction modes. Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Hereinafter, an inter prediction method according to an embodiment of the present disclosure is described with reference to FIG. 7. In the present disclosure, the inter prediction method may include a general inter prediction method optimized for translation motion and an inter prediction method based on an affine model described below with reference to FIGS. 31 to 52. Further, the motion vector may include at least one of a general motion vector for motion compensation according to the general inter prediction method and a control point motion vector for affine compensation.

Figure 7:
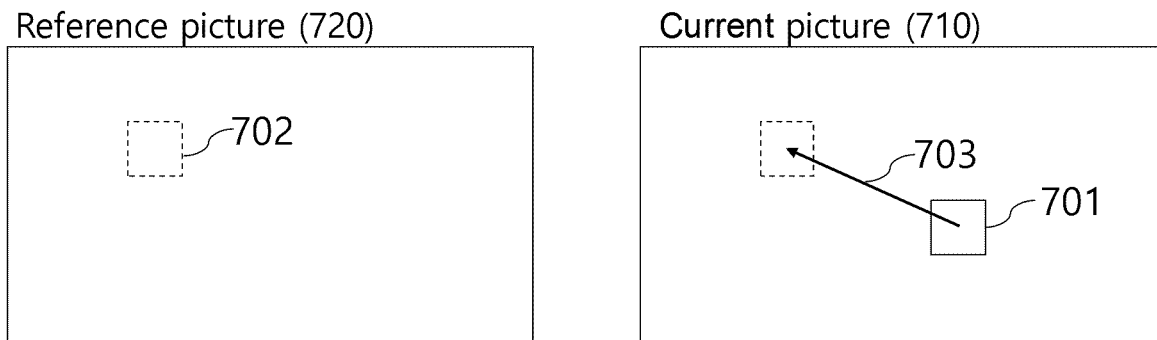
FIG. 7 illustrates an inter prediction method according to an embodiment of the present disclosure.

FIG. 7 illustrates an inter prediction method according to an embodiment of the present disclosure. As described above, the decoder may predict the current block with reference to reconstructed samples of another decoded picture. Referring to FIG. 7, the decoder acquires a reference block 702 within a reference picture 720 on the basis of a motion information set of a current block 701. In this case, the motion information set may include a reference picture index and a motion vector 703. The reference picture index indicates a reference picture 720 including a reference block for inter prediction of the current block in a reference picture list. According to an embodiment, the reference picture list may include at least one of the L0 picture list or the L1 picture list. The motion vector 703 indicates an offset between a coordinate value of the current block 701 within the current picture 710 and a coordinate value of the reference block 702 within the reference picture 720. The decoder acquires a predictor of the current block 701 on the basis of sample values of the reference block 702 and reconstructs the current block 701 using the predictor.

Specifically, the encoder may acquire the reference block by searching for blocks similar to the current block in pictures having a higher restoration sequence. For example, the encoder may search for a reference block having a minimum sum of differences in sample values from the current block within a preset search area. In this case, in order to measure similarity between the current block and samples of the reference block, at least one of Sum of Absolute Difference (SAD) and Sum of Hadamard Transformed Difference (SATD) may be used. Here, the SAD may be a value obtained by adding all of absolute values of differences in sample values included in two blocks. Further, the SATD may be a value obtained by adding all of absolute values of Hadamard transform coefficients acquired through Hadamard transform of differences in sample values included in two blocks.

Meanwhile, the current block may be predicted using one or more reference areas. As described above, the current block may be inter-predicted through a pair prediction method using two or more reference areas. According to an embodiment, the decoder may acquire two reference blocks on the basis of two motion information sets of the current block. Further, the decoder may acquire a first predictor and a second predictor of the current block on the basis of sample values of the two acquired reference blocks. In addition, the decoder may reconstruct the current block using the first predictor and the second predictor. For example, the decoder may reconstruct the current block on the basis of an average for each of the samples of the first predictor and the second predictor.

As described above, for motion compensation of the current block, one or more motion information sets may be signaled. In this case, similarity between motion information sets for motion compensation of each of a plurality of blocks may be used. For example, the motion information set used for predicting the current block may be induced from motion information sets used for predicting one of other reconstructed samples. To this end, the encoder and the decoder may reduce signaling overhead. Hereinafter, various embodiments in which motion information sets of the current block are signaled are described.

Figure 8:
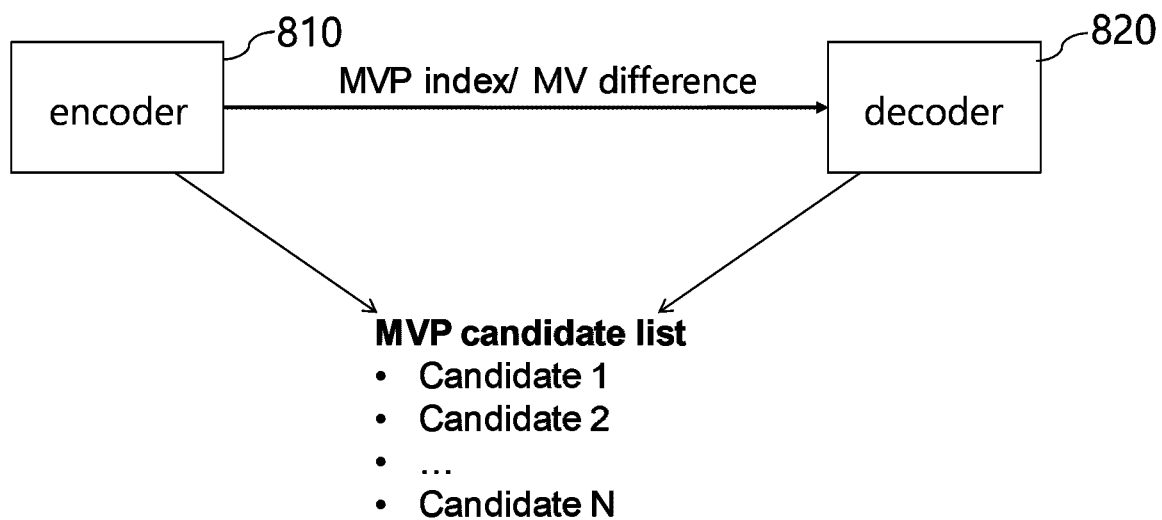
FIG. 8 illustrates a method of signaling a motion vector of a current block according to an embodiment of the present disclosure.

FIG. 8 illustrates a method of signaling a motion vector of the current block according to an embodiment of the present disclosure. According to an embodiment of the present disclosure, the motion vector of the current block may be induced from a Motion vector predictor (MVP) of the current block. According to an embodiment, the motion vector predictor, which is referred to for inducing the motion vector of the current block, may be acquired using a Motion vector predictor (MVP) candidate list. The MVP candidate list may include the preset number of MVP candidates (candidate 1, candidate 2, . . . , candidate N).

According to an embodiment, the MVP candidate list may include at least one of a spatial candidate or a temporal candidate. The spatial candidate may be a motion information set used for predicting neighboring blocks within a predetermined range from the current block within the current picture. The spatial candidate may be configured on the basis of available neighboring blocks among neighboring blocks of the current block. Further, the temporal candidate may be a motion information set used for predicting blocks within a picture different from the current picture. For example, the temporal candidate may be configured on the basis of a specific block corresponding to the location of the current block within a specific reference picture. In this case, the location of the specific block indicates the location of a top-left sample of the specific block within the reference picture. According to an additional embodiment, the MVP candidate list may include a zero motion vector. According to an additional embodiment, a rounding process for the MVP candidates included in the MVP candidate list of the current block may be performed. In this case, a resolution of a motion vector differential value of the current block described below may be used. For example, each of the MVP candidates of the current block may be rounded on the basis of a resolution of a motion vector differential value of the current block.

In the present disclosure, the MVP candidate list may include an Advanced Temporal Motion Vector Prediction (ATMVP) list, a merge candidate list for merge inter prediction, a control point motion vector candidate list for affine motion compensation, a temporal motion vector candidate list for subblock-based motion compensation (Subblock-based Temporal Motion Vector Prediction (STMVP)), and a combination thereof.

According to an embodiment, the encoder 810 and the decoder 820 may configure the MVP candidate list for motion compensation of the current block. For example, there may be candidates corresponding to samples that have the possibility of being predicted on the basis of a motion information set, which is the same as or similar to the motion information set of the current block, among samples reconstructed earlier than the current block. The encoder 810 and the decoder 820 may configure the MVP candidate list of the current block on the basis of the plurality of corresponding candidate blocks. In this case, the encoder 810 and the decoder 820 may configure the MVP candidate list according to a predefined rule between the encoder 810 and the decoder 820. That is, MVP candidate lists configured by the encoder 810 and the decoder 820 may be the same as each other.

Further, the predefined rule may vary depending on a prediction mode of the current block. For example, when the prediction mode of the current block is an affine model-based affine prediction mode, the encoder and the decoder may configure the MVP candidate list of the current block through a first method based on the affine model. The first method may be a method of acquiring a control point motion vector candidate list. This will be described in detail with reference to FIGS. 31 to 52. On the other hand, when the prediction mode of the current block is a general inter prediction mode which is not based on the affine model, the encoder and the decoder may configure the MVP candidate list of the current block through a second method which is not based on the affine model. In this case, the first method and the second method may be different methods.

The decoder 820 may induce a motion vector of the current block on the basis of one of at least one MVP candidate included in the MVP candidate list of the current block. For example, the encoder 810 may signal an MVP index indicating a motion vector predictor referred to for inducing the motion vector of the current block. The decoder 820 may acquire the motion vector predictor of the current block on the basis of the signaled MVP index. The decoder 820 may induce the motion vector of the current block through the motion vector predictor. According to an embodiment, the decoder 820 may use the motion vector predictor acquired from the MVP candidate list as the motion vector of the current block without any separate motion vector differential value. The decoder 820 may reconstruct the current block on the basis of the motion vector of the current block. The inter prediction mode in which the motion vector predictor acquired from the MVP candidate list is used as the motion vector of the current block without any separate motion vector differential value may be referred to as a merge mode.

According another embodiment, the decoder 820 may acquire a separate motion vector differential value (motion vector difference) for the motion vector of the current block. The decoder 820 may acquire the motion vector of the current block by adding the motion vector predictor acquired from the MVP candidate list and the motion vector differential value of the current block. In this case, the encoder 810 may signal a Motion vector differential value (MV difference) indicating a difference between the motion vector of the current block and the motion vector predictor. A method of signaling the motion vector differential value will be described in detail with reference to FIG. 9. The decoder 820 may acquire the motion vector of the current block on the basis of the motion vector differential value (MV difference). The decoder 820 may reconstruct the current block on the basis of the motion vector of the current block.

In addition, a reference picture index for motion compensation of the current block may be signaled. In a prediction mode of the current block, the encoder 810 may signal a reference picture index indicating a reference picture including a reference block. The decoder 820 may acquire a POC of the reference picture referred to for restoring the current block on the basis of the signaled reference picture index. In this case, the POC of the reference picture may be different from a POC of a reference picture corresponding to an MVP referred to for inducing the motion vector of the current block. In this case, the decoder 820 may perform motion vector scaling. That is, the decoder 820 may acquire an MVP' by scaling the MVP. In this case, the motion vector scaling may be performed on the basis of the POC of the current picture, the POC of the signaled reference picture of the current block, and the POC of the reference picture corresponding to the MVP. Further, the decoder 820 may use the MVP' as the motion vector predictor of the current block.

As described above, the motion vector of the current block may be acquired by adding the motion vector predictor of the current block and the motion vector differential value. In this case, the motion vector differential value may be signaled from the encoder. The encoder may generate information indicating the motion vector differential value by encoding the motion vector differential value and signal the information. Hereinafter, a method of signaling the motion vector differential value according to an embodiment of the disclosure will be described.

Figures 9, 10:
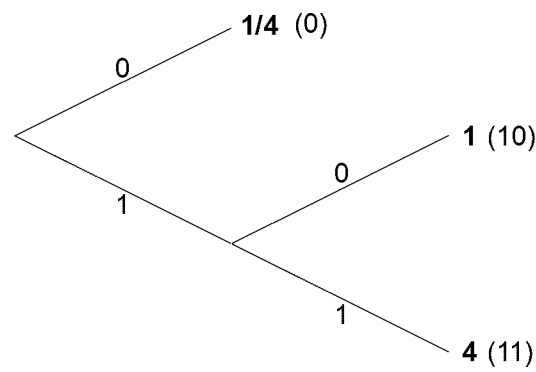
FIG. 9 illustrates a method of signaling a motion vector differential value of a current block according to an embodiment of the present disclosure.
FIG. 10 illustrates a method of signaling a resolution of a motion vector differential value of a current block according to an embodiment of the present disclosure.

FIG. 9 illustrates a method of signaling a motion vector differential value of the current block according to an embodiment of the disclosure. According to an embodiment, information indicating the motion vector differential value may include at least one piece of information on an absolute value of the motion vector differential value or information on a sign of the motion vector differential value. The absolute value and the sign of the motion vector differential value may be separately encoded.

According to an embodiment, the absolute value of the motion vector differential value itself may not be signaled. The encoder may reduce the size of the signaled value through at least one flag indicating a characteristic of the absolute value of the motion vector differential value. The decoder may induce the absolute value of the motion vector differential value through at least one flag from the signaled value.

For example, at least one flag may include a first flag indicating whether the absolute value of the motion vector differential value is larger than N. In this case, N may be an integer. When the size of the absolute value of the motion vector differential value is larger than N, the activated first flag and a value of (the absolute value of the motion vector differential value−N) may be signaled together. In this case, the activated flag may indicate the case in which the size of the absolute value of the motion vector differential value is larger than N. The decoder may acquire the absolute value of the motion vector differential value on the basis of the activated first flag and the signaled value.

Referring to FIG. 9, a second flag (abs_mvd_greater0_flag) indicating whether the absolute value of the motion vector differential value is larger than '0' may be signaled. When the second flag (abs_mvd_greater0_flag[ ]) indicates that the absolute value of the motion vector differential value is not larger than '0', the absolute value of the motion vector differential value may be '0'. Further, when the second flag (abs_mvd_greater0_flag[ ]) indicates that the absolute value of the motion vector differential value is larger than '0', the decoder may acquire the absolute value of the motion vector differential value on the basis of other information on the motion vector differential value.

According to an embodiment, a third flag (abs_mvd_greater1_flag) indicating whether the absolute value of the motion vector differential value is larger than '1' may be signaled. When the third flag (abs_mvd_greater1_flag[ ]) indicates that the absolute value of the motion vector differential value is not larger than '1', the decoder may determine that the absolute value of the motion vector differential value is '1'.

On the other hand, when the third flag (abs_mvd_greater1_flag[ ]) indicates that the absolute value of the motion vector differential value is larger than '1', the decoder may acquire the absolute value of the motion vector differential value on the basis of other information on the motion vector differential value. For example, a value (abs_mvd_minus2) of (the absolute value of the motion vector differential value−2) may be signaled. This is because, when the absolute value of the motion vector differential value is larger than '1', the absolute value of the motion vector differential value may be larger than or equal to 2.

As described above, the absolute value of the motion vector differential value of the current block may be transformed in at least one flag. For example, the transformed absolute value of the motion vector differential value may indicate a value of (the absolute value of the motion vector differential value−N) according to the size of the motion vector differential value. According to an embodiment, the transformed absolute value of the motion vector differential value may be signaled through at least one bit. In this case, the number of bits signaled to indicate the transformed absolute value of the motion vector differential value may be variable. The encoder may encode the transformed absolute value of the motion vector differential value through a variable length binary method. For example, the encoder may use at least one of truncated unary binary, unary binary, truncated rice binary, or exp-Golomb binary as the variable length binary method.

Further, a sign of the motion vector differential value may be signaled through a sign flag (mvd_sign_flag). Meanwhile, the sign of the motion vector differential value may be implicitly signaled by sign-bit-hiding. This will be described with reference to FIGS. 23 to 28.

Meanwhile, the motion vector differential value of the current block may be signaled in units of specific resolutions. In the present disclosure, the resolution of the motion vector differential value may indicate the unit in which the motion vector differential value is signaled. That is, in the present disclosure, the resolution other than the resolution of the picture may indicate precision or granularity of the signaled motion vector differential value. The resolution of the motion vector differential value may be expressed in units of samples or pixels. For example, the resolution of the motion vector differential value may be expressed using the unit of samples such as the unit of ¼ (quarter), ½ (half), 1 (integer), 2, or 4. Further, as the resolution of the motion vector differential value of the current block is smaller, precision of the motion vector differential value of the current block may further increase.

According to an embodiment of the present disclosure, the motion vector differential value may be signaled on the basis of various resolutions. According to an embodiment, the absolute value or the transformed absolute value of the motion vector differential value may be signaled as a value in units of integer samples. Alternatively, the absolute value of the motion vector differential value may be signaled as a value in units of ½-subpels. That is, the resolution of the motion vector differential value may be differently configured according to a situation. The encoder and the decoder according to an embodiment of the present disclosure may efficiently signal the motion vector differential value of the current block properly using various resolutions for the motion vector differential value.

According to an embodiment, the resolution of the motion vector differential value may be configured to be different values in units of at least one of blocks, coding units, slices, or tiles. For example, a first resolution of a motion vector differential value of a first block may be ¼ sample units. In this case, "64", obtained by dividing the absolute value of "16" of the motion vector differential value by the first resolution, may be signaled. Further, a second resolution of a motion vector differential value of a second block may be an integer sample unit. In this case, "16", obtained by dividing the absolute value of "16" of the second motion vector differential value by the second resolution, may be signaled. As described above, even when the absolute values of the motion vector differential values are the same as each other, different values may be signaled according to the resolution. In this case, when a value obtained by dividing the absolute value of the motion vector differential value by the resolution includes decimal places, a rounding function may be applied to the corresponding value.

The encoder may signal information indicating the motion vector differential value on the basis of the resolution of the motion vector differential value. The decoder may acquire a motion vector differential value modified from the signaled motion vector differential value. The decoder may modify the motion vector differential value on the basis of a resolution of a resolution differential value. The relation between the signaled motion vector differential value (valuePerResoultion) of the current block and the modified motion vector differential value (valueDetermined) is as shown in [Equation 1] below. Hereinafter, in the present disclosure, unless specially mentioned, the motion vector differential value indicates the modified motion vector differential value (valueDetermined). Further, the signaled motion vector differential value indicates a value before the modification by the resolution.

$$valueDetermined = resolution * valuePerResolution \quad [\text{Equation 1}]$$

In [Equation 1], the resolution denotes a resolution of the motion vector differential value of the current block. That is, the decoder may acquire the modified motion vector differential value by multiplying the signaled motion vector differential value of the current block and the resolution. Subsequently, the decoder may acquire the motion vector of the current block on the basis of the modified motion vector differential value. Further, the decoder may reconstruct the current block on the basis of the motion vector of the current block.

When a relatively small value is used as the resolution of the motion vector differential value of the current block (that is, when precision is high), it may be more advantageous to more precisely indicate the motion vector differential value of the current block. However, in this case, since the signaled value itself becomes larger, signaling overhead for the motion vector differential value of the current block may increase. On the other hand, when a relatively large value is used as the resolution of the motion vector differential value of the current block (that is, when precision is low), signaling overhead for the motion vector differential value may be reduced by reducing the size of the signaled value. That is, when the resolution of the motion vector differential value is large, the motion vector differential value of the current block may be signaled through the smaller number of bits than the case in which the resolution of the motion vector differential value of the current block is small. However, in this case, it may be difficult to precisely indicate the motion vector differential value of the current block.

Accordingly, the encoder and the decoder may select an advantageous resolution to signal the motion vector differential value according to a situation from among a plurality of resolutions. For example, the encoder may signal the selected resolution on the basis of the situation. Further, the decoder may acquire the motion vector differential value of the current block on the basis of the signaled resolution. Hereinafter, a method of signaling the resolution of the motion vector differential value of the current block will be described according to an embodiment of the present disclosure. According to an embodiment of the present disclosure, the resolution of the motion vector differential value of the current block may be one of a plurality of available resolutions included in a resolution set. Here, the plurality of available resolutions may indicate resolutions which can be used in a specific situation. Further, the type and the number of available resolutions included in the resolution set may vary depending on a situation.

FIG. 10 illustrates a method of signaling a resolution of a motion vector differential value of a current block according to an embodiment of the present disclosure. According to an embodiment, a resolution indicator indicating the resolution of the motion vector differential value of the current block among the plurality of available resolutions may be signaled. The encoder may signal the resolution indicator along with information indicating the motion vector differential value. The decoder may acquire the resolution of the motion vector differential value of the current block on the basis of the resolution indicator indicating one of the plurality of available resolutions included in the resolution set of the current block. The decoder may acquire the motion vector differential value of the current block on the basis of the acquired resolution of the motion vector differential value.

According to an embodiment, the resolution indicator may be expressed by variable-length bits. For example, the resolution indicator may indicate one of resolution indexes indicating the plurality of available resolutions in the resolution set of the current block. In this case, the resolution index may be expressed by variable-length bits having a preset maximum length. For example, the resolution indicator may include two or more flags, each of which is expressed by one bit. The preset maximum length may be a length determined according to the number of plurality of available resolutions. For example, when the available resolution set includes three available resolutions, the preset maximum length may be '2'. In the present disclosure, the resolution index may be referred to as a value of the resolution indicator. Referring to FIG. 10, the value of the resolution indicator may be one of 0, 10, and 11.

In the embodiment of FIG. 10, the resolution set for motion compensation of the current block may include available resolutions in units of ¼, 1, and 4 samples. In this case, the resolution of the motion vector differential value of the current block may be one of the available resolutions (¼, 1, and 4) illustrated in FIG. 10. According to an embodiment, the smallest available resolution (that is, resolution having the highest precision) among a plurality of available resolutions may be signaled by an indicator value using the shortest length bits. For example, the available resolution in units of ¼ samples, which is the smallest value among the available resolutions in units of ¼, 1, and 4 samples may be indicated by an indicator value of '0' using the shortest length bits. Further, the remaining available resolutions may be indicated by indicator values expressed by '10' and '11', respectively.

Meanwhile, when the resolution indicator is expressed by variable-length bits, signaling overhead may be reduced if the available resolution indicated using the shortest length bits is used as the resolution of the motion vector differential value of the current block. Accordingly, among the plurality of available resolutions, the available resolution having a high probability of being selected as the resolution of the motion vector differential value of the current block may be configured to be signaled using the shortest length bits. That is, the available resolution indicated by the resolution indicator of the same indicator value may vary depending on a situation. This will be described in detail with reference to FIGS. 11 to 12. Further, the resolution set of the current block may include advantageous available resolutions according to a situation. That is, the configuration of the plurality of available resolutions included in the resolution set of the current block may vary depending on a situation. This will be described in detail with reference to FIG. 13.

FIGS. 11 and 12 illustrate a method of signaling a resolution of a motion vector differential value of a current block according to another embodiment of the present disclosure. Although FIG. 11 illustrates that a resolution set includes three available resolutions, the present disclosure is not limited thereto. In the embodiment of FIG. 11, the resolution set may include a first available resolution (resolution 1), a second available resolution (resolution 2), and a third available resolution (resolution 3). Further, each of values of resolution indicators indicating the plurality of available resolutions included in the resolution set may be one of 0, 10, and 11.

In this case, the available resolution indicated by the resolution indicator of the same indicator value may vary depending on a situation. For example, the indicator value using the shortest length bits among the values of the resolution indicators may indicate the first available resolution in a first case (case 1) and indicate the second available resolution in a second case (case 2). The first available resolution and the second available resolution may be different from each other.

Referring to "case 1" of FIG. 11, the first available resolution (resolution 1), the second available resolution (resolution 2), and the third resolution (resolution 3) may be available resolutions indicated when the resolution indicator values are 0, 10, and 11, respectively. Unlike this, referring to "case 2" of FIG. 11, the first available resolution (resolution 1), the second available resolution (resolution 2), and the third resolution (resolution 3) may be available resolutions indicated when the resolution indicator values are 10, 0, and 11, respectively.

FIG. 12 illustrates the embodiment of FIG. 11 in more detail. The resolution of the motion vector differential value of the current block may be signaled through a method of FIG. 12(a) or a method of FIG. 12(b) according to a situation. In the embodiment of FIG. 12, the resolution set may include available resolutions in units of ¼, 1, and 4 samples. Further, respective available resolutions may be indicated by different indicator values. For example, referring to FIG. 12(a), the available resolutions in units of ¼, 1, and 4 samples may be signaled by 10, 0, and 11. That is, the available resolution among a plurality of available resolutions may be indicated by an indicator value using the shortest length bits. Such a signaling method may be used in a situation in which signaling the motion vector differential value of the current block is advantageous on the basis of the shortest available resolution among the plurality of available resolutions.

Further, referring to FIG. 12 (b), the available resolutions in units of ¼, 1, and 4 samples may be signaled by 10, 11, and 0, respectively. That is, according to an embodiment of the present disclosure, it may be advantageous to signal the motion vector differential value of the current block on the basis of the available resolutions other than the shortest available resolution among the plurality of available resolutions according to a situation. In this case, the resolution other than the shortest available resolution among the plurality of available resolutions may be indicated by the indicator value using the shortest length bits. For example, the largest available resolution among the plurality of available resolutions may be indicated by the indicator value using the shortest length bits.

Further, the configuration of the plurality of available resolutions included in the resolution set may vary depending on a situation. FIG. 13 illustrates an embodiment in which the configuration of available resolutions included in a resolution set varies. According to an embodiment of the present disclosure, the resolution of the motion vector differential value in the first case (case 1) may be acquired from a first case resolution set, and the resolution of the motion vector differential value in the second case (case 2) may be acquired from a second case resolution set.

According to an embodiment, the first case resolution set may include a first available resolution (resolution 1), a second available resolution (resolution 2), and a third available resolution (resolution 3). Further, the second case resolution set may include a fourth available resolution (resolution A), a fifth available resolution (resolution B), and a sixth available resolution (resolution C). In this case, some of the available resolutions included in the first case resolution set and some of the available resolutions included in the second case resolution set may be the same as each other. That is, a specific available resolution may be included in both the first case resolution set and the second case resolution set.

According to a detailed embodiment, the first case resolution set may include available resolutions in units of ¼, 1, and 4 samples. Further, the second case resolution set may include available resolutions in units of ¼, ½, and 1 samples. That is, the second case resolution set may include other available resolutions instead of the largest available resolution among the plurality of available resolutions included in the first case resolution set. In this case, the other available resolutions may be available resolutions smaller than the largest available resolution. Further, the largest resolution among the available resolutions included in the second case resolution set may be smaller than the largest available resolution among the available resolutions included in the first case resolution set. According to an embodiment, the first case resolution set may be advantageous in a case in which reduction in signaling overhead is needed than a case in which precision of the motion vector differential value should increase. On the other hand, the second case resolution set may be advantageous in a case in which precision of the motion vector differential value should increase than a case in which reduction in signaling overhead is needed.

Meanwhile, the required precision of the motion vector differential value may vary depending on a prediction mode of the current block. For example, motion compensation based on an affine model may be motion prediction for an irregular motion other than a translation motion. Accordingly, when the prediction mode of the current block is a motion compensation mode based on an affine model, it may be required to more precisely signal the motion vector differential value compared to the conventional general prediction mode. An MVP candidate list of the current block may be configured in another method according to the prediction mode of the current block. Accordingly, the configuration of a plurality of available resolutions included in a resolution set of the current block may vary depending on a method of configuring the MVP candidate list for motion compensation of the current block.

Further, as the resolution of the motion vector differential value of the current block is larger, the size of the signaled motion vector differential value may become smaller. Accordingly, when an absolute value of the motion vector differential value of the current block is relatively large, it may be preferable to signal the motion vector differential value in large resolution units compared to the case in which the motion vector differential value of the current block is small. In this case, the motion vector differential value is a value indicating a difference between the motion vector and a motion vector predictor. Accordingly, as the motion vector predictor of the current block is more similar to the motion vector of the current block, the absolute value of the motion vector differential value of the current block may become smaller. Meanwhile, a probability of high similarity between the motion vector of the current block and the motion vector predictor may vary depending on a method of configuring the MVP candidate list for motion compensation of the current block. Accordingly, the configuration of a plurality of available resolutions included in a resolution set of the current block may vary depending on a method of configuring the MVP candidate list for motion compensation of the current block.

According to an embodiment, the cases described in the embodiments with reference to FIGS. 10 to 13 may refer to methods of configuring the MVP candidate list of the current block. As described with reference to FIG. 8, the MVP candidate list for motion compensation of the current block may be configured on the basis of one of a plurality of methods. An MVP candidate list of the current block may be configured in another method according to the prediction mode of the current block. That is, the cases described in the embodiments may be defined according to a method among a plurality of methods of configuring the MVP candidate list for motion compensation of the current block.

According to an embodiment of the present disclosure, the configuration of a plurality of available resolutions included in the resolution set of the current block may vary depending on a method of configuring the MVP candidate list of the current block. For example, the encoder and the decoder may configure the MVP candidate list for motion compensation of the current block through one of the first method and the second method. In this case, the configuration of the plurality of available resolutions included in the resolution set of the current block may vary depending on a method between the first method and the second method of configuring the MVP candidate list of the current block.

According to an embodiment, when the MVP candidate list for motion compensation of the current block is configured using the first method, the resolution of the motion vector differential value of the current block may be acquired from the first resolution set. According to an embodiment, when the MVP candidate list for motion compensation of the current block is configured using the second method, the resolution of the motion vector differential value of the current block may be acquired from the second resolution set. In this case, a plurality of available resolutions included in the first resolution set may be different from some of a plurality of available resolutions included in the second resolution set. For example, the second resolution set may include at least one of available resolutions other than the plurality of available resolutions included in the first resolution set.

As described above, the first method may be a method of configuring the MVP candidate list based on the affine model, and the second method may be a method of configuring the MVP candidate list which is not based on the affine model. Motion compensation based on the affine model may be motion prediction for an irregular motion other than a translation motion. Accordingly, it may be required to more precisely signal the motion vector differential value compared to the conventional general inter prediction method.

Therefore, the first resolution set may include other available resolutions instead of the largest resolution among the plurality of available resolutions included in the second resolution set. In this case, the other available resolutions may be available resolutions smaller than the largest available resolution. Further, the largest available resolution among the available resolutions included in the first resolution set may be smaller than the largest available resolution among the available resolutions included in the second resolution set. For example, the largest available resolution among the available resolutions included in the first resolution set may be a resolution in units of a 1 sample. In this case, the largest available resolution among the available resolutions included in the second resolution set may be a resolution in units of 4 samples.

According to a detailed embodiment, the first resolution set may include available resolutions in units of ¼, ½, and 1 samples. In this case, the second resolution set may include available resolutions in units of ¼, 1, and 4 samples. According to another detailed embodiment, the first resolution set may include available resolutions in units of ¹⁄₁₆, ¼, and 1 samples. In this case, the second resolution set may include available resolutions in units of ¼, 1, and 4 samples.

As described above, the decoder may determine the resolution of the motion vector differential value of the current block using the signaled resolution indicator. For example, the decoder may acquire a resolution indicator indicating the resolution of the motion vector differential value of the current block among the plurality of available resolutions included in one of the first resolution set and the second resolution set. Further, the decoder may acquire a modified motion vector differential value of the current block on the basis of the resolution indicator. The decoder may reconstruct the current block on the basis of the modified motion vector differential value.

According to an embodiment of the present disclosure, an available resolution indicated by a specific value among resolution indicator values may vary depending on a used method between the first method and the second method of configuring the MVP candidate list. According to an embodiment, the decoder may acquire a resolution indicator having a first value. When the MVP candidate list for motion compensation of the current block is configured using the first method, the available resolution indicated by the first value may be a seventh available resolution. When the MVP candidate list for motion compensation of the current block is configured using the second method, the available resolution indicated by the first value may be an eighth available resolution. In this case, the seventh available resolution and the eighth available resolution may be different resolutions.

According to an embodiment, the seventh available resolution may be an available resolution included in both the first resolution set and the second resolution set. When the MVP candidate list for motion compensation of the current block is configured using the second method, the seventh available resolution may be indicated by a second value different from the first value. For example, the first value may be one of '10 and 11' or one of '00 and 01'. In this case, the second value may be one of '10 and 11' different from the first value or one of '00 and 01' different from the first value.

Meanwhile, as described above, it may be advantageous to signal the available resolution having the highest probability of being selected as the resolution of the motion vector differential value of the current block using the shortest length bits among the plurality of available resolutions. According to an embodiment, the smallest available resolution among the available resolutions included in the first resolution set may be smaller than the smallest available resolution among the available resolutions included in the second resolution set.

That is, the available resolutions included in the second resolution set may be relatively large resolutions. Accordingly, when the MVP candidate list for motion compensation of the current block is configured using the second method, it may be required to increase precision of the motion vector differential value. As described above, when it is required to increase precision of the motion vector differential value, it may be advantageous to signal the smallest available resolution using the shortest length bits among the plurality of available resolutions. According to an embodiment, a third value may be a value expressed using the shortest length bits among the resolution indicator values.

According to an embodiment, when the MVP candidate list for motion compensation of the current block is configured using the second method, the third value may indicate the smallest available resolution among the plurality of available resolutions included in the second resolution set. According to an embodiment, the smallest available resolution among the available resolutions included in the second resolution set may be ¼.

Further, the available resolutions included in the first resolution set may be relatively small resolutions. Accordingly, when the MVP candidate list for motion compensation of the current block is configured using the first method, it may be required to reduce signaling overhead for the motion vector differential value. Therefore, when the MVP candidate list for motion compensation of the current block is configured using the first method, the third value may indicate an available resolution other than the smallest available resolution among the plurality of available resolutions included in the first resolution set. According to an embodiment, the third value may indicate the largest available resolution, the second smallest available resolution, or the second largest available resolution among the available resolutions included in the first resolution set. For example, the available resolution other than the smallest resolution among the plurality of available resolutions included in the first resolution set may be one of ¼, ½, 1, and 4.

Meanwhile, according to another embodiment of the present disclosure, the configuration of available resolutions included in the resolution set of the current block may vary depending on an MVP index indicating a motion vector predictor of the current block. The MVP index may indicate what numberth candidate in the MVP candidate list of the current block is the motion vector predictor referred to for inducing the motion vector of the current block.

Figure 14:
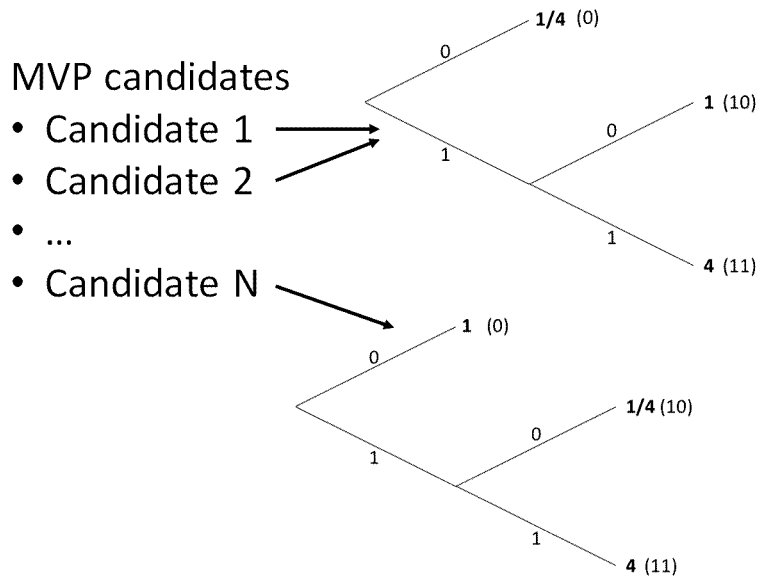
FIG. 14 illustrates an embodiment of a method of signaling a resolution of a motion vector differential value of a current block according to a motion vector predictor of the current block.

FIG. 14 illustrates an embodiment of a method of signaling a resolution of a motion vector differential value of a current block according to a motion vector predictor of the current block. For example, the decoder may acquire the MVP index indicating the motion vector predictor referred for motion compensation of the current block in the MVP candidate list for motion compensation of the current block. In this case, an available resolution indicated by a specific value of a resolution indicator of the current block may vary depending on whether the MVP index is larger than or smaller than a preset index.

A motion vector predictor candidate corresponding to a smaller MVP index in the MVP candidate list of the current block may have a higher probability of being more similar to the motion vector of the current block. Further, as the motion vector predictor of the current block is more similar to the motion vector of the current block, an absolute value of the motion vector differential value of the current block may become smaller. Accordingly, when the MVP index corresponding to the motion vector predictor of the current block is smaller than the preset MVP index, the smallest available resolution among a plurality of available resolutions included in a resolution set of the current block may be indicated by a value expressed using the shortest length bits among resolution indicator values.

On the other hand, when the MVP index corresponding to the motion vector predictor of the current block is larger than the preset MVP index, a specific available resolution other than the smallest available resolution among the plurality of available resolutions included in the resolution set of the current block may be indicated by a value expressed using the shortest length bits among resolution indicator values. In this case, the specific available resolution may be the largest resolution among the plurality of available resolutions. Alternatively, the specific available resolution may be the second largest resolution or the second smallest resolution among the plurality of available resolutions.

Referring to FIG. 14, the resolution set of the current block may include available resolutions in units of ¼, 1, and 4 samples. Further, when the MVP index for motion compensation of the current block is smaller than the preset MVP index (candidate 1 or candidate 2), the resolution in ¼ units which is the smallest available resolution among ¼, 1, and 4 may be signaled using the shortest bits. On the other hand, when the MVP index for motion compensation of the current block is larger than the preset MVP index (candidate N), the resolution in 1 or ¼ units among ¼, 1, and 4 may be signaled using the shortest bits.

Figure 15:
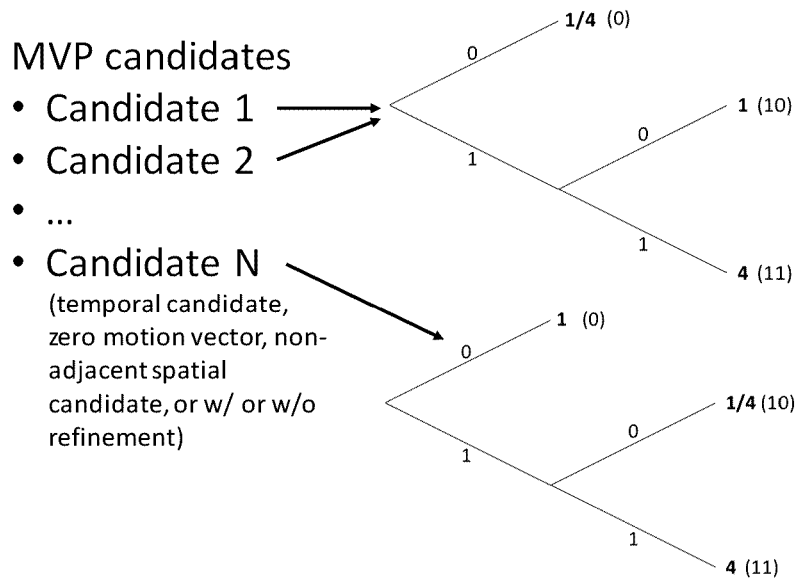
FIG. 15 illustrates another embodiment of the method of signaling the resolution of the motion vector differential value according to the motion vector predictor of the current block.

FIG. 15 illustrates another embodiment of the method of signaling the resolution of the motion vector differential value according to the motion vector predictor of the current block. As described above with reference to FIG. 14, the method of signaling the resolution of the motion vector differential value of the current block may vary depending on the MVP index for motion compensation of the current block.

As described above, the MVP candidate list for motion compensation of the current block may include candidates acquired through various methods. According to an embodiment, the MVP candidate list for motion compensation of the current block may include at least one of a spatial candidate, a temporal candidate, or a zero motion vector. In this case, the configuration of a plurality of available resolutions included in a resolution set of the current block may vary depending on a method of acquiring a candidate corresponding to a motion vector predictor of the current block. This is because similarity with an estimated current block may vary depending on the motion vector predictor candidate. For example, in the case of the spatial candidate, it may be estimated that a probability of similarity with the current block may be high. Further, motion vector predictor candidates such as the temporal candidate and the zero motion vector may be estimated to have a smaller probability of similarity with the current block compared to the spatial candidate.

For example, the motion vector predictor of the current block is one in the spatial candidate, the smallest available resolution among a plurality of available resolutions included in a resolution set of the current block may be indicated by a value expressed using the shortest length bits among resolution indicator values.

Further, when the motion vector predictor of the current block is not one in the spatial candidate, a specific available resolution other than the smallest available resolution among the plurality of available resolutions included in the resolution set of the current block may be indicated by a value expressed using the shortest length bits among values of resolution indicator values. In this case, the specific available resolution may be the largest resolution among the plurality of available resolutions. Alternatively, the specific available resolution may be the second largest resolution or the second smallest resolution among the plurality of available resolutions.

Meanwhile, although FIGS. 13 to 15 illustrate that different resolution sets include the same number of available resolutions, the present disclosure is not limited thereto. According to an embodiment of the present disclosure, the different numbers of available resolutions may be included in respective resolution sets. For example, the first resolution set may include three available resolutions. However, the third resolution set used in the third case may include two available resolutions. The encoder and the decoder may configure resolution sets including the different numbers of available resolutions according to circumstances.

As described above, the motion information set may include the reference picture index indicating the reference picture of the current block. The decoder may acquire a POC of the reference picture of the current block from the signaled reference picture index. According to an embodiment of the present disclosure, the configuration of the plurality of available resolutions included in the resolution set of the current block may vary depending on the POC of the current picture and the POC of the reference picture. According to an embodiment, some of the available resolutions included in the resolution set of the current block may be excluded on the basis of the POC of the current picture and the POC of the reference picture.

For example, when the POC of the reference picture is the same as the POC of the current picture, the resolution of the motion vector differential value of the current block may be acquired from the fourth resolution set. Further, when the POC of the reference picture is not the same as the POC of the current picture, the resolution of the motion vector differential value of the current block may be acquired from the fifth resolution set. In this case, the fourth resolution set may include the remaining available resolutions other than the smallest resolution among the available resolutions included in the fifth resolution set. That is, the number of available resolutions included in the resolution set of the current block may vary depending on the POC of the current picture and the POC of the reference picture.

According to an embodiment of the present disclosure, the resolution of the motion vector differential value of the current block may be signaled through different methods according to a Quantization Parameter (QP). For example, one of the signaling methods described with reference to FIGS. 11 to 15 may be determined according to the QP of the current block. Further, the resolution of the motion vector differential value of the current block may be signaled using the determined signaling method. According to an embodiment, as the QP of the current block is smaller, the resolution of the motion vector differential value of the current block may become smaller.

According to another embodiment of the present disclosure, the resolution of the motion vector differential value of the current block may be signaled through different methods according to a frame rate. For example, one of the signaling methods described with reference to FIGS. 11 to 15 may be determined according to a frame rate of a video signal including the current block. Further, the resolution of the motion vector differential value of the current block may be signaled using the determined signaling method. According to an embodiment, as the frame rate of the video signal is higher, a time interval between frames may be shorter and thus a probability of a small motion vector may be higher. Accordingly, as the frame rate of the current block is higher, the resolution of the motion vector differential value of the current block may become smaller.

According to another embodiment of the present disclosure, the resolution of the motion vector differential value of the current block may be signaled through different methods according to a size ratio or a size difference between the current block and a neighboring block of the current block. For example, one of the signaling methods described with reference to FIGS. 11 to 15 may be determined according to the size ratio or the size difference between the current block and the neighboring block of the current block. The above-described embodiments may be applied to the case in which the motion vector rather than the motion vector differential value is directly signaled equally or through a corresponding method.

Meanwhile, according to an additional embodiment of the present disclosure, the encoder and the decoder may modify the motion vector predictor before adding the motion vector differential value. Accordingly, the size of the motion vector differential value used to acquire the motion vector of the current block may be reduced. In this case, only when some of the motion vector predictor candidates included in the MVP candidate list of the current block are selected as motion vector predictors of the current block, the motion vector predictors may be modified. For example, when a motion vector predictor corresponding to an MVP index smaller than a preset MVP index among motion vector predictor candidates included in the MVP candidate list of the current block is used as the motion vector predictor of the current block, the corresponding motion vector predictor may be modified.

According to an embodiment, a method of signaling a plurality of available resolutions included in the resolution set may vary depending on whether the motion vector predictor is modified. For example, when the motion vector predictor of the current block is modified, the smallest available resolution among the plurality of available resolutions included in the resolution set may be signaled using the smallest number of bits. Further, when the motion vector predictor of the current block is not modified, one of resolutions other than the smallest available resolution among the plurality of available resolutions included in the resolution set may be signaled using the smallest number of bits.

According to another embodiment, the motion vector predictor may be modified after addition of the motion vector differential value. In this case, the resolution of the motion vector differential value of the current block may be signaled through a method different from the case in which the motion vector predictor is modified before addition of the motion vector differential value. When the motion vector predictor is modified after addition of the motion vector differential value, a prediction error may be reduced through a motion vector modification process even though precision of the motion vector differential value is low. Accordingly, when the motion vector predictor of the current block is modified before addition of the motion vector differential value, one of the resolutions other than the smallest available resolution among the plurality of available resolutions included in the resolution set may be signaled using the shortest number of bits. On the other hand, when the motion vector predictor of the current block is not modified before addition of the motion vector differential value, the smallest available resolution among the plurality of available resolutions included in the resolution set may be signaled using the smallest number of bits.

According to an additional embodiment, the following motion vector modification process may vary depending on a candidate of the motion vector or the motion vector predictor of the current block. The process of modifying the motion vector may include a process for searching for a more accurate motion vector. For example, the decoder may search for a block that matches the current block according to a predefined method from a reference point. The reference point may be a location corresponding to the determined motion vector or motion vector predictor. The search for the motion vector may be performed through various methods. For example, template matching or bilateral matching may be used for the search. In this case, a degree of movement from the reference point may vary depending on a predefined method. Varying the motion vector modification process may mean varying the degree of movement from the reference point.

For example, an accurate motion vector predictor candidate may start from a detailed modification process, and an inaccurate motion vector predictor candidate may start from a less detailed modification process. In the present disclosure, the accurate motion vector predictor candidate and the inaccurate motion vector predictor candidate may be determined according to the location within the MVP candidate list. Further, the accurate motion vector predictor candidate and the inaccurate motion vector predictor candidate may be determined according to methods of generating the motion vector predictor candidates. The method of generating the motion vector predictor candidate may indicate a location of a candidate in the spatial candidates of the current block. Further, detailed and less detailed modification may be a search while moving less from the reference block and moving much from the reference point. Further, when the search is performed while moving much, a process of searching for a block while additionally moving bit by bit from the best matching block, which has been found while moving much, may be added.

Figure 16:
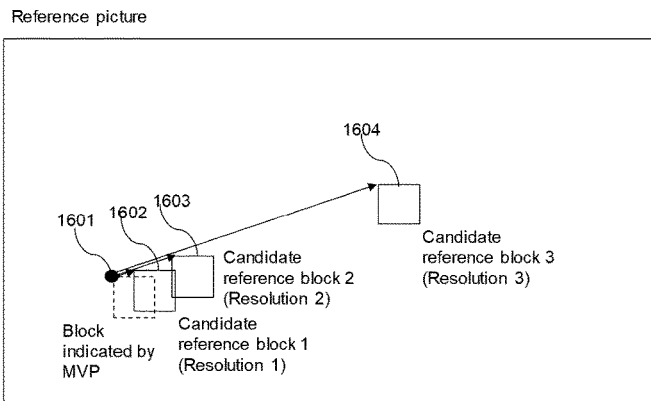
FIG. 16 illustrates a method of acquiring a resolution of a motion vector differential value on the basis of a template matching method according to an embodiment of the present disclosure.

The template matching method may be a method of acquiring a block to be compared having the smallest difference from the template of the current block on the basis of the difference between values of the templates of the current block and the block to be compared. A template of a specific block may be acquired on the basis of neighboring samples of the specific block. FIG. 16 illustrates a method of acquiring a resolution of a motion vector differential value on the basis of a template matching method according to an embodiment of the present disclosure. According to an embodiment of the present disclosure, the resolution of the motion vector differential value of the current block may not be signaled. According to an embodiment, the decoder may acquire the resolution of the current block on the basis of cost calculation such as the template matching method. As described above, the reference block may be acquired on the basis of the motion vector predictor and the motion vector differential value. In this case, the motion vector differential value may be a motion vector differential value modified by the resolution of the motion vector differential value of the current block. Accordingly, the location of the reference block within the reference picture may vary depending on the resolution of the motion vector differential value of the current block.

According to an embodiment, the resolution set for motion compensation of the current block may include preset available resolutions. Referring to FIG. 16, the resolution set of the current block may include a first available resolution (resolution 1), a second available resolution (resolution 2), and a third available resolution (resolution 3). A plurality of reference block candidates corresponding to respective available resolutions included in the resolution set of the current block may be acquired on the basis of a reference point 1601 indicated by the motion vector predictor of the current block. Reference block candidates corresponding to the number of available resolutions included in the resolution set may be acquired. According to a detailed embodiment, a plurality of reference block candidates may include a first reference block candidate 1602 corresponding to the first available resolution, a second reference block candidate 1603 corresponding to the second available resolution, and a third reference block candidate 1604 corresponding to the third available resolution. The decoder may use one of the plurality of reference block candidates as the reference block of the current block. For example, the decoder may select a reference block candidate having the lowest cost as the reference block of the current block on the basis of the template matching result between the current block and each of the plurality of reference block candidates. Further, the decoder may reconstruct the current block on the basis of the corresponding reference block.

According to another embodiment, the resolution of the motion vector differential value of the current block may be signaled on the basis of the template matching result between the current block and each of the reference block candidates. For example, the template matching operation may be performed by the encoder in the same way as the decoder. Further, the encoder may signal the available resolution corresponding to the reference block candidate having the lowest cost on the basis of the template matching result through the smallest number of bits.

In this case, the encoder and the decoder may perform template matching only on some of the plurality of reference block candidates. For example, among the first reference block candidate 1602, the second reference block candidate 1603, and the third reference block candidate 1604 of FIG. 16, only the first reference block candidate 1602 and the second reference block candidate 1603 may template-match with the current block. Further, an available resolution signaled using the shortest length bits may be determined among available resolutions included in the resolution set of the current block on the basis of the template matching result between each of the first reference block candidate 1602 and the second reference block candidate 1603, and the current block. One of the first available resolution and the second available resolution may be signaled using the shortest length bits. Further, the other one of the first available resolution and the second available resolution and the third available resolution corresponding to the reference block candidate, which has not template-matched, may be signaled using additional bits. Accordingly, the encoder and the decoder may reduce an amount of calculations required for the template matching method.

Whether to apply the embodiment described with reference to FIG. 16 according to an embodiment may be determined according to the size of the signaled motion vector differential value. For example, only when the signaled motion vector differential value is larger than a preset value, the template matching method may be used. When the signaled motion vector differential value is smaller than the preset value, a template matching cost difference between reference block candidates according to the resolution may not be clear.

Figure 17:
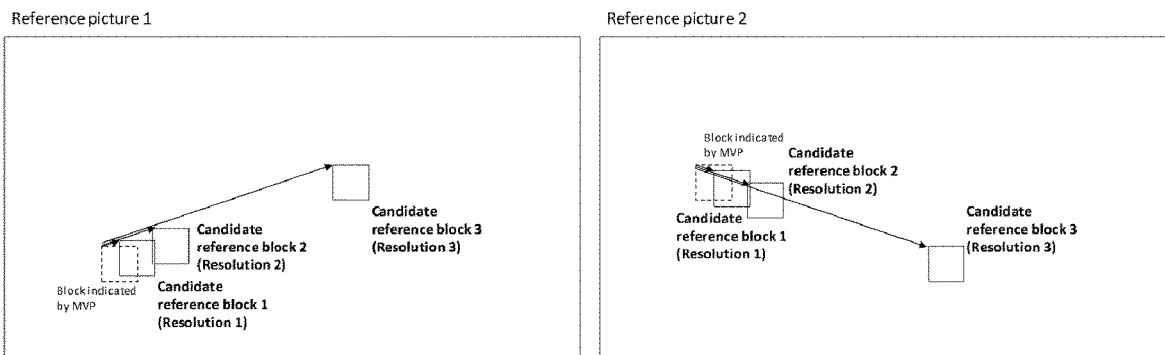
FIG. 17 illustrates a method of acquiring a resolution of a motion vector differential value on the basis of a bilateral matching method according to an embodiment of the present disclosure.

FIG. 17 illustrates a method of acquiring a resolution of a motion vector differential value on the basis of a bilateral matching method according to an embodiment of the present disclosure. According to an embodiment of the present disclosure, the bilateral matching method may be used instead of the template matching method described with reference to FIG. 16. The bilateral matching method is a method of restoring the current block on the basis of a reference block of each of two or more reference pictures along a motion trajectory. The bilateral matching method may acquire a set having the smallest difference on the basis of a difference between reference blocks of the two or more reference pictures.

As described above, when the current block is a pair-prediction block, the current block may be reconstructed on the basis of two or more reference blocks of two or more different reference pictures. Referring to FIG. 17, reference block candidates corresponding to specific available resolutions may be configured for each of a first reference picture (reference picture 1) and a second reference picture (reference picture 2). The encoder and the decoder may acquire a reference block within the first reference picture (reference picture 1) and a reference block within the second reference picture (reference picture 2) on the basis of the bilateral matching result between the reference block candidate within the first reference picture (reference picture 1) and the reference block candidate within the second reference picture (reference picture 2). The embodiments described with reference to FIG. 16 may be applied to the embodiment of FIG. 17 through the same or a corresponding method.

According to an embodiment, when the current block is inter-predicted on the basis of two motion information sets corresponding to different reference lists, two motion vector differential values may be separately signaled. In this case, resolutions applied to the respective two motion vector differential values may be the same as or different from each other. Hereinafter, various methods of signaling the resolution for each reference picture list of the current block will be described.

According to an embodiment of the present disclosure, the resolution of the motion vector differential value for each reference picture list may be determined on the basis of the bilateral matching method. According to an embodiment, the resolution set corresponding to each of the two reference picture lists may be configured independently from each other. For example, the resolution set corresponding to the first reference picture list (L0) may include m available resolutions. Further, the resolution set corresponding to the second reference picture list (L1) may include n available resolutions. In this case, the encoder and the decoder may acquire the resolution of the motion vector differential value of each reference picture list on the basis of the bilateral matching result between n reference block candidates corresponding to the first reference picture list and m reference block candidates corresponding to the second reference picture list. In this case, the encoder and the decoder should perform (n×m) bilateral matchings.

Alternatively, the resolution of the motion vector differential value may use a common resolution set for a plurality of reference picture lists. For example, the commonly used resolution set for the first reference picture list (L0) and the second reference picture list (L1) may include n available resolutions. According to an embodiment, the same resolution may be applied to motion vector differential values corresponding to the first reference picture list (L0) and the second reference picture list (L1). In this case, the encoder and the decoder may acquire the resolution of the motion vector differential value of each of the first reference picture list (L0) and the second reference picture list (L1) on the basis of the n bilateral matching results.

Meanwhile, a difference between a motion vector predictor and a motion vector corresponding to a specific reference picture list may be similar to a difference between a motion vector predictor and a motion vector corresponding to another reference picture list. In this case, it may be highly likely that a resolution of a motion vector differential value corresponding to the specific reference picture list is the same as a resolution of a motion vector differential value corresponding to another reference picture list. According to an embodiment of the present disclosure, the resolution of the motion vector differential value corresponding to the specific reference picture list of the current block may be the same as the resolution of the motion vector differential value corresponding to another reference picture list of the current block.

Figure 18:
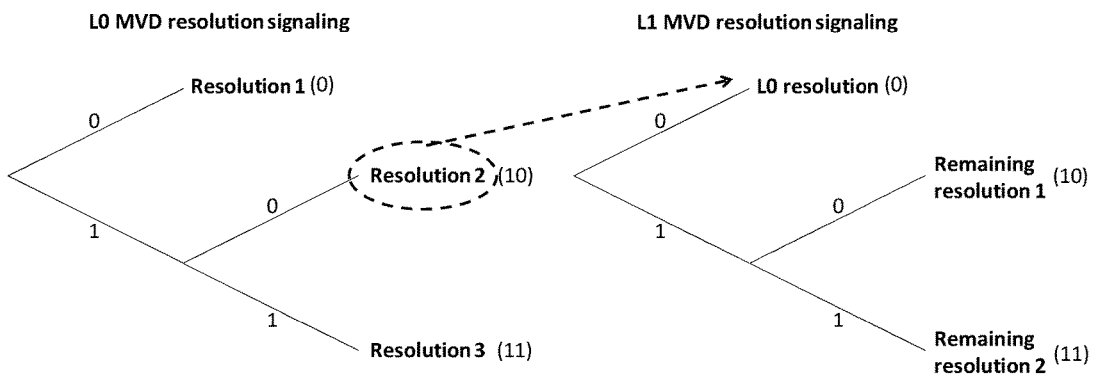
FIG. 18 illustrates a method of signaling a resolution of a motion vector differential value for each reference picture list of a current block according to an embodiment of the present disclosure.

FIG. 18 illustrates a method of signaling a resolution of a motion vector differential value for each reference picture list of a current block according to an embodiment of the present disclosure. Referring to FIG. 18, a first list resolution set (L0 MVD resolution signaling) corresponding to a first reference picture list (L0) and a second list resolution set (L1 MVD resolution signaling) corresponding to a second reference picture list (L1) may be separately configured. Further, a first list resolution indicator indicating a resolution of a motion vector differential value corresponding to the first reference picture list (L0) and a second list resolution indicator indicating a resolution of a motion vector differential value corresponding to the second reference picture list (L1) may be separately signaled.

For example, the decoder may acquire the resolution of the motion vector differential value corresponding to the first reference picture list on the basis of the first list resolution set and the first list resolution indicator. Subsequently, the decoder may acquire the resolution of the motion vector differential value corresponding to the second reference picture list on the basis of the second list resolution set and the second list resolution indicator. In this case, one of the available resolutions included in the second list resolution set may be a resolution (L0 resolution) which depends on the resolution of the motion vector differential value corresponding to the first reference picture list.

According to a detailed embodiment, when the second list resolution indicator is a preset value (0), the decoder may determine the resolution of the motion vector differential value corresponding to the second reference picture list on the basis of the resolution of the motion vector differential value corresponding to the first reference picture list. In this case, the decoder may use a resolution, which is the same as the resolution of the motion vector differential value corresponding to the first reference picture list, as the resolution of the motion vector differential value corresponding to the second reference picture list. In this case, the preset value may be a value expressed using the shortest number of bits among values of the second list resolution indicators. Further, other values of the second list resolution indicators may be used as values indicating the remaining available resolutions (remaining resolution 1 and remaining resolution 2).

In the embodiment of FIG. 18, although it is described that the resolution of the motion vector differential value corresponding to the first reference picture list (L0) is determined earlier than the resolution of the motion vector differential value corresponding to the second reference picture list (L1), the present disclosure is not limited thereto. For example, the first list resolution set may include a resolution which depends on the resolution of the motion vector differential value corresponding to the second reference picture list (L1).

Figure 19:
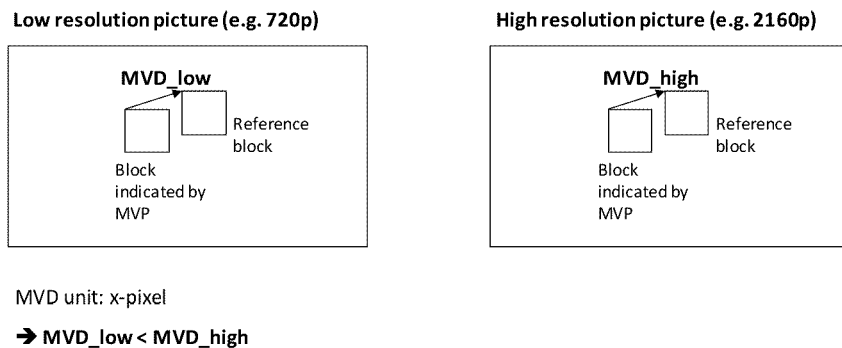
FIG. 19 illustrates an embodiment of a method of signaling a resolution of a motion vector differential value of a current block according to a resolution of a picture.

FIG. 19 illustrates an embodiment of a method of signaling a resolution of a motion vector differential value of a current block according to a resolution of a picture. According to an embodiment of the present disclosure, the resolution of the motion vector differential value of the current block may be signaled through different methods according to at least one of the resolution or the size of the picture. Information on the resolution or the size of the picture may be signaled from the encoder. The decoder may acquire the signaled information on the resolution or the size of the picture. According to an embodiment, methods of signaling a resolution of a motion vector differential value of a specific block in a low-resolution picture and a high-resolution picture may be different from each other. Referring to FIG. 19, even though relative distances from reference points indicated by motion vector predictors in the low resolution picture and the high resolution picture to the location of the reference block are the same as each other, a value indicating the corresponding distance in the high resolution picture may be larger than a value indicating the corresponding distance in the low resolution picture.

Accordingly, the resolution of the motion vector differential value of the current block may have a high probability to be configured as a value larger than a resolution of a motion vector differential value of another picture, which has a lower picture resolution than the current picture including the current block. Therefore, when the current picture is a high-resolution picture, the smallest available resolution among a plurality of available resolutions may not be indicated by a value expressed using the shortest length bits. For example, when the current picture is a high-resolution picture, an available resolution other than the smallest available resolution among the plurality of available resolutions may be indicated by a value expressed using the shortest length bits. The above-described embodiment may be applied to the case in which the resolution or the size of the picture included in a video signal varies such as scalable video coding.

Figure 20:
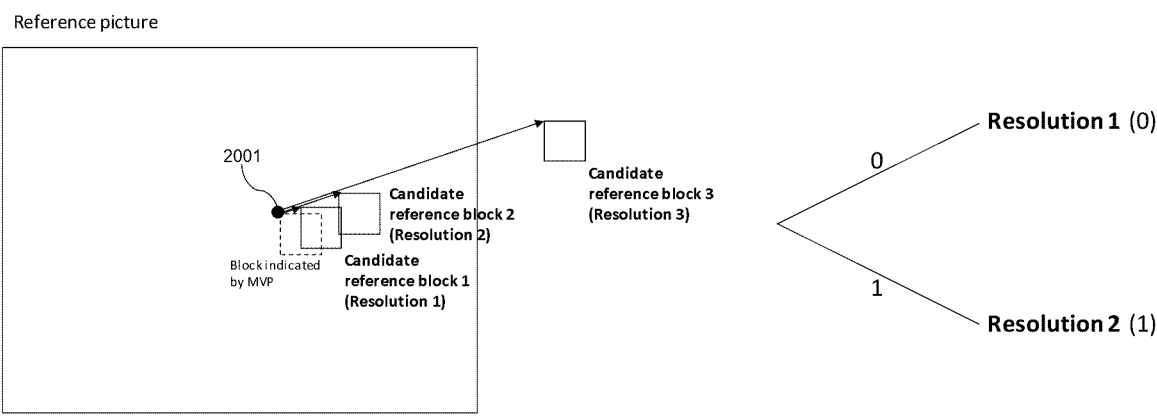
FIG. 20 illustrates a method of signaling a resolution of a motion vector differential value on the basis of the size of a reference picture of a current block according to an embodiment of the present disclosure.

FIG. 20 illustrates a method of signaling a resolution of a motion vector differential value on the basis of the size of a reference picture of a current block according to an embodiment of the present disclosure. According to an embodiment, the resolution of the motion vector differential value may be signaled on the basis of the size of the reference picture of the current block. FIG. 20 illustrates reference block candidates corresponding to respective available resolutions included in a resolution set of the current block on the basis of a reference point 2001 indicated by a motion vector predictor of the current block. In FIG. 20, a third reference block candidate corresponding to a third available resolution (resolution 3) may be located outside the reference picture. As described above, when at least some of the reference block candidates configured on the basis of a specific available resolution are outside a boundary of the reference picture, the corresponding available resolutions may be excluded from targets to be signaled. That is, when a point indicated by a modified motion vector differential value based on a specific available resolution from the reference point 2001 is outside a boundary of the current picture, the corresponding available resolution may not be signaled.

For example, a resolution set may include N available resolutions. In this case, a resolution indicator indicating one of (N-M) available resolutions, obtained by excluding M available resolutions from N available resolutions, may be signaled. In this case, a reference block candidate corresponding to each of the M available resolutions may be a reference block candidate beyond the boundary of the reference picture. Accordingly, the encoder and the decoder may reduce signaling overhead for the resolution of the motion vector differential value of the current block by excluding unnecessary available resolutions. According to a detailed embodiment, when one of a first available resolution (resolution 1), a second available resolution (resolution 2), and a third available resolution (resolution 3) is signaled, a maximum of 2 bits may be used. On the other hand, when one of the first available resolution (resolution 1) and the second available resolution (resolution 2) is signaled, a maximum of 1 bit may be used.

Referring to FIG. 20, a resolution set may include the first available resolution, the second available resolution, and the third available resolution. In this case, when the signaled motion vector differential value of the current block is modified on the basis of the third available resolution, a motion vector of the current block indicates a point beyond the boundary of the reference block. Accordingly, the encoder may signal a resolution indicator indicating one of the first available resolution and the second available resolution except for the third available resolution. According to a detailed embodiment, the encoder may signal a resolution indicator indicating one of the first available resolution and the second available resolution through one bit.

Further, the decoder may determine an available resolution excluded from targets to be signaled on the basis of the size of the reference picture of the current block and the signaled motion vector differential value. In the embodiment of FIG. 20, the decoder may recognize that the third available resolution is not signaled. The decoder may acquire the resolution of the motion vector differential value of the current block on the basis of the signaled resolution indicator through one bit.

According to an additional embodiment of the present disclosure, whether to use the method described with reference to FIG. 20 may be determined on the basis of the location of a reference point indicated by a motion vector predictor. For example, when the location of the reference point is within a preset distance from the boundary of the reference picture, the method described with reference to FIG. 20 may be used.

Whether to apply the embodiment described with reference to FIG. 20 according to an embodiment may be determined according to the size of the signaled motion vector differential value. For example, only when the signaled motion vector differential value is larger than a preset value, the encoder and the decoder may check whether there is an available resolution for generating a reference block candidate beyond the reference picture. When the signaled motion vector differential value is smaller than a preset value, the encoder and the decoder may not use the method described with reference to FIG. 20.

According to an additional embodiment, a new available resolution may be used instead of the available resolution excluded from targets to be signaled. For example, when a reference block candidate corresponding to a motion vector differential value modified on the basis of a specific available resolution is located beyond the boundary of the reference picture, an indicator value indicating the specific available resolution may indicate an available resolution different from the specific available resolution. For example, the different available resolution may be a value smaller than the specific available resolution. According to a detailed embodiment, a resolution set of the current block may include available resolutions in units of ¼, 1, and 4 samples. At least some of the reference block candidates corresponding to the available resolution in units of 4 samples may be located beyond the boundary of the reference picture of the current block. In this case, a resolution indicator value indicating the available resolution in units of 4 samples may indicate the available resolution in units of 2 samples.

Figure 21:
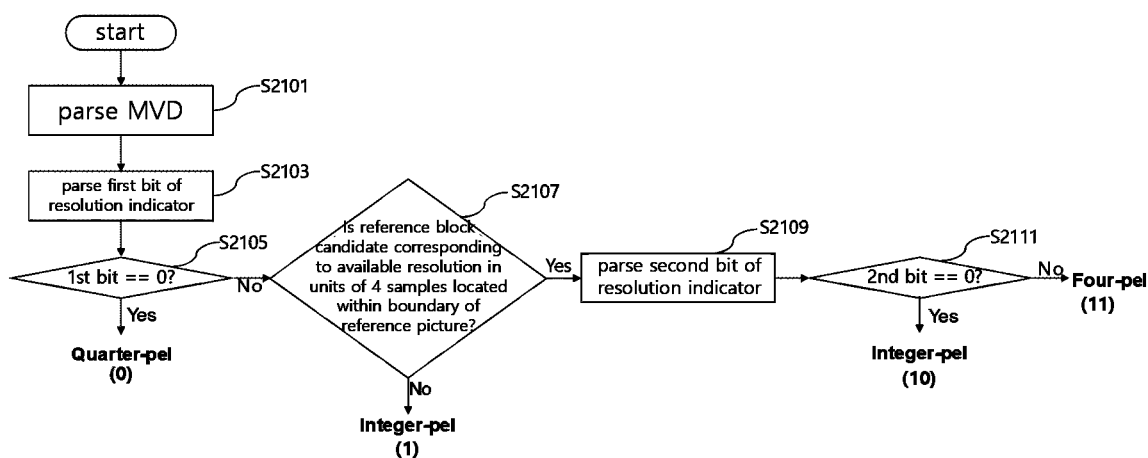
FIG. 21 is a flowchart illustrating a method of acquiring a resolution of a motion vector differential value of a current block according to an embodiment of the present disclosure.

FIG. 21 is a flowchart illustrating a method of acquiring a resolution of a motion vector differential value of a current block according to an embodiment of the present disclosure. In FIG. 21, although it is illustrated that the resolution set of the current block includes available resolutions in units of ¼, 1, and 4 samples, the present disclosure is not limited thereto. For example, at least some of the available resolutions in units of ¼, 1, and 4 samples may be replaced with some of available resolutions in units of ½, 2, ⅛, and 1/16 samples.

Referring to FIG. 21, the decoder may acquire the signaled motion vector differential value of the current block by parsing a bitstream. In this case, the signaled motion vector differential value may be a value expressed in units of resolutions of the motion vector differential values.

Further, the decoder may acquire a resolution indicator indicating the resolution of the motion vector differential value of the current block. According to an embodiment, the resolution indicator may indicate one of a plurality of values expressed by variable-length bits. The decoder may parse a first bit of the resolution indicator in S2103. Subsequently, the decoder may determine whether the first bit of the resolution indicator is '0' in S2105. When the first bit is '0', the available resolution in ¼ units may be used as the resolution of the motion vector differential value of the current block. In this case, the resolution indicator may not include a second bit described below.

When the first bit is not '0', the decoder may determine whether a reference block candidate corresponding to the available resolution in units of 4 samples is located within the boundary of the reference picture in S2107. Here, the reference block candidate corresponding to the available resolution in units of 4 samples may be a reference block candidate indicated by the motion vector candidate acquired on the basis of the available resolution in units of 4 samples. Specifically, the motion vector candidate may be a value, obtained by adding a motion vector predictor of the current block and the motion vector differential value modified on the basis of the available resolution in units of 4 samples from the motion vector differential value signaled in S2101. According to an embodiment, when the reference block candidate corresponding to the available resolution in units of 4 samples is not located within the boundary of the reference picture, the available resolution in units of 1 sample may be used as the resolution of the motion vector differential value of the current block. In this case, the resolution indicator may not include the second bit described below.

When the reference block candidate corresponding to the available resolution in units of 4 samples is located within the boundary of the reference picture, the decoder may parse the second bit of the resolution indicator in S2109. Subsequently, the decoder may determine the resolution of the motion vector differential value of the current block on the basis of the second bit of the resolution indicator in S2111. For example, the indicator value indicating the available resolution in units of 1 sample may be '10', and the indicator value indicating the available resolution in units of 4 samples may be '11'. When the second bit of the resolution indicator is '0', the decoder may use the available resolution in units of 1 sample as the resolution of the motion vector differential value of the current block. On the other hand, when the second bit of the resolution indicator is '1', the decoder may use the available resolution in units of 4 sample as the resolution of the motion vector differential value of the current block.

In FIG. 21, although it is illustrated that step S2101 of acquiring the signaled motion vector differential value is performed earlier than step S2103 of parsing the first bit of the resolution indicator, the present disclosure is not limited thereto. For example, step S2101 may be performed later than step S2103. According to an embodiment, when the resolution indicator is expressed by a plurality of bits, each bit may be implemented through a separate index or flag on syntax for processing a video signal.

According to an additional embodiment, step S2109 of parsing the second bit of the resolution indicator may be performed at least after the step of acquiring the motion vector predictor of the current block. Whether to parse the second bit of the resolution indicator may be determined according to a location indicated by the motion vector predictor of the current block. As described above, this is because, when the reference block candidate corresponding to the specific available resolution is located outside the boundary of the reference picture, signaling for the corresponding available resolution may be omitted. That is, the second bit of the resolution indicator may be parsed after information on the motion vector predictor of the current block on the syntax for encoding or decoding the video signal.

Further, step S2109 of parsing the second bit of the resolution indicator may be at least performed at least after the step of acquiring the signaled motion vector differential value of the current block. Whether to parse the second bit of the resolution indicator may be determined according to the signaled motion vector differential value of the current block. That is, the second bit of the resolution indicator may be parsed after information indicating the motion vector differential value of the current block on the syntax for encoding or decoding the video signal.

Figure 22:
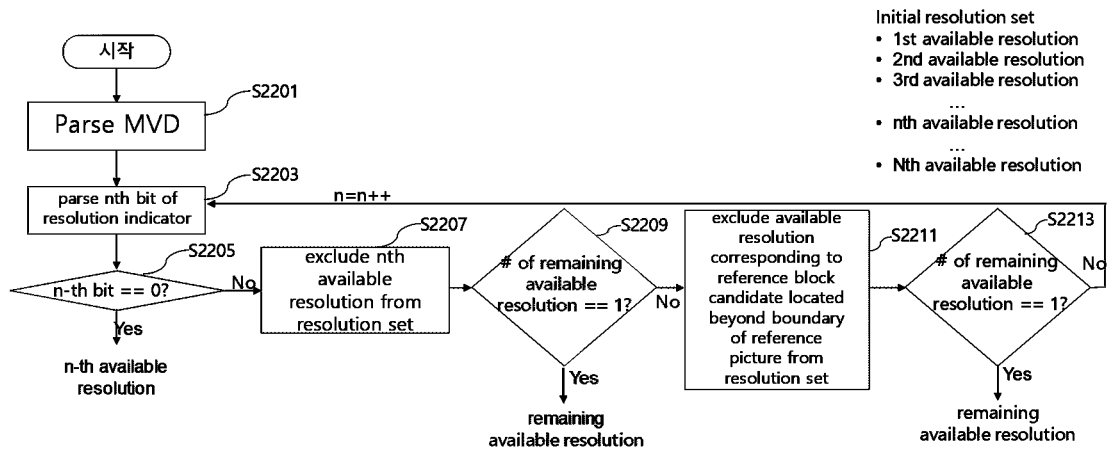
FIG. 22 is a flowchart illustrating a method of acquiring a resolution of a motion vector differential value of a current block according to an embodiment of the present disclosure.

FIG. 22 is a flowchart illustrating a method of acquiring a resolution of a motion vector differential value of a current block according to an embodiment of the present disclosure. Referring to FIG. 22, the decoder may acquire the signaled motion vector differential value of the current block by parsing a bitstream in 2001. In this case, the signaled motion vector differential value may be a value expressed in units of resolutions of the motion vector differential values. Further, the decoder may acquire a resolution indicator indicating the resolution of the motion vector differential value of the current block. The decoder may parse an $n^{th}$ bit of the resolution indicator in S2205. Here, n may be an integer from 1 to N. n may be a value sequentially increasing from 1 to N according to a loop calculation. When the $n^{th}$ bit of the resolution indicator is '0', the decoder may use an $n^{th}$ available resolution as the resolution of the motion vector differential value of the current block. In this case, the $n^{th}$ available resolution may be an available resolution indicated by an $n^{th}$ indicator value among available resolutions included in a resolution set of the current block.

When the $n^{th}$ bit of the resolution indicator is not '0', the decoder may exclude the $n^{th}$ available resolution from the previous resolution set in S2207. The decoder may acquire a first current resolution set by excluding the $n^{th}$ available resolution from the previous resolution set in S2207. According to an embodiment, when n is 1, the decoder may acquire the first current resolution set by excluding the $n^{th}$ available resolution from an initial resolution set. Subsequently, the decoder may determine whether the number of available resolutions included in the first current resolution set is 1 in S2209. When the number of available resolutions included in the first current resolution set is 1, the decoder may use the available resolution included in the first current resolution set as the resolution of the motion vector differential value of the current block.

When the number of available resolutions included in the first current resolution set is not 1, the decoder may exclude an available resolution corresponding to a reference block candidate located outside the boundary of the reference picture from the first current resolution set in S2211. The decoder may acquire a second current resolution set by excluding the available resolution corresponding to the reference block candidate located outside the boundary of the reference picture from the first current resolution set.

Subsequently, the decoder may determine whether the number of available resolutions included in the second current resolution set is 1 in S2213. When the number of available resolutions included in the second current resolution set is 1, the decoder may use the available resolution included in the second current resolution set as the resolution of the motion vector differential value of the current block. When the number of available resolutions included in the first current resolution set is not 1, the decoder may perform steps S2203 to 2013 again. Further, the decoder may increase n by 1. In this case, the decoder may use the second current resolution set as a previous resolution set in step S2207 of the next loop calculation.

Figure 23:
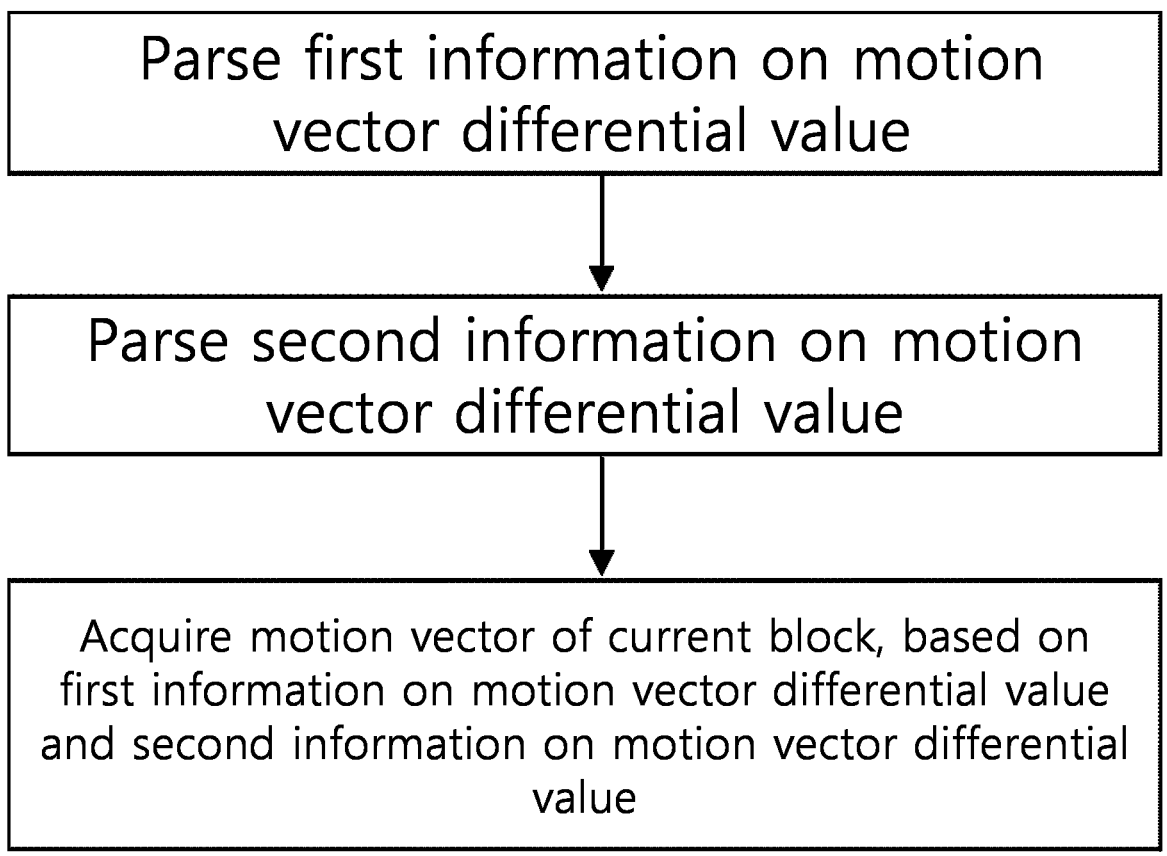
FIG. 23 is a flowchart illustrating a method of acquiring a motion vector of a current block according to an embodiment of the present disclosure.

FIG. 23 is a flowchart illustrating a method of acquiring a motion vector of a current block according to an embodiment of the present disclosure. According to an embodiment of the present disclosure, information indicating a motion vector differential value of the current block may include first information on the motion vector differential value and second information on the motion vector differential value. In this case, the first information and the second information may be different information on the motion vector differential value. Referring to FIG. 23, the decoder may parse the first information on the motion vector differential value. Further, the decoder may parse the second information on the motion vector differential value. Subsequently, the decoder may acquire a motion vector of the current block on the basis of the first information on the motion vector differential value and the second information on the motion vector differential value. According to an embodiment of the present disclosure, one of the steps of parsing the first information or the second information on the motion vector differential value may be omitted in FIG. 23. Hereinafter, a condition of parsing the first information or the second information on the motion vector differential value of the current block will be described.

Figure 24:
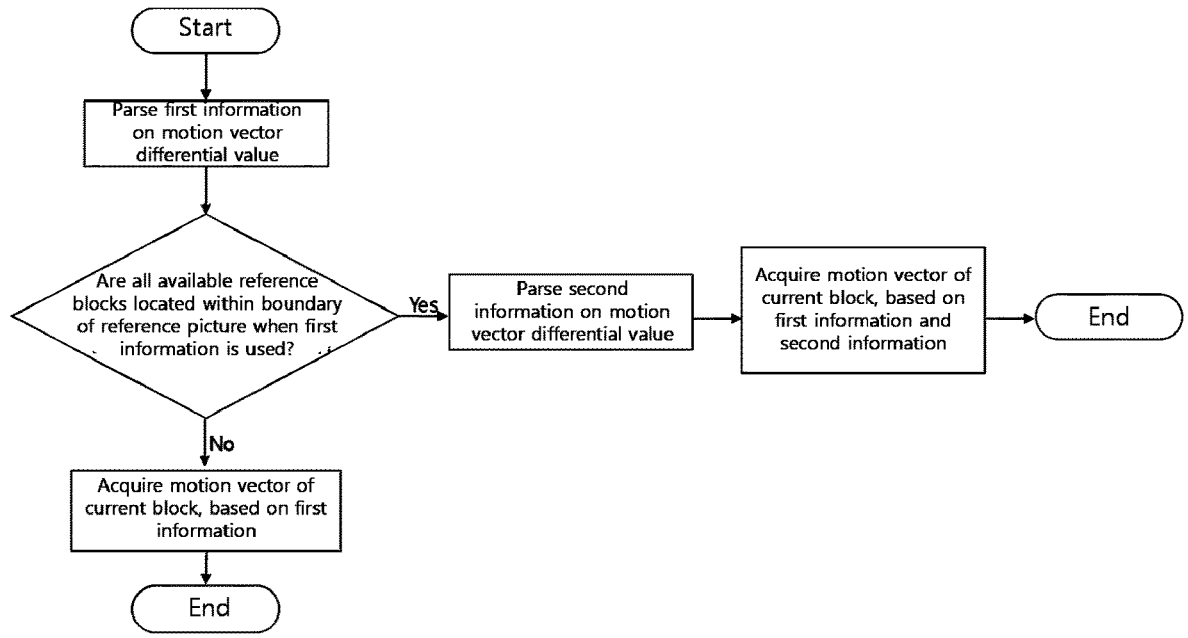
FIG. 24 is a flowchart illustrating a method of acquiring a motion vector of a current block according to an embodiment of the present disclosure.

FIG. 24 is a flowchart illustrating a method of acquiring a motion vector of a current block according to an embodiment of the present disclosure. According to an embodiment of the present disclosure, information indicating the motion vector differential value of the current block may include first information on the motion vector differential value and second information on the motion vector differential value. In a specific situation, the motion vector of the current block may be determined through one of the first information on the motion vector differential value and the second information on the motion vector differential value. On the other hand, in another situation, it may be difficult to determine on motion vector through only one of the first information on the motion vector differential value and the second information on the motion vector differential value.

Referring to FIG. 24, the decoder may parse the first information on the motion vector differential value. Subsequently, the decoder may acquire a plurality of reference block candidates through the first information on the motion vector differential value. The decoder may determine whether all of the plurality of reference block candidates are located within the boundary of the reference picture. When some of the plurality of reference block candidates are located outside the boundary of the reference picture, the decoder may acquire the motion vector of the current block on the basis of the first information on the motion vector differential value. When all of the plurality of reference block candidates are located within the boundary of the reference picture, the decoder may parse the second information on the motion vector differential value. Subsequently, the decoder may acquire the motion vector of the current block on the basis of the first information on the motion vector differential value and the second information on the motion vector differential value.

According to an embodiment, the first information on the motion vector differential value of the current block may be information other than information on the sign of the motion vector differential value. For example, the first information on the motion vector differential value of the current block may indicate an absolute value of the motion vector differential value of the current block. Further, the second information on the motion vector differential value of the current block may indicate a sign of the motion vector differential value of the current block. According to above-described embodiment, the motion vector differential value of the specific block may be acquired without parsing of the second information. Accordingly, the encoder and the decoder may reduce signaling overhead for the motion vector differential value. Hereinafter, a method of implicitly signaling information on the sign of the motion vector differential value of the current block will be described in detail.

Figure 25:
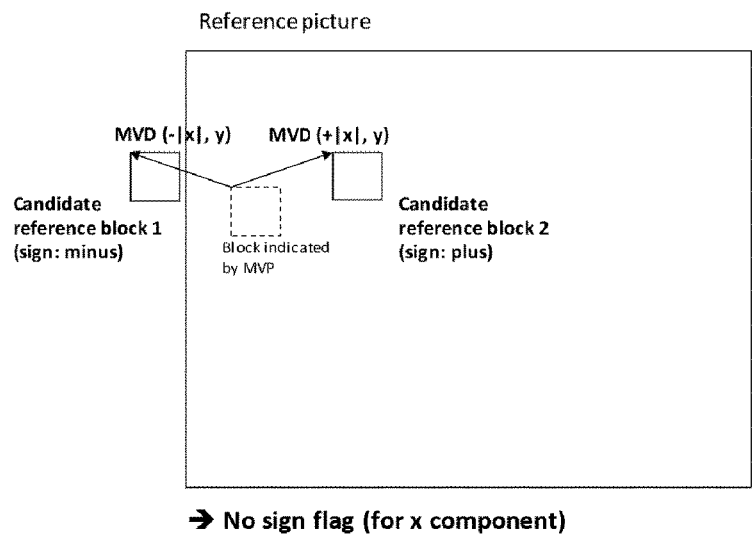
FIG. 25 illustrates a method of implicitly signaling a sign bit of the motion vector differential value of the current block according to an embodiment of the present disclosure.

FIG. 25 illustrates a method of implicitly signaling a sign bit of the motion vector differential value of the current block according to an embodiment of the present disclosure. As described with reference to FIG. 9, information indicating the motion vector differential value may include at least one piece of the information on the absolute value of the motion vector differential value and the information on the sign of the motion vector differential value. The information on the sign of the motion vector differential value may be one of a negative sign (−) and a positive sign (+). Further, the information indicating the motion vector differential value may include information on the absolute value for each component and information on the sign. For example, the motion vector differential value of the current block may include an x-axis component and a y-axis component. The x-axis component of the motion vector differential value may include a distance (absolute value) and a direction (sign) on the x axis between a reference point indicated by a motion vector predictor of the current block and a reference block. Further, the y-axis component of the motion vector differential value may include a distance (absolute value) and a direction (sign) on the y axis between a reference point indicated by a motion vector predictor of the current block and a reference block. In this case, at least one piece of information on the sign of the x-axis component of the motion vector differential value of the current block and information on the sign of the y-axis component may be implicitly signaled. That is, the sign bit hiding operation may be performed on the x-axis component and the y-axis component of the motion vector differential value.

Referring to FIG. 25, a fourth reference block candidate (candidate reference block 1) may be acquired on the basis of the x-axis component of the motion vector differential value of the current block to which the negative sign (−) is applied and the y-axis component of the motion vector differential value of the current block to which the positive sign (+) is applied. Further, a fifth reference block candidate (candidate reference block 2) may be acquired on the basis of the x-axis component of the motion vector differential value of the current block to which the positive sign (+) is applied and the y-axis component of the motion vector differential value of the current block to which the positive sign (−) is applied.

According to an embodiment, when one of the fourth reference block candidate (candidate reference block 1) and the fifth reference block candidate (candidate reference block 2) is located outside the boundary of the reference picture, the information on the sign of the x component of the motion vector differential value of the current block may be hidden. In this case, the encoder may not encode the hidden information on the sign. Further, the decoder may determine the sign of the motion vector differential value corresponding to the hidden information on the sign without any process of parsing the corresponding information on the sign.

In FIG. 25, the fourth reference block candidate (candidate reference block 1) may be located outside the boundary of the reference picture. In this case, the information on the sign of the x-axis component of the motion vector differential value of the current block may be hidden. The decoder may acquire the information on the sign of the x-axis component of the motion vector differential value without any operation of parsing the information on the sign of the x-axis component of the motion vector differential value. The decoder may use a positive sign as the sign of the x-axis component of the motion vector differential value.

Figure 26:
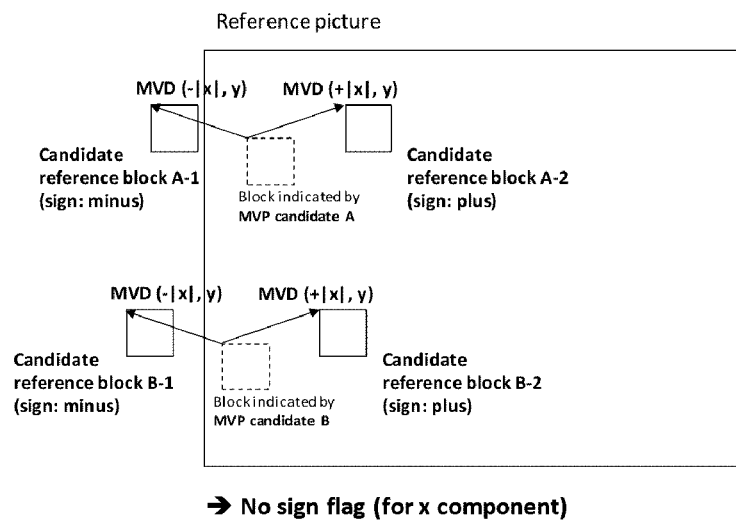
FIG. 26 illustrates a method of implicitly signaling a sign bit of a motion vector differential value of a current block according to an embodiment of the present disclosure.

FIG. 26 illustrates a method of implicitly signaling a sign bit of a motion vector differential value of a current block according to an embodiment of the present disclosure. According to an embodiment, a motion vector predictor of the current block may not be determined before the sign of the motion vector differential value of the current block is determined. For example, the sign of the motion vector differential value of the current block may be determined before an MVP index indicating an MVP of the current block is parsed on syntax for processing a video signal. In this case, the decoder may acquire a plurality of reference block candidates (candidate reference block A-1, candidate reference block A-2, candidate reference block B-1, and candidate reference block B-2) by adding each of a plurality of MVP candidates (MVP candidate A and MVP candidate B) and a motion vector differential value to which a negative sign or a positive sign is applied.

Subsequently, the decoder may determine whether all of the plurality of reference block candidates (candidate reference block A-1 and candidate reference block B-1) based on a specific component of the motion vector differential value to which the negative sign is applied are located outside the boundary of the reference picture. When all of the plurality of reference block candidates based on the specific component of the motion vector differential value to which the negative sign is applied are located outside the boundary of the reference picture, the decoder may determine a sign of the specific component of the motion vector differential value of the current block without any operation of parsing information on the sign of the specific component. In this case, the decoder may use a positive sign as the sign of the specific component of the motion vector differential value of the current block.

Further, the decoder may determine whether all of the plurality of reference block candidates (candidate reference block A-2 and candidate reference block B-2) based on a specific component of the motion vector differential value to which the positive sign is applied are located outside the boundary of the reference picture. When all of the plurality of reference block candidates based on the specific component of the motion vector differential value to which the positive sign is applied are located outside the boundary of the reference picture, the decoder may determine a sign of the specific component of the motion vector differential value of the current block without any operation of parsing information on the sign of the specific component. In this case, the decoder may use a negative sign as the sign of the specific component of the motion vector differential value of the current block.

Figure 27:
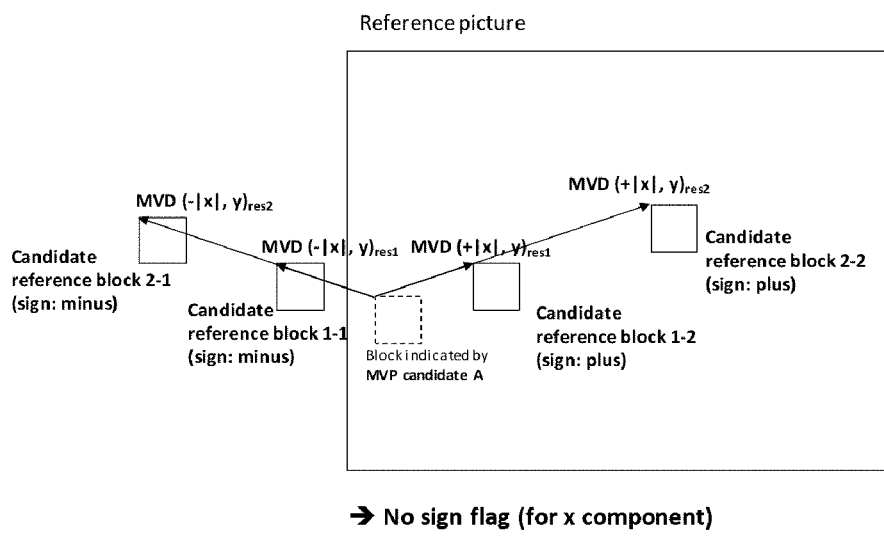
FIG. 27 illustrates a method of implicitly signaling a sign bit of a motion vector differential value of a current block according to an embodiment of the present disclosure.

FIG. 27 illustrates a method of implicitly signaling a sign bit of a motion vector differential value of a current block according to an embodiment of the present disclosure. According to an embodiment, a resolution of the motion vector differential value of the current block may not be determined before a sign of the motion vector differential value of the current block is determined. For example, the sign of the motion vector differential value of the current block may be determined before a resolution indicator indicating a resolution of the motion vector differential value of the current block is parsed on syntax for processing a video signal. In this case, the decoder may acquire reference block candidates (candidate reference block 1-1, candidate reference block 1-2, candidate reference block 2-1, and candidate reference block 2-2) by multiplying one of a plurality of available resolutions (res1 and res2) and adding the motion vector differential value to which one of the negative sign and the positive sign is applied and a motion vector predictor of the current block.

Subsequently, the decoder may determine whether all of the plurality of reference block candidates (candidate reference block 2-1 and candidate reference block 1-1) based on a specific component of the motion vector differential value to which the negative sign is applied are located outside the boundary of the reference picture. In this case, available resolutions applied to the motion vector differential value in order to configure the plurality of reference block candidates based on the specific component of the motion vector differential value to which the negative sign is applied may be different from each other. When all of the plurality of reference block candidates based on the specific component of the motion vector differential value to which the negative sign is applied are located outside the boundary of the reference picture, the decoder may determine a sign of the specific component of the motion vector differential value of the current block without any operation of parsing information on the sign of the specific component. In this case, the decoder may use a positive sign as the sign of the specific component of the motion vector differential value of the current block.

Further, the decoder may determine whether all of the plurality of reference block candidates (candidate reference block 1-2 and candidate reference block 2-2) based on a specific component of the motion vector differential value to which the positive sign is applied are located outside the boundary of the reference picture. In this case, available resolutions applied to the motion vector differential value to configure the plurality of reference block candidates based on the specific component of the motion vector differential value to which the positive sign is applied may be different from each other. When all of the plurality of reference block candidates based on the specific component of the motion vector differential value to which the positive sign is applied are located outside the boundary of the reference picture, the decoder may determine a sign of the specific component of the motion vector differential value of the current block without any operation of parsing information on the sign of the specific component. In this case, the decoder may use a negative sign as the sign of the specific component of the motion vector differential value of the current block.

Although FIGS. 25 to 27 illustrate the x-axis component of the motion vector differential value by way of example for convenience of description, the present disclosure is not limited thereto. For example, above-described embodiments may be applied to the y-axis component of the motion vector differential value through the same method or a corresponding method.

FIG. 28 illustrates an example of syntax for embodiments of FIGS. 25 to 27. Referring to a first syntax order 2801 of FIG. 28, the decoder may determine whether to parse information on a sign of a motion vector differential value on the basis of an absolute value (|MVD|) of the motion vector differential value. Referring to a second syntax order 2802 of FIG. 28, the decoder may determine whether to parse information on a sign of the motion vector differential value on the basis of an absolute value (|MVD|) of the motion vector differential value and a resolution of the motion vector differential value (MVD resolution). Referring to a third syntax order 2803 of FIG. 28, the decoder may determine whether to parse information on a sign of the motion vector differential value on the basis of an absolute value (|MVD|) of the motion vector differential value, a resolution of the motion vector differential value (MVD resolution), and an MVP flag.

FIG. 29 illustrates a method of signaling a resolution of a motion vector differential value of a current block and an MVP according to an embodiment of the present disclosure. According to an embodiment of the present disclosure, two or more pieces of information related to a motion vector may be signaled on the basis of one integrated indicator. For example, the resolution of the motion vector differential value of the current block and the MVP of the current block may be signaled by one integrated indicator (MVR index).

As illustrated in FIG. 29, an available resolution mapped to each of the MVP indexes may be configured in advance. The encoder and the decoder may share a table in which an MVP index and an available resolution are mapped to each other. Further, the encoder and the decoder may acquire the MVP of the current block and the resolution of the motion vector differential value of the current block on the basis of the shared table and integrated indicator (MVR index).

Meanwhile, the accuracy of the motion vector may vary depending on the resolution used for modifying the motion vector differential value. For example, as the resolution used for modifying the motion vector differential value is larger, the accuracy of the motion vector may become lower. Accordingly, when a specific available resolution is used as the resolution of the motion vector differential value of the current block, additional motion vector differential values of the current block may be signaled. Hereinafter, the additional motion vector differential values may be referred to as second to $n^{th}$ motion vector differential values. Further, the conventional motion vector differential value other than the additional motion vector differential values may be referred to as a first motion vector differential value.

FIG. 30 illustrates a method of inducing a motion vector of a current block on the basis of a plurality of motion vector differential values according to an embodiment of the present disclosure. According to an embodiment of the present disclosure, the motion vector of the current block may be acquired using a resolution on the basis of a plurality of motion vector differential values and resolutions corresponding thereto. For example, when the resolution of the motion vector differential value of the current block is larger than a preset resolution, an additional motion vector differential value may be signaled. According to a detailed embodiment, a resolution set of the current block may include available resolutions in units of ¼, 1, and 4 samples. In this case, when the resolution of the motion vector differential value of the current block is '4', the additional motion vector differential value may be signaled. Further, the additional motion vector differential value may be signaled on the basis of a resolution smaller than the resolution for signaling the conventional motion vector differential value. Accordingly, the encoder and the decoder may increase the accuracy of the motion vector and reduce a prediction error.

Referring to FIG. 30, R1 indicates a resolution of a first motion vector differential value, and R2 indicates a resolution of a second motion vector differential value. Further, MVDval1 indicates a first motion vector differential value signaled in units of R1, and MVDval2 indicates a second motion vector differential value signaled in units of R2. For example, when the resolution (R1) of the first motion vector differential value is larger than a preset resolution, the decoder may acquire the additionally signaled second motion vector differential value (MVDval2). In this case, the resolution (R2) of the second motion vector differential value may be smaller than the resolution (R1) of the first motion vector differential value of the current block.

Meanwhile, an inter prediction method or a motion compensation method for the current block according to an embodiment of the present disclosure may include affine model-based motion compensation (hereinafter, affine motion compensation). According to the conventional inter prediction method, inter prediction is performed using only one motion vector for each L0 prediction and each L1 prediction for the current block. Accordingly, the conventional general inter prediction method is optimized for prediction of a translation motion. However, it is required to use various shapes and sizes of reference blocks in order to efficiently perform motion compensation for zoom in/out, rotary, and other irregular motions. Hereinafter, a method of performing affine motion compensation will be described according to an embodiment of the present disclosure.

FIG. 31 illustrates motion compensation based on an affine model according to an embodiment of the present disclosure. Referring to FIG. 31, in affine model compensation, a current block 3101 may be predicted using a reference block 3102 having a size, shape, and/or direction different from that of the current block 3101. That is, the reference block 3102 may have a non-rectangular shape, and may be larger or smaller than the current block 3101. The reference block 3202 may be acquired through affine transform performed on the current block 3101. Through affine transform, scaling, rotation, shearing, reflection, or orthogonal projection may be performed on the current block. According to an embodiment, affine transform may be performing using a plurality of Control point motion vectors (CPMVs). For example, affine transform may include 6-parameter affine transform using a three control point motion vector and 4-parameter affine transform using two control point motion vectors. A detailed embodiment thereof will be described below.

Figure 32:
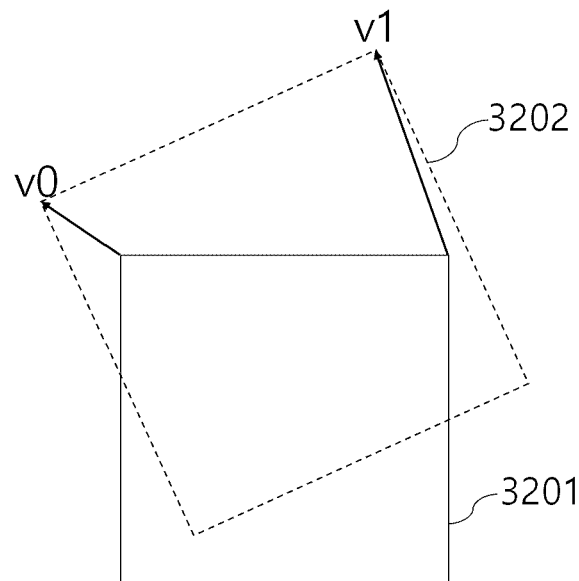
FIG. 32 illustrates an embodiment of a 4-parameter affine motion compensation method.

FIG. 32 illustrates an embodiment of a 4-parameter affine motion compensation method. In order to reduce an amount of calculations and signaling overhead of the affine transform, affine motion compensation may be performed using the preset number of control point motion vectors (CPMVs). The control point motion vector (CPMV) is a motion vector corresponding to a specific control point (or sample location) of the current block. The specific control point may include at least one of corners of the current block. According to an embodiment of the present disclosure, a CPMV corresponding to an upper left corner of the current block is referred to as v0 (or a first CPMV), an upper right corner of the current block is referred to as v1 (or a second CPMV), and a lower left corner of the current block is referred to as v2 (or a third CPMV). A CPMV set including at least two CPMVs may be used for affine motion compensation.

According to an embodiment of FIG. 32, 4-parameter affine motion compensation may be performed using v0 and v1. A current block 3201 expressed by a solid line may be predicted using a reference block 3202 at the location expressed by a dotted line. Samples of the current block 3201 may be mapped to different reference samples through affine transform. More specifically, a motion vector ($V_x$, $V_y$) at the sample location (x, y) of the current block 3201 may be derived from [Equation 2] below. In the present disclosure, the sample location may indicate relative coordinates within the current block. For example, the sample location (x, y) may be coordinates having the location of an upper left sample of the current location as the origin.

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x - \frac{(v_{1x} - v_{0x})}{w}y + v_{0y} \end{cases} \quad \text{[Equation 2]}$$

Here, ($v_{0x}$, $v_{0y}$) indicates a first CPMV corresponding to an upper left corner of the current block 3201, and ($v_{1x}$, $v_{1y}$) indicates a second CPMV corresponding to an upper right corner of the current block. Further, w is a width of the current block 3201.

Figure 33:
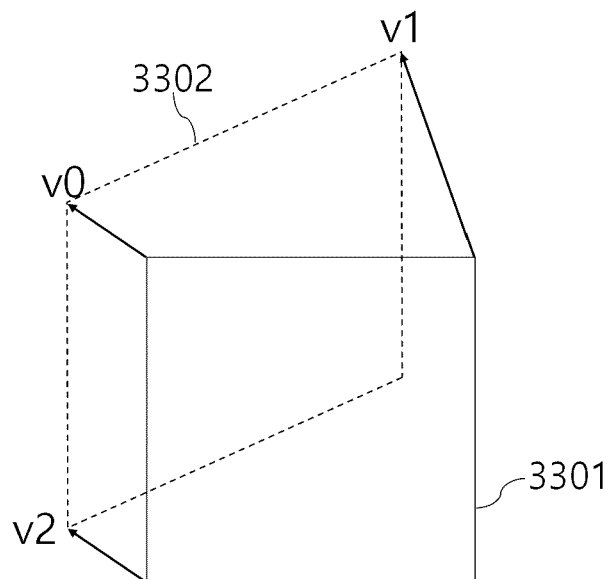
FIG. 33 illustrates an embodiment of a 6-parameter affine motion compensation method.

FIG. 33 illustrates an embodiment of a 6-parameter affine motion compensation method. Affine motion compensation using three or more CPMVs may be performed for more accurately predicting more complicated motion. Referring to FIG. 33, 6-parameter affine motion compensation may be performed using three CPMVs, that is, v0, v1, and v2. Here, v0 is a CPMV corresponding to an upper left corner of the current block v1 is a CPMV corresponding to an upper right corner of the current block, and v2 is a CPMV corresponding to a lower left corner of the current block. A motion vector of each subblock of the current block may be calculated on the basis of v0, v1, and v2. According to an embodiment of FIG. 33, a current block 3301 expressed by the solid line may be predicted using a reference block 3302 at the location expressed by the dotted line. Samples of the current block 3301 may be mapped to different reference samples through affine transform. More specifically, a motion vector ($mv^x$, $mv^y$) at the sample location (x, y) of the current block 3301 may be derived from [Equation 3] below.

$$mv^x = \frac{(mv_1^x - mv_0^x)}{w}x + \frac{(mv_2^x - mv_0^x)}{h}y + mv_0^x \quad \text{[Equation 3]}$$

$$mv^y = \frac{(mv_1^y - mv_0^y)}{w}x + \frac{(mv_2^y - mv_0^y)}{h}y + mv_0^y$$

Here, ($mv_0^x$, $mv_0^y$) denotes a first CPMV corresponding to an upper left corner of the current block 3301, ($mv_1^x$, $mv_1^y$) denotes a second CPMV corresponding to an upper right corner, and ($mv_2^x$, $mv_2^y$) denotes a third CPMV corresponding to a lower left corner. Further, w denotes a width of the current block 3301, and h denotes a height of the current block 3301.

Figure 34:
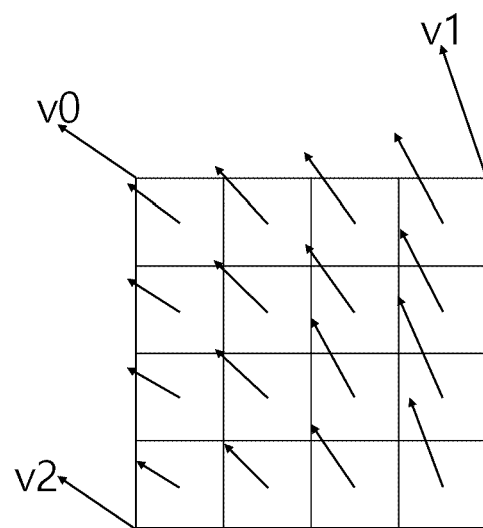
FIG. 34 illustrates an embodiment of a subblock-based affine motion compensation method.

FIG. 34 illustrates an embodiment of a subblock-based affine motion compensation method. A motion vector (that is, a motion vector field) at each sample location of the current block may be induced using affine motion transform. However, in order to reduce an amount of calculations, subblock-based affine motion compensation may be performed as illustrated in FIG. 34. Referring to FIG. 34, the current block may include a plurality of subblocks. Further, a representative motion vector of each subblock may be acquired on the basis of a CPMV set (v0, v1, and v2). According to an embodiment, a representative motion vector of each subblock may be a motion vector corresponding to the sample location in the middle of the corresponding subblock. According to an additional embodiment, as the motion vector of the subblock, a motion vector having higher accuracy than the general motion vector may be used. To this end, a motion compensation interpolation filter may be applied.

The size of the subblock passing through affine motion compensation may be configured through various methods. According to an embodiment of the present disclosure, the subblock may have a preset size such as 4×4 or 8×8. According to an embodiment of the present disclosure, the size MXN of the subblock may be determined by [Equation 4] below.

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{w \times MvPre}{\max(\text{abs}(v_{2x} - v_{0x}), \text{abs}(v_{2y} - v_{0y}))}\right) \end{cases} \quad \text{[Equation 4]}$$

Here, w denotes a width of the current block, and MvPre denotes fraction unit accuracy of the motion vector. ($v_{2x}$, $v_{2y}$) is a third CPMV corresponding to a lower left corner of the current block. According to an embodiment, the third CPMV may be calculated by [Equation 2] above. max(a, b) is a function that returns a larger value between a and b, and abs(x) is a function that returns an absolute value of x. Further, clip3(x, y, z) is a function that returns x in the case of z<x, returns y in the case of z>y, and returns z in the other cases.

The decoder acquires a motion vector of each subblock of the current block through the CPMVs of the CPMV set. Further, the decoder may acquire a predictor of each subblock of the current block through a representative motion vector of each subblock. Through a combination of predictors of the respective subblocks, a predictor of the current block may be acquired, and the decoder may reconstruct the current block through the acquired predictor of the current block.

FIGS. 35, 36, 37, and 38 illustrate embodiments of a method of acquiring a control point motion vector set for predicting a current block. According to an embodiment of the present disclosure, a CPMV set for affine motion compensation of the current block may be acquired through various methods. More specifically, the CPMV for predicting the current block may be acquired with reference to a motion vector information set of one or more neighboring blocks. Further, the motion vector set indicates a set of motion vector information of one or more blocks. The neighboring blocks may be blocks including preset neighboring locations of the current block. In this case, the neighboring blocks may be coding units including preset neighboring locations or areas in preset units (for example, 4×4 or 8×8) including the neighboring locations.

There may be a plurality of candidates which may be referred to for inducing CPMVs of the current block. Accordingly, information on neighboring blocks to be referred to for inducing the CPMVs of the current block may be separately signaled. According to an embodiment of the present disclosure, a CPMV indicator indicating a motion vector information set to be referred to for inducing a motion vector of each subblock of the current block may be signaled. The encoder may signal the CPMV indicator. The CPMV indicator may indicate a motion vector information set of neighboring block(s) to be referred to for inducing the motion vector of each subblock of the current block. The decoder may acquire the indicator and acquire each CPMV of a CPMV set for the current block with reference to the motion vector information set of neighboring block(s) indicated by the indicator.

According to a more detailed embodiment, the encoder and the decoder may generate a CPMV candidate list including one or more motion vector information set candidates. Each motion vector information set candidate included in the CPMV candidate list may be a motion vector set of neighboring blocks which can be used to induce the motion vector of the current block. In this case, a CPMV indicator may be an index indicating one motion vector information set in the CPMV candidate list. CPMVs of the current block may be acquired with reference to a motion vector information set selected on the basis of the CPMV indicator (that is, index) in the CPMV candidate list. Hereinafter, various embodiments of motion vector information set candidates which can be included in the CPMV candidate list for inducing motion vector information (or CPMV set) of the current block will be described.

Figure 35:
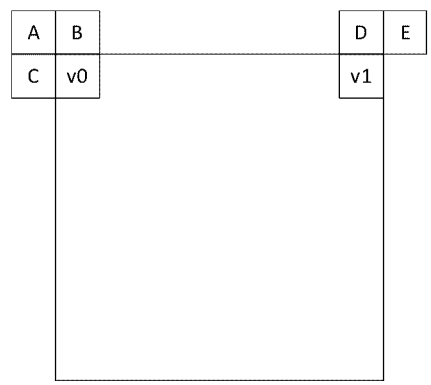

FIG. 35 illustrates an embodiment of acquiring a CPMV set of a current block. In the embodiment of FIG. 35, it is assumed that the CPMV set of the current block includes two CPMVs, that is, v0 and v1. According to an embodiment of the present disclosure, the CPMV of the current block may be induced from a motion vector of a neighboring block adjacent to the corresponding point. Referring to FIG. 35, v0 may be induced from one motion vector among neighboring blocks A, B, and C adjacent to the corresponding point, and v1 may be induced from one motion vector among neighboring blocks D, E, and F adjacent to the corresponding point. When motion vectors of the neighboring blocks A, B, C, D, and E are vA, vB, vC, vD, and vE, a motion vector information set which can be included in a CPMV candidate list may be derived as shown in [Equation 5] below.

$$\{(v0,v1)|v0=\{vA,vB,vC\}, v1=\{vD,vE\}\} \quad \text{[Equation 5]}$$

That is, a pair of (v0, v1) including v0 selected from among vA, vB, and vC, and v1 selected from among vD and vE may be acquired. In this case, v0 may be induced from a motion vector of a block adjacent to an upper left corner of the current block, and v1 may be induced from a motion vector of a block adjacent to an upper right corner of the current block. According to an additional embodiment, motion vector scaling may be performing on the basis of a Picture Order Count (POC) of the current block, a POC of a reference picture of the neighboring block, and a POC of a reference picture of the current block.

The CPMV candidate list including the acquired motion vector information set candidates may be generated, and a CPMV indicator indicating one motion vector information set in the CPMV candidate list may be signaled. According to an additional embodiment of the present disclosure, the CPMV candidate list may include a motion vector information set candidate for inter prediction of another scheme. For example, the CPMV candidate list may include motion vector information set candidates acquired on the basis of MVP candidates for conventional inter prediction.

The decoder may drive CPMVs of the current block on the basis of the motion vector information set acquired from the candidate list. According to an embodiment, the decoder may perform affine merge prediction by using motion vectors of the motion vector information set acquired from the candidate list as a CPMV of the current block without any separate motion vector differential value. The affine motion compensation method may be referred to as a merge prediction mode.

According to another embodiment, the decoder may acquire a separate motion vector differential value for a CPMV of the current block. The decoder may acquire the CPMV of the current block by adding motion vectors of the motion vector information set acquired from the CPMV candidate list and the motion vector differential value. The affine motion compensation method may be referred to as an affine inter prediction mode. The decoder may separately signal a flag or an index indicating whether to use a separate motion vector differential value for affine motion compensation of the current block. According to an additional embodiment, whether to use the separate motion vector differential value for affine motion compensation of the current block may be determined on the basis of the size of the current block (for example, CU size). For example, when the size of the current block is larger than or equal to a preset size, the encoder and the decoder may be configured to use the separate motion vector differential value for affine motion compensation of the current block.

Figure 36:
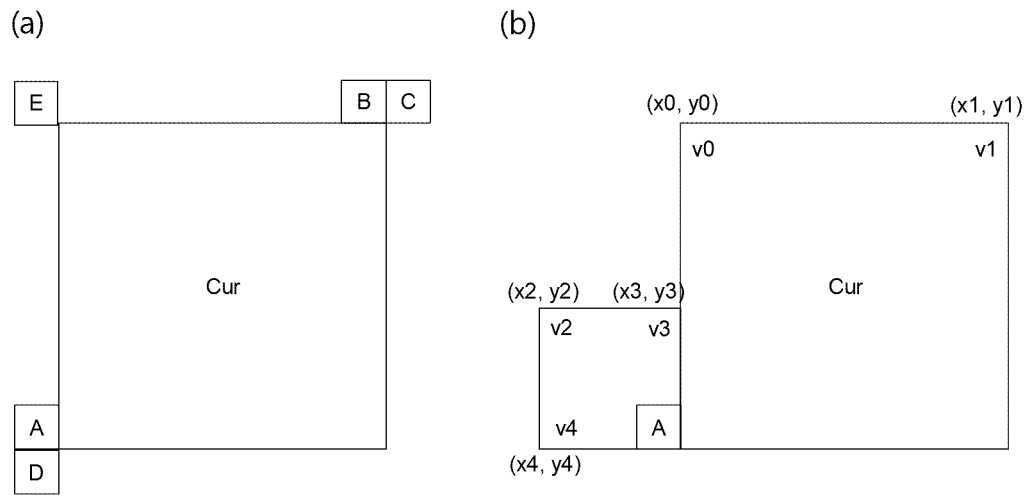

FIG. 36 illustrates another embodiment of acquiring the CPMV set of the current block. According to another embodiment of the present disclosure, the CPMV of the current block may be derived from motion vector information of a neighboring block having passed through affine motion compensation. That is, the CPMV of the current block may be derived from a CPMV of a neighboring block or a motion vector. In this case, the neighboring block may include a left neighboring block of the current block and an upper neighboring block of the current block. Referring to FIG. 36(a), the left neighboring block includes blocks adjacent to a lower left corner of the current block, that is, a left block A and a lower left block D. Further, the upper neighboring block includes blocks adjacent to an upper left corner of the current block, that is, an upper left block E, and blocks adjacent to an upper right corner of the current block, that is, an upper block B and an upper right block C. The decoder identifies whether affine motion compensation is performed on neighboring blocks in a preset order. According to an embodiment, the preset order may be A, B, C, D, and E. When a neighboring block having passed through affine motion compensation is found, the decoder acquires a CPMV set of the current block using a CPMV set (or motion vector) of the corresponding neighboring block. Referring to FIG. 36(b), a CPMV set of the left block A may be used to induce a CPMV set of the current block. That is, CPMV sets (v0 and v1) of the current block may be acquired on the basis of CPMV sets (v2, v3, and v4) of the left block A.

According to an embodiment of the present disclosure, information on neighboring blocks to be referred may be separately signaled to induce CPMVs of the current block. In this case, each of the CPMV sets of the neighboring blocks of the current block may be a motion vector information set included in the CPMV candidate list according to a preset order. More specifically, the motion vector information set candidates may include a first candidate induced from CPMVs (or motion vector) of the left neighboring block of the current block and a second candidate induced from CPMVs (or motion vector) of the upper neighboring block of the current block. In this case, the left neighboring block is a block adjacent to a lower left corner of the current block, and the upper neighboring block is a block adjacent to the upper left corner of the current block or a block adjacent to an upper right corner of the current block. The CPMV candidate list including the acquired motion vector information set candidates may be generated, and a CPMV indicator indicating one motion vector information set in the CPMV candidate list may be signaled. According to an embodiment, the CPMV indicator may indicate location information of neighboring block(s) referred to for inducing a motion vector of each subblock of the current block. The decoder may acquire the CPMV set of the current block with reference to the CPMV set (or motion vector) of the neighboring block indicated by the CPMV indicator.

According to an additional embodiment of the present disclosure, the CPMV of the current block may be induced on the basis of the CPMV of the neighboring block close to the corresponding point. For example, v0 may be acquired with reference to the CPMV of the left neighboring block, and v1 may be acquired with reference to the CPMV of the upper neighboring block. Alternatively, v0 may be acquired with reference to the CPMV of the neighboring block A, D, or E, and v1 may be acquired with reference to the CPMV of the neighboring block B or C.

Figure 37:
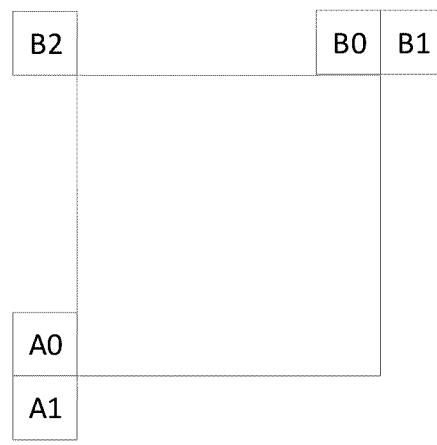

Another embodiment of acquiring the CPMV set of the current block is illustrated. According to an embodiment, the CPMV of the current block may be induced from a CPMV of a block having passed through affine motion compensation or a motion vector. For example, when affine motion compensation is performed on a block corresponding to a preset location based on the current block, a CPMV of the current block may be induced from a CPMV set of the corresponding block or at least one motion vector. Referring to FIG. 37, the preset location may be the location of A0 and A1 adjacent to a lower left corner of the current block, the location of B0 and B1 adjacent to an upper right corner, or the location of B2 which is an upper left side. According to the present embodiment, the preset location may include a location which is not adjacent to the current block. For example, the preset location may include a location corresponding to the location of the current block within another picture which is not the current picture. That is, the CPMV set of the current block may be induced from a spatial candidate or a temporal candidate corresponding to the preset location. The motion information set candidate acquired through the method described with reference to FIG. 37 may be referred to as an inherited candidate or an affine merge candidate.

As described with reference to FIGS. 36 and 37, the CPMV of the current block may be induced from motion vector information of the neighboring block having passed through affine motion compensation. According to a detailed embodiment, CPMV sets ((v_0x, v_0y) and (v_1x, v_1y)) for 4-parameter affine motion compensation for the current block may be induced as shown in [Equation 6].

[Equation 6]

$$\begin{cases} v_{0x} = \frac{(v_{E1x} - v_{E0x})}{(x_{E1} - x_{E0})}(x_0 - x_{E0}) + \frac{(v_{E2x} - v_{E0x})}{(y_{E2} - y_{E0})}(y_0 - x_{E0}) + v_{E0x} \\ v_{0y} = \frac{(v_{E1y} - v_{E0y})}{(x_{E1} - x_{E0})}(x_0 - x_{E0}) + \frac{(v_{E2y} - v_{E0y})}{(y_{E2} - y_{E0})}(y_0 - x_{E0}) + v_{E0y} \end{cases}$$

$$\begin{cases} v_{1x} = \frac{(v_{E1x} - v_{E0x})}{(x_{E1} - x_{E0})}(x_1 - x_{E0}) + \frac{(v_{E2x} - v_{E0x})}{(y_{E2} - y_{E0})}(y_1 - x_{E0}) + v_{E0x} \\ v_{01} = \frac{(v_{E1y} - v_{E0y})}{(x_{E1} - x_{E0})}(x_1 - x_{E0}) + \frac{(v_{E2y} - v_{E0y})}{(y_{E2} - y_{E0})}(y_1 - x_{E0}) + v_{E0y} \end{cases}$$

Here, (v_E0x, v_E0y) denotes a motion vector used for affine motion compensation of the upper left block of the current block, (v_E1x, v_E1y) denotes a motion vector used for affine motion compensation of the upper right block of the current block, and (v_E2x, v_E2y) denotes a motion vector used for affine motion compensation of the lower left block of the current block.

FIG. 38 illustrates a method of acquiring the control point motion vector of the current block according to another embodiment of the present disclosure. According to an embodiment, a CPMV of the current block may be acquired with reference to one or more motion vectors adjacent to the current block. In this case, one or more motion vectors adjacent to the current block may include a motion vector which is not a motion vector used for affine motion vector. For example, the CPMV of the current block may be induced from a motion vector at a preset location based on the corresponding point. For example, the preset location may be a location included in a block within a predetermined distance from a point corresponding to the CPMV to be induced.

Referring to FIG. 38, a first CPMV (mv0), a second CPMV (mv1), and a third CPMV (mv2) for affine motion compensation of the current block may be induced from the motion vector at the preset location. For example, the first CPMV (mv0) may be induced from motion vector information of each of locations A, B, and C near an upper left corner. The second CPMV (mv1) may be induced from motion vector information of each of locations D and E near an upper right corner. The third CPMV (mv2) may be induced from motion vector information of each of locations F and G near a lower left corner.

According to an embodiment, the decoder may identify the usability of the motion vector at the location adjacent to the CPMV in a preset order. When an available motion vector is found, the decoder may acquire the CPMV through the corresponding motion vector. Further, a preset combination of nearby locations referred to for inducing the CPMV may be used for each point of the current block. The motion information set candidate acquired through the method described with reference to FIG. 38 may be referred to as a constructed candidate or an affine inter candidate. The motion vector information sets described with reference to FIGS. 35 to 38 may be motion vector information set candidates included in a CPMV candidate list in a preset order.

FIG. 39 illustrates a method of acquiring the control point motion vector of the current block according to another embodiment of the present disclosure. As described above, a plurality of CPMVs may be used for affine motion compensation of the current block. According to an embodiment of the present disclosure, some of a plurality of CPMVs included in a CPMV set for motion compensation of the current block may be induced on the basis of other CPMVs. For example, the encoder and the decoder may acquire CPMVs corresponding to two points of the current block through the above-described method. Subsequently, the encoder and the decoder may induce a CPMV corresponding to another point of the current block from the acquired CPMVs.

Referring to FIG. 39, a third CPMV ($mv_2^x$, $mv_2^y$) may be induced from a first CPMV ($mv_0^x$, $mv_0^y$) and a second CPMV ($mv_1^x$, $mv_1^y$), and the second CPMV ($mv_1^x$, $mv_1^y$) may be induced from the first CPMV ($mv_0^x$, $mv_0^y$) and the third CPMV ($mv_2^x$, $mv_2^y$). In an equation of FIG. 39, w and h may be a width and a height of the current block.

FIG. 40 illustrates a method of acquiring the control point motion vector of the current block according to an embodiment. As described above, the CPMV set of the current block may include a plurality of CPMVs. Further, the CPMV set may be acquired on the basis of a CPMV predictor and a motion vector differential value for each of a plurality of CPMVs. The motion vector differential value of the CPMV may be signaled to the decoder from the encoder. That is, a motion vector differential value used for inducing the CPMV may be signaled for each CPMV for affine motion compensation of the current block. Hereinafter, the motion vector differential value of the CPMV may be referred to as a CPMV differential value. In FIG. 40, mv0, mv1, and mv2 shown on an upper bar may indicate CPMV predictors of the first CPMV (mv0), the second CPMV (mv1), and the third CPMV (mv2).

FIG. 40(a) illustrates a method of acquiring the first CPMV (mv0) and the second CPMV (mv1) of the current block when 4-parameter affine motion compensation is performed. A first CPMV differential value (mvd0) and a second CPMV differential value (mvd1) of the first CPMV (mv0) and the second CPMV (mv1) may be separately signaled.

FIG. 40(b) illustrates a method of acquiring the first CPMV (mv0), the second CPMV (mv1), the third CPMV (mv2) of the current block when 6-parameter affine motion compensation is performed. A first CPMV differential value (mvd0), a second CPMV differential value (mvd1), and a third CPMV differential value (mvd2) of the first CPMV (mv0), the second CPMV (mv1), and the third CPMV (mv2) may be separately signaled.

FIG. 41 illustrates a method of signaling a control point motion vector differential value of a current block according to an embodiment of the present disclosure. The CPMV differential value of the current block may be signaled according to the syntax described with reference to FIG. 9. The decoder may acquire the CPMV differential value (1MVD) of the current block on the basis of at least one piece of information on the signaled motion vector differential value. In FIG. 41, compIdx is an index indicating a component of the motion vector differential value, and may be 0 or 1. For example, compIdx may indicate one of an x-axis component or a y-axis component of the motion vector differential value. Further, the CPMV differential value of the current block may be different for each reference picture list. In FIG. 41, L0 indicates a first reference picture list, and L1 indicates a second reference picture list.

Meanwhile, a CPMV differential value corresponding to a specific point of the current block may be similar to a CPMV differential value corresponding to another point of the current block. Accordingly, the CPMV differential value corresponding to the specific point of the current block may be acquired on the basis of the CPMV differential value corresponding to another point of the current block. Therefore, the encoder and the decoder may reduce signaling overhead of the CPMV differential value.

FIG. 42 illustrates a method of acquiring the control point motion vector of the current block according to another embodiment of the present disclosure. Referring to FIG. 42, a CPMV set for affine motion compensation of the current block may be induced on the basis of at least one common CPMV differential value. For example, a CPMV corresponding to a specific point of the current block may be acquired on the basis of a CPMV differential value corresponding to another point of the current block.

The encoder may signal one common CPMV differential value and at least one additional differential value for affine motion compensation of the current block. Further, the decoder may acquire a CPMV set for affine motion compensation of the block through one common CPMV differential value and at least one additional differential value. In FIG. 42, mv0, mv1, and mv2 shown on an upper bar may indicate CPMV predictors of the first CPMV (mv0), the second CPMV (mv1), and the third CPMV (mv2).

FIG. 42(a) illustrates a method of acquiring the first CPMV (mv0) and the second CPMV (mv1) of the current block when 4-parameter affine motion compensation is performed. A first CPMV differential value (mvd0) of the first CPMV (mv0) may be signaled. Further, a first additional differential value (mvd1') used for acquiring the second CPMV differential value may be signaled. Specifically, the second CPMV differential value may be expressed as a value obtained by adding the first CPMV differential value (mvd0) and the first additional differential value (mvd1'). That is, the second CPMV (mv1) may be acquired on the basis of a second CPMV predictor, the first CPMV differential value (mvd0), and the first additional differential value (mvd1'). When the first CPMV differential value is similar to the second CPMV differential value, the first additional differential value (mvd1') may be smaller than the second CPMV differential value. Accordingly, the encoder and the decoder may reduce signaling overhead of the CPMV differential value compared to the method described with reference to FIG. 40.

FIG. 42(b) illustrates a method of acquiring the first CPMV (mv0), the second CPMV (mv1), the third CPMV (mv2) of the current block when 6-parameter affine motion compensation is performed. A first CPMV differential value (mvd0) of the first CPMV (mv0) may be signaled. Further, a first additional differential value (mvd1') and a second additional differential value (mvd2') used for acquiring the second CPMV differential value and the third CPMV differential value may be signaled. Specifically, the second CPMV differential value may be expressed as a value obtained by adding the first CPMV differential value (mvd0) and the first additional differential value (mvd1'). Further, the third CPMV differential value may be expressed as a value obtained by adding the first CPMV differential value (mvd0) and the second additional differential value (mvd2').

FIG. 43 illustrates a method of signaling the control point motion vector differential value when the control point motion vector of the current block is acquired according to the embodiment described with reference to FIG. 42. As described above, the CPMV set for affine motion compensation of the current block may include a plurality of CPMVs. In this case, CPMV differential values (MvdLX) of some of the plurality of CPMVs may be acquired on the basis of a differential value of another rCPMV and an additional differential value. In FIG. 43, 1Mvd may be one of a differential value of a preset CPMV or at least one additional differential value.

In FIG. 43, cpIdx may indicate a control point index of the current block. For example, when 4-parameter affine motion compensation is performed on the current block, cpIdx may be 0 or 1. When 6-parameter affine motion compensation is performed on the current block, cpIdx may be 0, 1, or 2. According to an embodiment, a CPMV differential value (MvdLx) may be determined through different methods according to cpIdx. For example, when cpIdx is a preset value (for example, '0'), MvdLx may be a differential value of a preset CPMV ((1Mvd[0][compIdx]). For example, when cpIdx is not a preset value (for example, '0'), MvdLx may be a value obtained by adding the differential value of the preset CPMV ((1Mvd[0][compIdx]) and an additional differential value corresponding to the corresponding index. MvdLx may indicate a difference between the CPMV and the CPMV predictor. That is, MvdLx may be (CPMV−CPMV predictor).

Further, compIdx is an index indicating a component of the motion vector differential value, and may be 0 or 1. For example, compIdx may indicate one of an x-axis component or a y-axis component of the motion vector differential value. Further, the CPMV differential value of the current block may be different for each reference picture list. In FIG. 41, L0 indicates a first reference picture list, and L1 indicates a second reference picture list.

FIG. 44 illustrates a method of signaling a control point motion vector differential value of a current block according to an embodiment of the present disclosure. Referring to FIG. 44, the CPMV differential value may be encoded through a method similar to the method of signaling the motion vector differential value described with reference to FIG. 9. For example, the encoder may generate at least one piece of information on the CPMV differential value by separately encoding the CPMV differential value according to the control point index (cpIdx). Further, the encoder may signal at least one piece of information on the encoded CPMV differential value. The decoder may acquire the CPMV differential value for each control point index (cpIdx) on the basis of at least one piece of information on the CPMV differential value.

The embodiments related to the resolution of the motion vector differential value may be applied to the CPMV differential values described with reference to the embodiments of FIGS. 9, 43, and 44 through the same method or a corresponding method. For example, when the resolution of the CPMV differential value of the current block is R, the signaled CPMV differential value may be modified on the basis of R. In this case, the decoder may acquire the modified CPMV differential value by multiplying the signaled CPMV differential value and the resolution (R).

FIG. 45 illustrates a method of acquiring a motion vector through a differential predictor of a control point motion vector differential value of a block according to an embodiment of the present disclosure. Referring to FIG. 45, a CPMV differential value indicating a difference between a CPMV of the current block and a CPMV predictor may be determined on the basis of a differential predictor (mvdp). The differential predictor (mvdp) may indicate a prediction value for the difference between the CPMV and the CPMV predictor. Specifically, the CPMV differential value may be acquired on the basis of the differential predictor (mvdp) and additional differential values (mvd0", mvd1", and mvd2").

For example, the differential predictor (mvdp) and the additional differential values (mvd0", mvd1", and mvd2") may be signaled to the decoder from the encoder. Each of mvdp, mvd0", mvd1", and mvd2" may be encoded or decoded through the method described with reference to FIG. 9 or 44 (when 6-parameter affine motion compensation is performed). In FIG. 45, mv0, mv1, and mv2 shown on an upper bar may indicate CPMV predictors of the first CPMV (mv0), the second CPMV (mv1), and the third CPMV (mv2). The encoder and the decoder may reduce signaling overhead for the CPMV differential value through the differential predictor (mvdp).

Meanwhile, according to an embodiment of the present disclosure, the differential predictor may be acquired on the basis of at least one of a plurality of CPMVs included in a CPMV set of the current block. For example, the differential predictor may be one CPMV differential value among a plurality of CPMVs included in the CPMV set of the current block. Hereinafter, a method of acquiring the differential predictor used for inducing the CPMV set of the current block will be described.

FIG. 46 illustrates a method of acquiring a control point motion vector of a current block through a differential predictor according to an embodiment of the present disclosure. According to an embodiment of the present disclosure, the encoder and the decoder may acquire a differential predictor (mvdp) of the current block through at least one of mvd0, mvd1, and mvd2 (hereinafter, referred to as mvdxs) of the current block. According to an embodiment, the differential predictor (mvdp) may be configured as a value smaller than an absolute value of mvdx which is the smallest among mvdxs. Alternatively, the differential predictor (mvdp) may be configured as a value larger than an absolute value of mvdx which is the largest among mvdxs. In this case, signs of the additional differential values (mvd0", mvd1", and mvd2" of FIG. 45) used for inducing the plurality of CPMVs included in the CPMV set of the current block may be the same. According to the present embodiment, the additional differential value may indicate a difference between mvdx and the differential predictor (mvdp).

For example, when the differential predictor (mvdp) is configured as a value smaller than an absolute value of mvdx which is the smallest among mvdxs, signs of the additional differential values (mvd0", mvd1", and mvd2" of FIG. 45) may be the same as each other, that is, a positive sign (+).

Further, when the differential predictor (mvdp) is configured as a value larger than an absolute value of mvdx which is the largest among mvdxs, signs of the additional differential values (mvd0", mvd1", and mvd2" of FIG. 45) may be the same as each other, that is, a negative sign (−).

Referring to FIG. 46, the differential predictor (mvdp) may be configured as a value smaller than an absolute value of mvdx which is the smallest among mvdxs. In FIG. 46, a horizontal break-off line indicates the smallest value among absolute values of the x component of each mvdx, and a vertical break-off line indicates the smallest value among absolute values of the y-axis component of each mvdx. A value of the x axis coordinate increases to the right side, and a value of the y-axis coordinate may increase to the upper side. In this case, the differential predictor (mvdp) may be a value within a third quadrant (mvdp area) in four quadrants partitioned by break-off lines.

In this case, all of the signs of the additional differential values of the current block may be a positive sign (+). Accordingly, information on the signs of the additional differential values may not be separately signaled. Specifically, each of the differential predictor (mvdp) of the current block and the additional differential values (mvdx") may be induced as shown in [Equation 7].

For mvdp, mvd_sign_flag,

1Mvd[cpIdx][compIdx]=abs_mvd_greater0_flag
    [cpIdx][compIdx]*(abs_mvd_minus2[cpIdx]
    [compIdx]+2)*(1−2*mvd_sign_flag[cpIdx][com-
    pIdx])                                                    [Equation 7]

For mvdx" (mvdx−mvdp), no mvd_sign_flag

1Mvd[cpIdx][compIdx]=abs_mvd_greater0_flag
    [cpIdx][compIdx]*(abs_mvd_minus2[cpIdx]
    [compIdx]+2)

Referring to [Equation 7], information (mvd_sign_flag) on the sign of the differential predictor (mvdp) may be signaled. The encoder may signal the information on the signal of the differential predictor. Further, the decoder may acquire a CPMV set of the current block on the basis of the information (mvd_sign_flag) on the signal of the differential predictor. On the other hand, information indicating the sign of each additional differential value (mvdx") may not be signaled. According to an additional embodiment, an mvdp indicator indicating a method of determining the differential predictor (mvdp) may be signaled. For example, the mvdp indicator may be a flag indicating whether to determine the differential value (mvdp) as a value smaller than the minimum value of mvdxs or a value larger than the maximum value.

FIG. 47 illustrates a method of acquiring the control point motion vector of the current block through the differential predictor according to another embodiment of the present disclosure. According to an embodiment of the present disclosure, the differential predictor of the current block may be one CPMV differential value among a plurality of CPMVs included in a CPMV set of the current block. Referring to FIG. 46, the differential predictor may vary depending on Method 0, Method 1, or Method 2. For example, in Method 0, the differential predictor may be mvd0. In Method 1, the differential predictor may be mvd1. In Method 2, the differential predictor may be mvd2.

According to an embodiment, an mvdp indicator (cpIdx-Pred) indicating a method of determining the differential predictor among a plurality of methods may be signaled. The plurality of methods may include at least one of Method 0, Method 1, and Method 2 of FIG. 47, and methods described with reference to FIG. 46. In the embodiment of FIG. 47, the encoder may signal the mvdp indicator (cpIdePred) indicating one of Method 0, Method 1, and Method 2. Further, the decoder may determine of the Method 0, Method 1, and Method 2 on the basis of the mvdp indicator (cpIdePred). The decoder may acquire the differential predictor of the current block according to the determined method. Further, the decoder may acquire the CPMV set of the current block on the basis of the acquired differential predictor.

According to another embodiment, the mvdp indicator (cpIdePred) may be implicitly signaled. That is, the encoder and the decoder may determine the differential predictor of the current block without signaling the mvdp indicator (cpIdePred). This will be described in detail with reference to FIGS. 49 to 50.

FIG. 48 illustrates a method of acquiring a differential predictor according to an embodiment of the present disclosure. According to an embodiment of the present disclosure, when a control point index (cpIdx) is the same as an mvdp indicator (cpIdePred), the differential predictor may be used as a differential value of the corresponding CPMV. When the control point index (cpIdx) is not the same as the mvdp indicator (cpIdePred), the differential value of the corresponding CPMV may be acquired on the basis of an additional differential value corresponding to cpIdx and the differential predictor. The mvdp indicator (cpIdePred) indicating a method having high coding efficiency of the motion vector differential value may be signaled. In FIG. 48, 1Mvd may indicate one of a differential predictor or additional differential values. Further, MvdLX may indicate a CPMV differential value.

In FIG. 48, LX may indicate a reference picture list L0 or L1. Further, the mvdp indicator may be expressed by variable-length bits. For example, the mvdp indicator may be signaled through a truncated unary method. The embodiments described with reference to FIGS. 46 to 48 may be implemented for each component of the motion vector differential values. The embodiments related to the resolution of the motion vector differential value may be applied to the CPMV differential values described with reference to the embodiments of FIGS. 46 to 48 through the same method or a corresponding method. For example, when the resolution of the CPMV differential value of the current block is R, the signaled CPMV differential value may be modified on the basis of R. In this case, the decoder may acquire the modified CPMV differential value by multiplying the CPMV differential value and the resolution (R).

According to an embodiment of the present disclosure, the mvdp indicator can be signaled or determined through a method of reducing signaling of 1Mvd for the control point index which is not the mvdp indicator (cpIdxPred). For example, the mvdp indicator may be signaled such that a sign of 1Mvd for the control point index which is not the mvdp indicator is the same. Alternatively, the differential predictor may be determined without explicit signaling. This will be described below with reference to FIGS. 49 to 51.

As described above, when the differential predictor of the current block is determined as the minimum value or the maximum value among absolute values of the CPMV differential value of the current block, signs of 1Mvds for the control point index may be the same. In this case, when the control point index is different from the mvdp indicator, information on the sign may not be signaled. The minimum or maximum absolute value of the CPMV differential value may be the minimum or maximum absolute value of a specific component. For example, when the mvdp indicator indicates one of three values, one mvdp indicator may be signaled using 1 bit and two mvdp indicators may be signaled using 2 bits through the truncated unary method.

According to another embodiment of the present disclosure, the mvdp indicator may be a CPMV differential value corresponding to a middle value or an intermediate value among absolute values of the CPMV differential value. In this case, one of the signs of 1Mvd may be (+), and another may be (−). Accordingly, information on the sign of each of the two CPMV differential values may be signaled using 1 bit. Therefore, the encoder and the decoder may reduce signaling overhead for information on the sign of the CPMV differential value.

According to another embodiment of the present disclosure, the mvdp indicator (cpIdxPred) indicating a method of determining the differential predictor of the current block may be implicitly signaled. For example, the method of determining the differential predictor of the current block may be determined on the basis of other information. More specifically, the encoder and the decoder may determine a CPMV differential value having the largest absolute value among CPMV differential values of the current block as the differential predictor. When the motion vector differential value is signaled, it may be more advantageous as the absolute value of the differential predictor used for inducing the plurality of CPMVs is larger.

FIG. 49 illustrates a method of determining a differential vector predictor of a current block according to an embodiment of the present disclosure. Referring to FIG. 49, three CPMVs may be used for affine motion compensation of the current block. Hereafter, although an x-axis component is described by way of example for convenience of description, the disclosure is not limited thereto. The following embodiment may be applied to a y-axis component through the same method or a corresponding method. According to an embodiment, a control point index indicating a CPMV having the minimum absolute value of the x-axis component among Mvd0, Mvd1, and Mvd2 which are CPMV differential values of the CPMVs of the current block may be '1'.

In FIG. 49, a break-off line indicates a value of the x-axis component of a reference predictor. As illustrated in FIG. 49, when a CPMV differential value having the minimum absolute value is used as the differential predictor, signs of the remaining CPMV differential values which are not selected as the differential predictor may be the same as each other, that is, a positive sign (+). Accordingly, the encoder may omit signaling of the mvdp indicator. Further, the decoder may induce a CPMV set of the current block without any mvdp indicator.

FIG. 50 illustrates a method of signaling a control point motion vector differential value of a current block. When a sign bit hiding method is used as described with reference to FIGS. 48 to 49, signaling of information on the sign in the case in which the control point index is different from the mvdp indicator may be omitted. Referring to FIG. 50, information (mvd_sign_flag) on the sign of the motion vector differential value may be parsed when the control point index is the same as the mvdp indicator. On the other hand, when the control point index is different from the mvdp indicator, the information on the sign may not be parsed. In [0] and [1] of FIG. 50, 0 and 1 are component indexes and may indicate an x-axis component and a y-axis component.

According to an embodiment of the present disclosure, information on the motion vector differential value may be sequentially parsed according to a preset order. In this case, the preset order may be an order set on the basis of the control point index. According to an embodiment, the preset order may be an order determined on the basis of the mvdp indicator.

According to an embodiment of the present disclosure, a function of coding the motion vector differential value may exist. Further, the function of coding the motion vector differential value may be, for example, mvd_coding syntax of FIG. 50. According to an embodiment, the decoder may parse information on the motion vector differential value according to the control point index. For example, the mvd_coding syntax of FIG. 50 may be performed for each control point index. In this case, the preset order may be as shown in [Equation 8] below. According to [Equation 8], parsing may be performed always in the same order.

$$\text{mvd\_coding}(\ldots,\ldots,\text{cpIdx0})$$

$$\text{mvd\_coding}(\ldots,\ldots,\text{cpIdx1})$$

$$\text{mvd\_coding}(\ldots,\ldots,\text{cpIdx2}) \quad\quad [\text{Equation 8}]$$

According to another embodiment, information on the CPMV differential value corresponding to the mvdp indicator may be parsed earlier than information on another CPMV differential value which does not correspond to the mvdp indicator. In this case, a CPMV differential value corresponding to the corresponding control point index may be calculated immediately after an additional differential value corresponding to a specific control point index is decoded. Unlike the present embodiment, the information on the CPMV differential value corresponding to the mvdp indicator may not be parsed earlier than information on another CPMV differential value which does not correspond to the mvdp indicator. In this case, there may be a waiting time to calculate a CPMV differential value corresponding to the corresponding control point index after an additional differential value corresponding to a specific control point index is decoded. In a detailed example, when the mvdp indicator is '1', mvd_coding syntax may be as shown in [Equation 9] below.

$$\text{mvd\_coding}(\ldots,\ldots,\text{cpIdx1})$$

$$\text{mvd\_coding}(\ldots,\ldots,\text{cpIdx0})$$

$$\text{mvd\_coding}(\ldots,\ldots,\text{cpIdx2}) \quad\quad [\text{Equation 9}]$$

In another detailed example, when the mvdp indicator is '2', mvd_coding syntax may be as shown in [Equation 10] below.

$$\text{mvd\_coding}(\ldots,\ldots,\text{cpIdx2})$$

$$\text{mvd\_coding}(\ldots,\ldots,\text{cpIdx0})$$

$$\text{mvd\_coding}(\ldots,\ldots,\text{cpIdx1}) \quad\quad [\text{Equation 10}]$$

FIG. 51 illustrates a method of inducing the control point motion vector of the current block according another embodiment of the present disclosure. In FIG. 51, 1Mvd may indicate a differential predictor or an additional differential value. Referring to FIG. 51, when a specific control point index is the same as an mvdp indicator, a differential predictor may be calculated on the basis of information on a sign. Unlike this, when the specific control point index is different from the mvdp index, information on a signal may not be used to calculate an additional differential value.

Meanwhile, according to an embodiment of the present disclosure, as the resolution of the motion vector differential value, different values may be used for a plurality of CPMVs for motion compensation of the current block. For example, the resolution of signaling the CPMV differential value may vary depending on the control point index. According to an embodiment, when the differential predictor is used as illustrated in FIGS. 42, 45, and 47, different values may be used for a plurality of CPMVs of the current block as the resolution of the motion vector differential value.

According to an embodiment, a CPMV differential value of a specific control point index may be used as a differential predictor of the current block. In this case, the resolution for the CPMV differential value corresponding to the corresponding control point index may be signaled. Further, the CPMV differential value corresponding to the corresponding control point index may be signaled on the basis of the corresponding resolution. On the other hand, CPMV differential values corresponding to the remaining control point indexes other than the corresponding control point index may be signaled on the basis of a preset resolution. In this case, the resolution indicating the signaling unit of the CPMV differential values corresponding to the remaining control point indexes other than the corresponding control point index may not be signaled. Further, the preset resolution may be a default value.

According to another embodiment, the CPMV differential value used as the differential predictor of the current block may be signaled on the basis of a resolution in the relatively small unit. Further, a CPMV differential value of another control point other than the CPMV differential value used as the differential predictor of the current block may be signaled on the basis of a resolution in the relatively large unit.

Meanwhile, according to an embodiment of the present disclosure, a plurality of CPMVs for affine motion compensation of the current block may be acquired from a single CPMV predictor. In this case, the plurality of CPMVs may be induced using a single CPMV differential value and a plurality of CPMV differential values. Accordingly, the encoder and the decoder may increase coding efficiency of the CPMV differential value. Further, the encoder and the decoder may reduce signaling overhead of the CPMV differential value.

FIG. 52 illustrates a method of inducing a plurality of control point motion vectors for affine motion compensation of a current block according to an embodiment of the present disclosure. Referring to FIG. 52, a first CPMV differential value (Mvd0) and a second CPMV differential value (Mvd1) may be acquired on the basis of a common differential predictor (mvdp) and a single differential absolute value (mvdd). For example, the first CPMV differential value (Mvd0) may be acquired on the basis of a sum of mvdp and mvdd. Further, the first CPMV differential value (Mvd1) may be acquired on the basis of a sum of mvdp and −mvdd.

For example, the encoder may signal the common differential predictor (mvdp) and the differential absolute value (mvdd). The decoder may acquire CPMV differential values corresponding to a plurality of control points of the current block on the basis of the common differential predictor (mvdp) and the differential absolute value (mvdd). Although FIG. 52 illustrates 4-parameter affine motion compensation, the present disclosure is not limited thereto. For example, when 6-parameter affine motion compensation is performed, some of CPMVs included in a CPMV set of the current block may be induced using a CPMV predictor and a CPMV differential value of another CPMV.

According to an embodiment of the present disclosure, the current block may be additionally split according to a prediction mode of the current block. For example, when the prediction mode of the current block is an intra prediction mode, the encoder and the decoder may split the current block into a plurality of subblocks and perform intra prediction on each of the subblocks. The decoder may receive intra prediction mode information from a bitstream. The decoder may determine whether to split the current block into a plurality of subblocks on the basis of the intra prediction mode information. In this case, information on a method of splitting the current block into the plurality of subblocks may be additionally signaled. Alternatively, the encoder and the decoder may split the current block through a preset method between the encoder and the decoder according to the intra prediction mode information. Subsequently, the decoder may perform intra prediction on the current block or each of the subblocks on the basis of the intra prediction mode information of the current block. Hereinafter, in embodiments of FIGS. 53 to 60, the current block may be used as the term indicating a coding unit. Further, Sub-CUs (SCUs) of FIGS. 53 to 60 may indicate a plurality of subblocks split from the current block. Hereinafter, a method of splitting the current block into a plurality of subblocks will be described in detail.

FIG. 53 illustrates various embodiments of the form in which the current block is split into a plurality of subblocks. FIGS. 53(a) and 53(b) illustrate subblocks split in squares from the current block. For example, the current block may be split into subblocks in a preset size. In this case, the preset size may be a pre-appointed size between the encoder and the decoder. According to an embodiment, the preset size may be N×N having the same height and width. For example, the preset size may be 4×4. According to an embodiment, the preset size may be a value set on the basis of a size of a transform kernel. The preset size may be a value set on the basis of a transform unit. The preset size may be a size of a transform unit.

According to an embodiment, the current block may be split into subblocks having a size determined according to the size of the current block. For example, when the size of the current block is larger than a first threshold value, the current block may be split into subblocks, which are larger than blocks smaller than the first threshold value. Further, an operation of splitting the current block into subblocks may be limited according to the size of the current block. For example, when the size of the current block is smaller than a second threshold value, the encoder and the decoder may not split the current block into a plurality of subblocks. This is because a performance gain according to the method of performing intra prediction by splitting the current block when the size of the current block is relatively small may not be larger than the case in which the size of the current block is relatively large.

According to an embodiment, the form of split subblocks may be determined independently from the form of the current block. For example, even when the current block is square, a plurality of subblocks split from the current block may be non-square. FIGS. 53(c) and 53(d) illustrate subblocks split in non-squares from the current block. According to an embodiment, the current block may be split into non-square subblocks having a preset size. In this case, a height and a wide of the preset size may be different from each other. For example, the preset size may be 4×8 or 8×4. As described above, the preset size may be a value set according to the size of the current block. According to an embodiment, the encoder and the decoder may support a non-square transform kernel having the size of 4×8 or 8×4. Further, when it is required to split the current block into non-square subblocks, the preset size may be a value set on the basis of a non-square transform unit.

According to another embodiment, the current block may be split into a plurality of subblocks having the form similar to the form of the current block. FIGS. 53(e) and 53(f) illustrate subblocks divided from the current block when the current block is a non-square block. For example, when the current block is non-square, the current block may be split into non-square subblocks having the form similar to the form of the current block. As illustrated in FIG. 53(e), when the height of the current block is longer than the width, the current block may be split into a plurality of subblocks having the height longer than the width. As illustrated in FIG. 53(f), when the width of the current block is longer than the height, the current block may be split into a plurality of subblocks having the width longer than the height.

Figure 54:
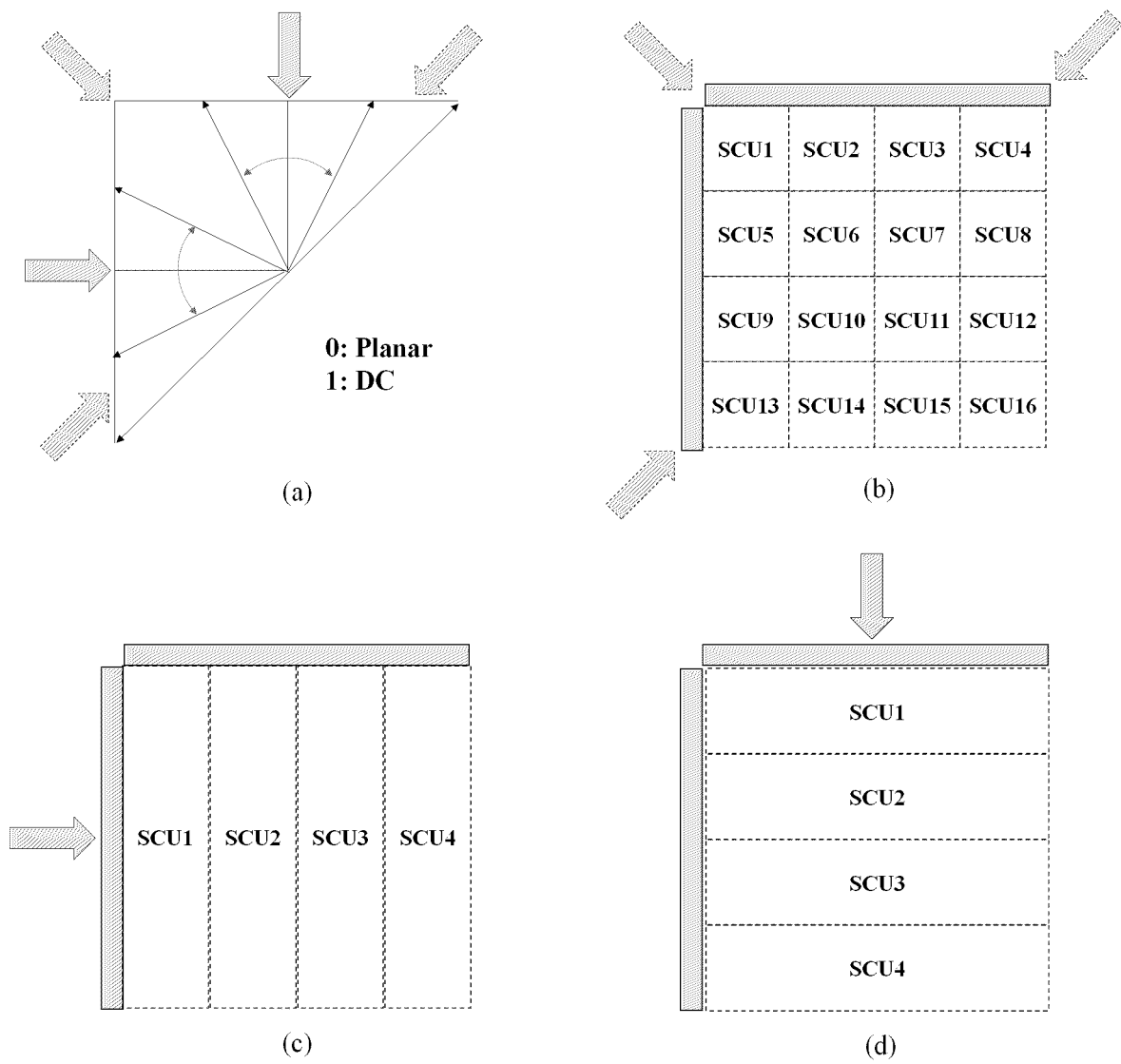
FIG. 54 illustrates a method of splitting a current block according to an intra prediction mode of the current block.

According to an embodiment of the present disclosure, the form in which the current is split may be determined on the basis of a prediction mode of the current block. For example, at least one of a size or a direction in which the current block is split may vary depending on an intra prediction mode (angle mode, DC mode, or planar mode) of the current block. FIG. 54 illustrates a method of splitting a current block according to an intra prediction mode of the current block. Referring to FIG. 54(a), a plurality of intra prediction modes may be classified into a non-directional mode such as a planar mode or a DC mode and an angle mode corresponding to each of intra prediction mode indexes 2 to 66.

According to an embodiment, when the current block is intra-predicted, residual signals of subblocks spaced far from reference samples of the current block among subblocks split from the current block may be relatively large. Accordingly, samples having similar distances from the reference sample of the current block may be classified to belong to the same subblock.

According to an embodiment, when the intra prediction mode of the current block is a non-directional mode, the current block may be split into a plurality of square subblocks as illustrated in FIG. 54(b). Further, when the intra prediction mode of the current block is one of a horizontally diagonal mode, a diagonal mode, and a vertically diagonal mode, the current block may be split into a plurality of square subblocks. Further, when the intra prediction mode of the current block is an angle mode close to one of a horizontally diagonal mode, a diagonal mode, and a vertically diagonal mode, the current block may be split into a plurality of square subblocks.

On the other hand, when the intra prediction mode of the current block is a horizontal mode or a vertical mode, the current block may be split into a plurality of non-square subblocks according to the intra prediction mode of the current block as illustrated in FIG. 54(c) or 54(d). Further, when the intra prediction mode of the current block is an angle mode close to one of a horizontal mode and a vertical mode, the current block may be split into a plurality of non-square subblocks. Accordingly, the current block may be split such that samples having similar distances from the reference sample of the current block belong to the same subblock.

For example, when the prediction mode of the current block is a horizontal mode or one of angle modes close to the horizontal mode, the current block may be split as illustrated in FIG. 54(c). When the prediction mode of the current block is a vertical mode or one of angle modes close to the vertical mode, the current block may be split as illustrated in FIG. 54(d). Another prediction method may be applied to subblocks spaced far from reference samples of the current block.

Figure 55:
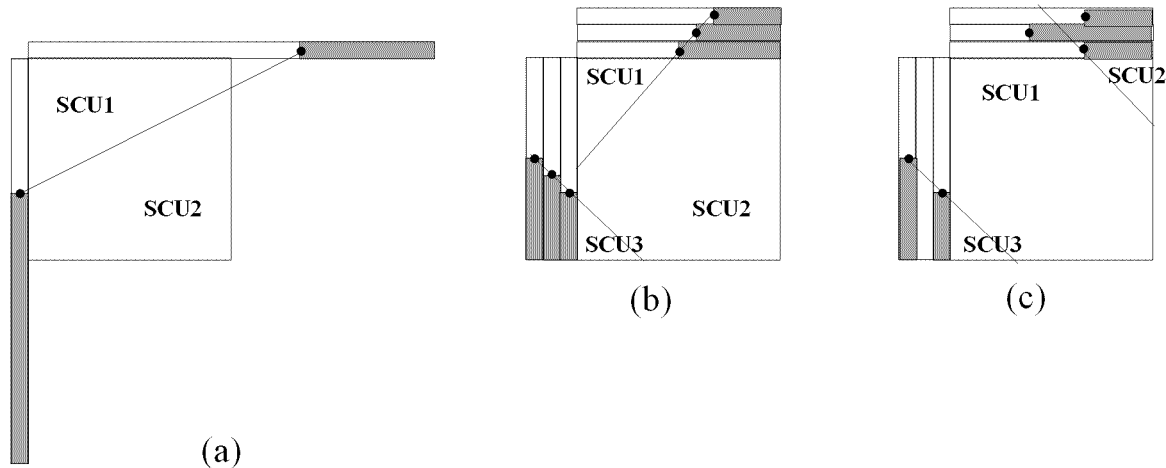
FIG. 55 illustrates a method of splitting a current block into a plurality of subblocks on the basis of sample values of reference samples of the current block according to an embodiment of the present disclosure.

FIG. 55 illustrates a method of splitting a current block into a plurality of subblocks on the basis of sample values of reference samples of the current block according to an embodiment of the present disclosure. According to an embodiment of the present disclosure, the current block may be split on the basis of sample values of reference samples of the current block. According to an embodiment, the encoder and the decoder may determine a reference sample edge on the basis of sample values of reference samples of the current block. For example, the reference sample edge may be a reference point for splitting an area in which a sample value of a reference sample is changed by a threshold value or more. Further, the reference sample edge may indicate a point in which a sample value difference between reference samples adjacent to each other is larger than or equal to a threshold value.

Referring to FIG. 55(a), the encoder and the decoder may determine the reference sample edge of the current block by comparing sample values of reference samples of the current block. For example, a location of a reference sample having a difference from an average value of the preset number of reference samples near a specific reference sample may be determined as the reference sample edge, the difference being larger than or equal to a threshold value. Further, the encoder and the decoder may determine one or more reference sample edges for each of an upper reference sample set and a left reference sample set. Here, the upper reference sample set of the current block may be a set including reference samples located on an upper line of the current block. The left reference sample set of the current block may be a set including reference samples located on a left line of the current block.

Subsequently, the encoder and the decoder may split the current block on the basis of a line that connects the reference sample edge of the upper reference sample set and the reference sample edge of the left reference sample set. For example, when one reference sample edge is detected for each of the upper reference sample set and the left reference sample set, the current block may be split a total of two subblocks (SCU1 and SCU2). Further, when two or more reference sample edges are detected for each of the upper reference sample set and the left reference sample set, the current block may be split into a plurality of subblocks.

Meanwhile, as described above, the reference samples for intra prediction of the current block may include samples on a plurality of reference lines. Referring to FIGS. 55(b) and 55(c), the current block may be split on the basis of sample values of reference samples on a plurality of reference lines. For example, the reference sample edge of the current block may be determined on the basis of sample values of the reference samples on the plurality of reference lines. When the reference samples on the plurality of reference lines are used, the form of an image object configured in a neighboring block may be detected.

According to an embodiment of the present disclosure, the encoder and the decoder may determine one or more reference sample edges for each reference line. Referring to FIG. 55(b), the encoder and the decoder may perform first split on the current block by extending a line that connects reference samples edges for each upper reference line. Two subblocks (SCU1 and SCU2) may be acquired by the first split. Further, the encoder and the decoder may perform second split on the current block by expanding a line that connects reference sample edges for each left reference line. Two subblocks (SCU2 and SCU3) may be acquired by the second split. Accordingly, even though one of the reference sample edges for each upper reference line and the reference sample edges for each left reference line is not detected, the current block may be split.

FIG. 55(c) illustrates a method of splitting a current block when one of reference sample edges for each upper reference line or reference sample edges for each left reference line is not detected or reference sample edges are not arranged in one straight line. No reference sample edge may be detected on some of the left reference lines like left reference lines of FIG. 55(c). When reference sample edges are detected on at least two reference lines, the encoder and the decoder may split the current block on the basis of the corresponding reference sample edges. Further, the above-described embodiment may be applied to the case in which no reference sample edge is detected on some of the upper reference lines.

In addition, reference sample edges for each upper reference line may not be arranged in one straight line like the upper reference lines of FIG. 55(c). In this case, the current block may be split on the basis of an intermediate value of reference sample edges on a line which is not adjacent to the current block and a line passing a reference sample edge on a line adjacent to the current block. Although FIGS. 55(b) and 55(c) illustrate embodiments using three reference lines, the present disclosure is not limited thereto.

According to an embodiment of the present disclosure, a plurality of subblocks split from the current block may be classified into primary subblocks (PSBs) primarily predicted according to an intra prediction mode of the current block and secondary subblocks (SSBs) predicted thereafter. Further, a subblock group including PSBs may be referred to as a primary subblock group (hereinafter, referred to as a PSB group), and a subblock group including SSBs may be referred to as a secondary subblock group (hereinafter, referred to as an SSB group).

Figure 56:
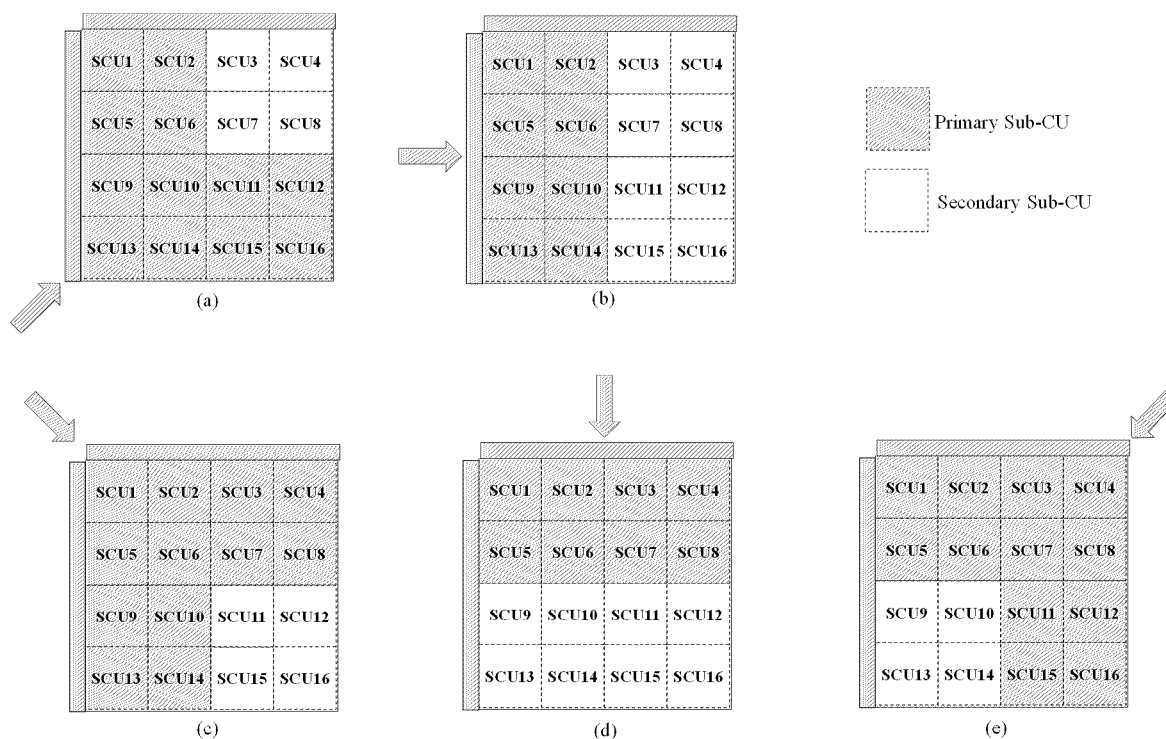
FIG. 56 illustrates a method of determining a primary subblock group and a secondary subblock group according to an embodiment of the present disclosure.

FIG. 56 illustrates a method of determining a primary subblock group and a secondary subblock group according to an embodiment of the present disclosure. According to an embodiment, the PSB group may include subblocks within a preset distance from reference samples referred to for intra prediction of the current block among a plurality of subblocks split from the current block. Further, the SSB group may include subblocks beyond a preset distance from reference samples referred to for intra prediction of the current block among a plurality of subblocks.

Referring to FIG. 56, the current block may be split into a total of 16 subblocks. When an intra prediction mode of the current block is one of a horizontally diagonal mode, a vertically diagonal mode, and angle modes close to the horizontally diagonal mode and the vertically diagonal mode, the PSB group and the SSB group of the current block may be determined as illustrated in FIG. 56(a). That is, among 16 subblocks split from the current block, 4 upper right subblocks are SSBs and the remaining subblocks except the 4 upper right subblocks may be PSBs.

FIGS. 56(a) to 56(e) illustrate methods of determining a PSB group and an SSB group when the intra prediction mode of the current block is one of HDIA, HOR, DIA, VER, VDIA, and angle modes close thereto. The PSB and the SSB may be distinguished in consideration of a relative distance from reference samples to be used in each prediction mode. However, the present disclosure is not limited thereto, and other splits in the similar form to the examples described with reference to FIG. 56.

According to an embodiment, the encoder and the decoder may first perform intra prediction on PSBs on the basis of the intra prediction mode of the current block. Subsequently, the encoder and the decoder may perform intra prediction on SSBs. Hereinafter, various intra prediction methods of SSBs of the current block will be described in detail.

According to an embodiment, the encoder and the decoder may perform prediction on SSBs of the current block on the basis of reconstructed sample values of PSBs of the current block. For example, the encoder and the decoder may first reconstruct PSBs of the current block on the basis of the intra prediction mode and reference samples. Subsequently, the encoder and the decoder may perform intra prediction on SSBs of the current block with reference to samples which are adjacent to each of the SSBs of the current block and have been reconstructed. The encoder and the decoder may perform intra prediction on SSBs of the current block on the basis of the intra prediction mode of the current block. In this case, pre-reconstructed samples may be samples included in each of the PSBs. The samples included in each of the PSBs may be samples near the SSB of the current block compared to the reference sample of the current block. Accordingly, even when the same prediction mode is used for the SSB of the current block, SSB prediction accuracy may be higher than the conventional method.

Accordingly, the encoder and the decoder may predict the PSB group and the SSB group of the current block using different intra prediction modes. For example, PSBs of the current block may be predicted on the basis of a Primary Mode (PM) which is the intra prediction mode of the current block. SSBs of the current block may be predicted on the basis of a variable Secondary Mode (SM). For example, the SM may be an intra prediction mode applied only to SSBs among a plurality of subblocks of the current block. In this case, the SM may be separately signaled. According to an embodiment, the SM may be signaled in the form of an offset from the PM. For example, the SM may be an intra prediction mode corresponding to an intra prediction mode index obtained by addition of the offset from the PM. In this case, the offset may be a value within a preset maximum value. Accordingly, the encoder may reduce an amount of calculations for selecting a specific offset.

Further, when the PM of the current block is an angle mode and an opposite angle mode of the PM exists, the SSB of the current block may be predicted on the basis of the opposite angle mode of the PM. For example, when the PM is a horizontally diagonal mode which is intra prediction mode index 2, the SM may be a vertically diagonal mode corresponding to intra prediction mode index 66. On the other hand, when the PM is a vertically diagonal mode which is intra prediction mode index 66, the SM may be a vertically diagonal mode corresponding to intra prediction mode index 2.

According to another embodiment, the SM may be a preset prediction mode. For example, the SSB of the current block may be predicted on the basis of a preset prediction mode. As described above, the SSBs of the current block may be subblocks beyond a preset distance from reference samples of the current block. Accordingly, predicting SSBs of the current block on the basis of a non-directional mode may be advantageous in an aspect of a residual signal. That is, the preset SM may be one of a planar mode or a DC mode.

According to an additional embodiment, a final prediction block of the SSBs of the current block may be acquired on the basis of a first prediction SSB predicted on the basis of the PM of the current block and a second prediction SSB predicted on the basis of the non-directional mode. For example, the encoder and the decoder may acquire the final prediction block corresponding to the SSB on the basis of an average between the first prediction SSB and the second prediction SSB of the current block. Further, the encoder and the decoder may reconstruct the SSB by adding the final prediction block corresponding to the SSB and the residual signal.

Figure 57:
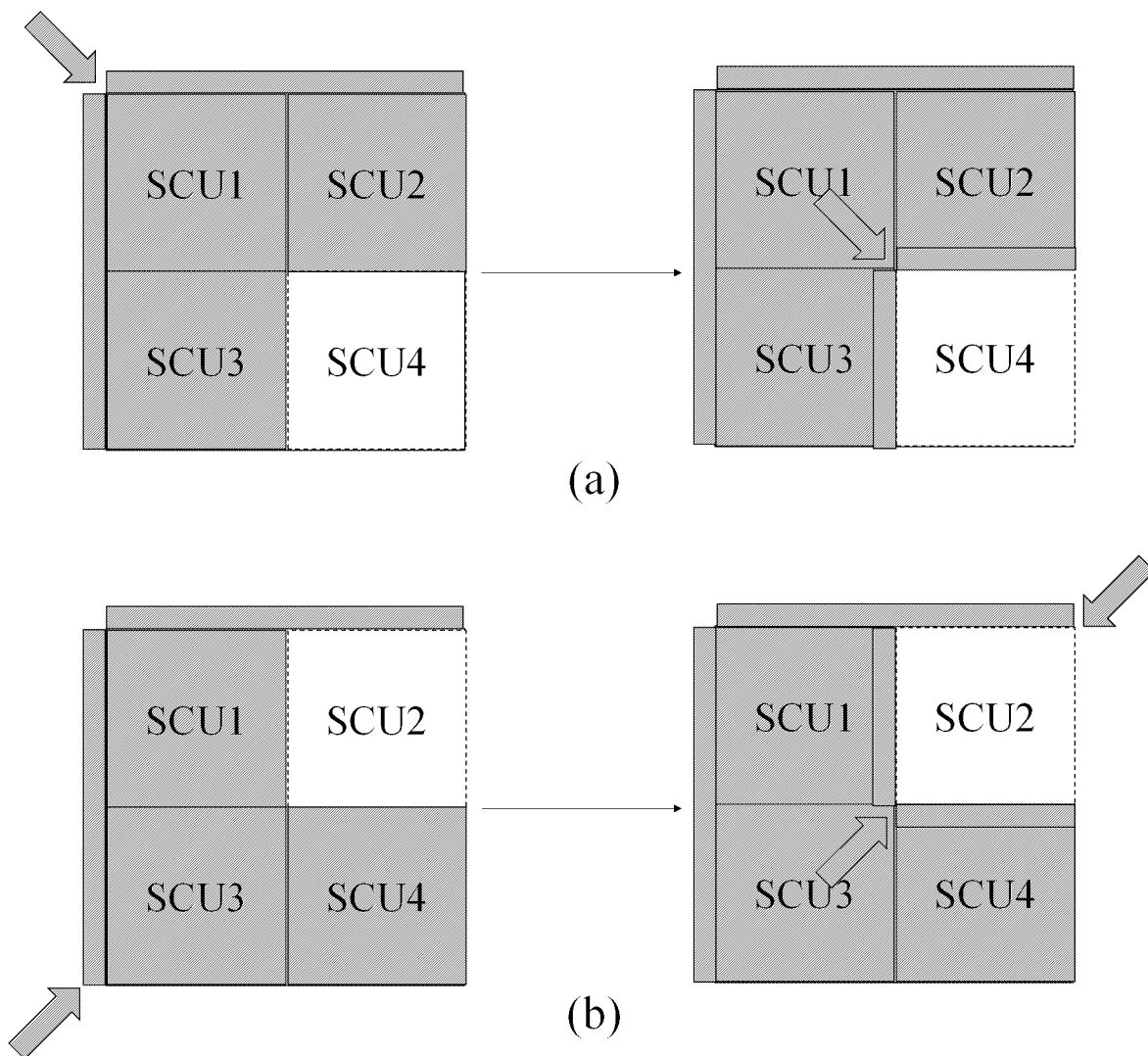
FIG. 57 illustrates a method of predicting a primary subblock group and a secondary subblock group according to an embodiment of the present disclosure.

FIG. 57 illustrates a method of predicting a primary subblock group and a secondary subblock group according to an embodiment of the present disclosure. Referring to FIG. 57, the current block may be split into a total of 4 subblocks. According to an embodiment, when a prediction mode of the current block is one of a diagonal mode and angle modes close to the diagonal mode, the PSB group and the SSB group of the current block may be determined as illustrated in FIG. 57(a). That is, among 4 subblocks split from the current block, a lower right subblock (SCU4) may be an SSB of the current block, and the remaining subblocks (SCU1, SCU2, and SCU3) except the lower right subblock may be PSBs of the current block.

In this case, the SSBs of the current block may be reconstructed with reference to samples included each of the PSBs of the current block. For example, the encoder and the decoder may first reconstruct PSBs of the current block on the basis of the intra prediction mode and reference samples. Subsequently, the encoder and the decoder may perform intra prediction on SSBs through sample values of samples adjacent to SSBs among pre-reconstructed samples of the PSBs of the current block. For example, the SSB (SCU4) of the current block may be reconstructed on the basis of sample values of the pre-reconstructed samples of the PSBs (SCU1, SCU2, and SCU3) and the residual signal.

According to an embodiment, when a prediction mode of the current block is one of a horizontally diagonal mode and angle modes close to the horizontally diagonal mode, the PSB group and the SSB group of the current block may be determined as illustrated in FIG. 57(b). That is, among 4 subblocks split from the current block, an upper right subblock (SCU 2) may be an SSB of the current block, and the remaining subblocks (SCU1, SCU3, and SCU4) except the upper right subblock may be PSBs of the current block. In this case, as described above, the SSB (SCU2) of the current block may be reconstructed on the basis of sample values of samples adjacent to the SSB (SCU2) among pre-reconstructed samples of the PSBs (SCU1, SCU3, and SCU4) of the current block.

According to an additional embodiment, some of the reference samples of the current block may be adjacent to the SSB of the current block. In this case, some of the reference samples of the current block may be reference samples which have not been used for intra prediction of the current block. In this case, the SSB of the current block may be predicted on the basis of the SM which is a prediction mode different from the PM of the current block. For example, when the PM of the current block is an angle mode, the SM of the current block may be an opposite angle mode of the PM. As illustrated in FIG. 57(b), when the PM of the current block is a horizontally diagonal mode, the SM may be a vertically diagonal mode.

Further, when the PM of the current block is an angle mode, the final prediction block of the SSB of the current block may be acquired on the basis of a first prediction SSB predicted on the basis of the PM of the current block and a second prediction SSB predicted on the basis of an opposite angle mode of the PM. As illustrated in FIGS. 56(a) and 56(e), an angle mode in a direction opposite to the PM mode can be used, and when there is a reference sample adjacent to a boundary of the SSB, the above-described embodiment can be applied.

As described above, in a process of coding a video signal, a picture may be split into sequences of coding tree units. Hereinafter, the sequence of processing CTUs within a picture, a slice, or a tile will be described. FIG. 58 illustrates an order of processing coding tree units according to an embodiment of the present disclosure.

The encoder and the decoder may perform encoding or decoding for each CTU within a current picture including the current block or slices/tiles split from the current picture. In this case, the encoder and the decoder may encode or decode a plurality of CTUs according to a predefined processing order. When CTUs are processed in an order different from the predefined processing order, the encoder may signal the corresponding order to the decoder.

FIG. 58(a) illustrates a raster scan order of transversely processing CTUs, starting at the uppermost left CTU of pictures, slices, or tiles and then processing CTUs on the next column. FIG. 58(b) illustrates an embodiment of explicitly signaling a location of a first CTU (block A), which is first processed in pictures, slices, or tiles. For example, the encoder may signal the location of the first CTU. The decoder may first process the corresponding CTU on the basis of the signaled location of the first CTU. The decoder may decode, in an inverse-raster scan order, CTUs corresponding to a previous location from the location of the first CTU in the raster scan order. Further, CTUs corresponding to the following location from the location of the first CTU in the raster scan order may be decoded in the raster scan order. In this case, the CTUs processed in the inverse-raster scan order and the CTUs processed in the raster scan order may be processed in an order in which CTUs cross one by one, or CTUs in one direction therebetween may be preferentially processed.

FIGS. 58(c) and 58(d) illustrate embodiments of explicitly signaling locations of a plurality of CTUs first processed within pictures, slices, or tiles. For example, the plurality of CTUs may include a second CTU (block B) and a third CTU (block C). The encoder may signal the location of each of the second CTU (block B) and the third CTU (block C). Further, the location of the second CTU first processed among the plurality of preferentially processed CTUs may be additionally signaled.

Referring to FIG. 58(d), the decoder may first decode the second CTU (block B) on the basis of the signaled location of the second CTU. Subsequently, the decoder may decode the third CTU (block C). Next, CTUs between the location of the second CTU and the location of the third CTU may be decoded. For example, the decoder may decode, in the raster scan order or the inverse-raster scan order, CTUs from a CTU after the second CTU to a CTU before the third CTU in the raster scan order. Further, the decoder may decode, in the inverse-raster scan order, CTUs corresponding to a previous location from the location of the second CTU in the raster scan order. In addition, CTUs corresponding to the following location from the location of the third CTU (block C) in the raster scan order may be decoded in the raster scan order.

FIG. 58(c) illustrates another embodiment of explicitly signaling locations of the plurality of CTUs first processed within pictures, slices, or tiles in the similar form to FIG. 58(d).

FIG. 59 illustrates a bi-directional intra prediction method according to an embodiment of the present disclosure. According to an embodiment of the present disclosure, the current block may be predicted using a bi-directional intra prediction method according to distribution of available reference samples of the current block. As illustrated in FIGS. 56 and 58, when the current block or a plurality of subblocks split from the current block is encoded or decoded, not only pre-reconstructed left and upper samples of the corresponding block but also pre-reconstructed lower and right samples of the corresponding block may be used as reference samples of the corresponding block. Accordingly, a specific block may be predicted according to a bi-directional intra prediction method using pre-reconstructed right and lower samples adjacent to the corresponding block. Hereinafter, the specific block indicates the current block or a plurality of subblocks split from the current block.

FIGS. 59(a) and 59(b) illustrate embodiments of a method of predicting the current block when there are pre-reconstructed samples in all of four faces of a specific block. Referring to FIG. 59(a), the specific block may be divided into two halves on the basis of a prediction mode of the current block. For example, when the prediction mode of the current block is an angle mode, the specific block may be divided into two halves on the basis of the prediction mode of the current block and a right-angled line. Further, a first part of the halved specific block may be reconstructed on the basis of the prediction mode of the current block and first reference samples. In this case, the first part may be a part including upper and left sides of the specific block. Further, the first reference samples may be reference samples on left and upper lines of the specific block. A second part of the halved specific block may be reconstructed on the basis of a secondary prediction mode and second reference samples. In this case, the second part may be a part including right and lower sides of the specific block. Further, the second reference samples may be reference samples on right and lower lines of the specific block. According to an embodiment, the secondary prediction mode may be the SM described with reference to FIGS. 56 and 57.

Referring to FIG. 59(b), the specific block may not be further split. For example, the specific block may be reconstructed on the basis of the first prediction block and the second prediction block. In this case, the first prediction block may be a prediction block predicted on the basis of the prediction mode of the current block and first reference samples. Further, the second prediction block may be a prediction block predicted on the basis of the secondary prediction mode and the first reference samples. The decoder may reconstruct the specific block by performing weighted sum on the first prediction block and the second prediction block.

FIGS. 59(c) and 59(d) illustrate embodiments of a method of predicting a current block when there are pre-reconstructed samples only on three of the four faces of a specific block. In this case, the specific block may be divided into two halves on the basis of a prediction mode of the current block. For example, an area corresponding to a side on which no pre-reconstructed sample exists among areas of the specific block may be predicted by expanding the prediction mode from another side. Further, as in FIG. 59(b), the embodiment of restoring the specific block on the basis of a plurality of prediction blocks for the specific block without further splitting the specific block may be applied to the embodiments of FIGS. 59(c) and 59(d).

FIG. 60 illustrates a method of predicting each of a plurality of subblocks split from a current block according to an embodiment of the present disclosure. According to an embodiment of the present disclosure, the plurality of subblocks split from the current block may be predicted on the basis of an intra prediction mode used for predicting neighboring blocks of the current block.

FIG. 60(a) illustrates locations (AL, A, AR, R, L, and BL) of a plurality of neighboring blocks of the current block. In this case, there may be an intra prediction mode corresponding to the location of each of the neighboring blocks. For example, the block at the corresponding location may be inter-predicted or has not been decoded in a raster scan order or a CU processing order.

FIG. 60(b) illustrates a method of predicting each subblock when the current block is split into a total of 4 subblocks. For example, a first subblock (SCU1) may be predicted using an intra prediction mode corresponding to the upper left location (AL) most adjacent to a first subblock (SCU1). A second subblock (SCU2) may be predicted using an intra prediction mode corresponding to the upper location (A) adjacent to a second subblock (SCU2). When there is no intra prediction mode corresponding to the upper location (A), the second subblock (SCU2) may be predicted using an intra prediction mode corresponding to another neighboring location (for example, an upper right location). When both an upper side and a left side are within the current block like a fourth subblock (SCU4), the corresponding block may be predicted using an intra prediction mode of a neighboring block located on a remote straight line.

FIG. 60(c) illustrates another method of predicting each subblock when the current block is split into a total of 4 subblocks. In FIG. 60(c), a first subblock (SCU1), a second subblock (SCU2), and a third subblock (SCU3) may be predicted on the basis of the intra prediction mode of the current block. In this case, the first subblock (SCU1), the second subblock (SCU2), and the third subblock (SCU3) may be the primary subblocks described with reference to FIGS. 56 and 57. According to an embodiment, a fourth subblock (SCU4) may be predicted on the basis of an intra prediction mode different from the intra prediction mode of the current block. For example, the fourth subblock (SCU4) may be predicted using an intra prediction mode corresponding to the right location (R). Alternatively, the fourth subblock (SCU4) may be predicted using an intra prediction mode of a neighboring block located on a remote straight line.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. An apparatus for decoding a video signal, the apparatus comprising a processor,
   wherein the processor is configured to:
   obtain an indicator for a resolution related to a motion vector differential value,
   obtain the resolution related to the motion vector differential value based on a value of the indicator,
   wherein the resolution is one of a plurality of resolutions included in a resolution set determined based on a prediction mode of a current block,
   wherein the resolution set is a first resolution set or a second resolution set,
   wherein both the first resolution set and the second resolution set include a resolution in unit of 1 sample,
   wherein the resolution in unit of 1 sample included in the first resolution set and the resolution in unit of 1 sample included in the second resolution set are indicated by different values of the indicator,
   obtain a modified motion vector differential value by modifying the motion vector differential value based on the resolution,
   obtain a motion vector of the current block based on the modified motion vector differential value, and
   reconstruct the current block based on the motion vector.
2. The apparatus for decoding the video signal of claim 1, wherein the second resolution set includes at least one of resolutions different from a plurality of resolutions included in the first resolution set.
3. The apparatus for decoding the video signal of claim 1, wherein the prediction mode is a prediction mode based on an affine model or a prediction mode not based on the affine model.
4. The apparatus for decoding the video signal of claim 1, wherein the first resolution set includes a resolution in unit of 1/16 sample and a resolution in unit 1/4 sample, and
   wherein the second resolution set includes a resolution in unit of 4 samples.
5. The apparatus for decoding the video signal of claim 1, wherein the second resolution set includes a resolution in unit of 1/4 sample.
6. The apparatus for decoding the video signal of claim 1, wherein the first resolution set includes a resolution in unit of 4 samples, and
   wherein the second resolution set includes a resolution in unit 1/4 sample and a resolution in unit 1/2 sample.
7. The apparatus for decoding the video signal of claim 3, wherein when the prediction mode of the current block is the prediction mode based on the affine model, the value of the indicator indicates a first resolution as the resolution,
   wherein when the prediction mode of the current block is the prediction mode not based on the affine model, the value of the indicator indicates a second resolution as the resolution, and
   wherein the first resolution and the second resolution are different from each other.
8. The apparatus for decoding the video signal of claim 1, wherein the indicator is expressed by variable-length bits, and
   wherein the value of the indicator is one of a plurality of values expressed by the variable-length bits.
9. The apparatus for decoding the video signal of claim 1, wherein a number of the plurality of resolutions included in the first resolution set and a number of the plurality of resolutions included in the second resolution set are different from each other.
10. The apparatus for decoding the video signal of claim 9,
    wherein the number of the plurality of resolutions included in the first resolution set and the number of the plurality of resolutions included in the second resolution set are determined based on a Picture Order Count (POC) of a reference picture related to the current block.
11. The apparatus for decoding the video signal of claim 10,
    wherein when the Picture Order Count (POC) of the reference picture is equal to a POC of a current picture including the current block, the resolution is obtained from the first resolution set,
    wherein when the POC of the reference picture is not equal to the POC of the current picture including the current block, the resolution is acquired from the second resolution set, and
    wherein the plurality of resolutions included in the first resolution set is configured as part of the plurality of resolutions included in the second resolution set.
12. An apparatus for encoding a video signal, the apparatus comprising a processor,
    wherein the processor is configured to:
    obtain a bitstream to be decoded by a decoder using a decoding method,
    wherein the decoding method comprising:
    obtaining an indicator for a resolution related to a motion vector differential value;
    obtaining the resolution related to the motion vector differential value based on a value of the indicator, wherein the resolution is one of a plurality of resolutions included in a resolution set determined based on a prediction mode of a current block, wherein the resolution set is a first resolution set or a second resolution set, wherein both the first resolution set and the second resolution set include a resolution in unit of 1 sample, wherein the resolution in unit of 1 sample included in the first resolution set and the resolution in unit of 1 sample included in the second resolution set are indicated by different values of the indicator;

obtaining a modified motion vector differential value by modifying the motion vector differential value based on the resolution;

obtaining a motion vector of the current block based on the modified motion vector differential value; and reconstructing the current block based on the motion vector.

13. The apparatus for encoding the video signal of claim 12, wherein the second resolution set includes at least one of resolutions different from a plurality of resolutions included in the first resolution set.

14. The apparatus for encoding the video signal of claim 13, wherein the prediction mode is a prediction mode based on an affine model or a prediction mode not based on the affine model.

15. The apparatus for encoding the video signal of claim 12, wherein the first resolution set includes a resolution in unit of 1/16 sample and a resolution in unit 1/4 sample, and wherein the second resolution set includes a resolution in unit of 4 samples.

16. The apparatus for encoding the video signal of claim 13, wherein the second resolution set includes a resolution in unit of 1/4 sample.

17. The apparatus for encoding the video signal of claim 12, wherein the first resolution set includes a resolution in unit of 4 samples, and wherein the second resolution set includes a resolution in unit 1/4 sample and a resolution in unit 1/2 sample.

18. A non-transitory computer-readable medium storing a bitstream, the bitstream being decoded by a decoding method, wherein the decoding method, comprising:

obtaining an indicator for a resolution related to a motion vector differential value;

obtaining the resolution related to the motion vector differential value based on a value of the indicator, wherein the resolution is one of a plurality of resolutions included in a resolution set determined based on a prediction mode of a current block, wherein the resolution set is a first resolution set or a second resolution set, wherein both the first resolution set and the second resolution set include a resolution in unit of 1 sample, wherein the resolution in unit of 1 sample included in the first resolution set and the resolution in unit of 1 sample included in the second resolution set are indicated by different values of the indicator;

obtaining a modified motion vector differential value by modifying the motion vector differential value based on the resolution;

obtaining a motion vector of the current block based on the modified motion vector differential value; and reconstructing the current block based on the motion vector.

19. A video signal processing method comprising:

obtaining an indicator for a resolution related to a motion vector differential value;

obtaining the resolution related to the motion vector differential value based on a value of the indicator, wherein the resolution is one of a plurality of resolutions included in a resolution set determined based on a prediction mode of a current block, wherein the resolution set is a first resolution set or a second resolution set, wherein both the first resolution set and the second resolution set include a resolution in unit of 1 sample, wherein the resolution in unit of 1 sample included in the first resolution set and the resolution in unit of 1 sample included in the second resolution set are indicated by different values of the indicator;

obtaining a modified motion vector differential value by modifying the motion vector differential value based on the resolution;

obtaining a motion vector of the current block based on the modified motion vector differential value; and reconstructing the current block based on the motion vector.

* * * * *

UNITED STATES PATENT AND TRADEMARK OFFICE
CERTIFICATE OF CORRECTION

PATENT NO. : 12,101,501 B2  
APPLICATION NO. : 18/328246  
DATED : September 24, 2024  
INVENTOR(S) : Geonjung Ko et al.

Page 1 of 1

It is certified that error appears in the above-identified patent and that said Letters Patent is hereby corrected as shown below:

In the Claims

Claim 14 should read:
14. The apparatus for encoding the video signal of claim 12,
wherein the prediction mode is a prediction mode based on an affine model or a prediction mode not based on the affine model.

Claim 16 should read:
16. The apparatus for encoding the video signal of claim 12,
wherein the second resolution set includes a resolution in unit of 1/4 sample.

Signed and Sealed this
Twenty-fifth Day of February, 2025

Coke Morgan Stewart
*Acting Director of the United States Patent and Trademark Office*